United States Patent
Zhang et al.

(10) Patent No.: US 9,609,533 B2
(45) Date of Patent: Mar. 28, 2017

(54) METHOD AND DEVICE FOR OPTIMIZING A HANDOVER PARAMETER

(71) Applicant: Huawei Technologies Co., Ltd., Shenzhen (CN)

(72) Inventors: Jietao Zhang, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/186,292

(22) Filed: Jun. 17, 2016

(65) Prior Publication Data
US 2016/0302086 A1    Oct. 13, 2016

Related U.S. Application Data

(63) Continuation of application No. PCT/CN2013/090003, filed on Dec. 19, 2013.

(51) Int. Cl.
  *H04W 36/00* (2009.01)
  *H04W 24/02* (2009.01)
  *H04W 36/30* (2009.01)
  *H04W 76/02* (2009.01)

(52) U.S. Cl.
  CPC ........... *H04W 24/02* (2013.01); *H04W 36/30* (2013.01); *H04W 76/028* (2013.01)

(58) Field of Classification Search
  CPC .... H04W 24/02; H04W 76/028; H04W 36/30
  USPC .......................................... 455/436; 370/338
  See application file for complete search history.

(56) References Cited

U.S. PATENT DOCUMENTS

2012/0039305 A1*  2/2012  Han ............... H04W 36/245
                                                  370/332
2013/0183977 A1*  7/2013  Han ............... H04W 36/0055
                                                  455/436

* cited by examiner

Primary Examiner — Marcos Batista
(74) Attorney, Agent, or Firm — Slater Matsil, LLP

(57) ABSTRACT

A method includes acquiring a global handover performance parameter R, a local handover performance parameter r, and a handover parameter of a cell within a preset time; and detecting a handover problem, existing within the preset time, of the cell according to R and r. The method further includes receiving $R_j$, $r_j$, a handover parameter, and indication information for a handover problem, within the preset time, of each adjacent cell that are sent by all adjacent cells; and determining whether the cell is a cell to be optimized. If an $i^{th}$ cell is a cell to be optimized, the method optimizes, according to $R_i$, $r_i$, $R_j$, and $r_j$, a handover parameter of the $i^{th}$ cell, and the handover parameters of the adjacent cells of the $i^{th}$ cell by using a data statistical regression method, a handover parameter corresponding to a handover problem of the $i^{th}$ cell.

20 Claims, 9 Drawing Sheets

METHOD AND DEVICE FOR OPTIMIZING A HANDOVER PARAMETER

CROSS-REFERENCE TO RELATED APPLICATIONS

This application is a continuation of International Application No. PCT/CN2013/090003, filed on Dec. 19, 2013, which is hereby incorporated by reference in its entirety.

TECHNICAL FIELD

The present disclosure relates to the field of communications, and in particular embodiments, to a method and device for optimizing a handover parameter.

BACKGROUND

In a running process of a cellular network, as a user moves, the user is handed over between different cells. A handover of the user between different cells is mainly affected by three performance parameters: a hysteresis (H for short), a time to trigger (T for short), and a cell individual offset (O for short). Performance of the handover of the user is mainly represented by three indices: an indicator of a link failure caused by a too late handover (Late Radio Link Failure, L_RLF for short), an indicator of a link failure caused by a too early handover (Early Radio Link Failure, E_RLF for short), and an indicator of a ping-pong handover (PPH). In the cellular network, the determining of a cell handover parameter is usually obtained according to a network planning tool or a test with an experimental network. In one aspect, in an actual network, a local radio environment of each cell is different from a radio environment used in an experimental network or network planning. As a result, during networking, the cell handover parameter obtained according to the network planning tool or the test with the experimental network is not optimal and further needs to be adjusted. In another aspect, with a long-term change (for example, a newly added building or road) or a short-term change (for example, construction work) of a radio network environment, or with a newly built base station, the cell handover parameter obtained during networking, according to the network planning tool or the test with the experimental network, is not optimal and further needs to be adjusted.

In a self-organizing network (SON for short) technology in a cellular network, a network automatically performs operations such as self-configuration, self-optimization, and self-healing according to a network status, thereby implementing real-time and automatic network maintenance. Therefore, manual network maintenance is greatly reduced, and operation and maintenance costs of carriers are greatly reduced. Mobility robustness optimization (MRO for short) is an important use case of SON. A key to SON mobility robustness optimization is how the network automatically adjusts, according to a change of a radio environment, a mobility handover parameter of a cell by using statistical characteristics of handover performance of a network, so that mobility handover performance of each cell meets expectations of carriers, and quality of service (QoS for short) for mobility of a user is ensured.

In the prior art, in a method for optimizing a configuration parameter, a method of the SOCRATES project in the European Union 7th Framework Programme (FP7 for short) is usually used to determine, according to handover indices including a handover failure rate (HOF for short), a ping-pong handover rate (Handover Ping-Pong, HPP for short), and a radio link failure rate (RLF for short) that are from statistics and observation, whether to adjust H and T of a problematic cell. H and T can be increased only when RLF performance is less than a preset threshold. In some cases, H and T can be reduced only when HOF performance or HPP performance is less than a preset threshold.

The prior art fails to consider optimization of an entire network and fails to improve performance of the entire network.

SUMMARY

Embodiments of the present disclosure provide a method and device for optimizing a handover parameter in a cellular network, so as to implement that optimization of a handover parameter is beneficial to performance of an entire network.

To achieve the foregoing objective, the following technical solutions are adopted in the embodiments of the present disclosure.

According to a first aspect, a method for optimizing a handover parameter is provided. The method includes:

acquiring a global handover performance parameter $R_i$, a local handover performance parameter $r_i$, and a handover parameter of an $i^{th}$ cell that are within a preset time;

detecting a handover problem, existing within the preset time, of the $i^{th}$ cell according to $R_i$ and $r_i$;

receiving a global handover performance parameter, a local handover performance parameter, a handover parameter, and indication information for a handover problem, within the preset time, of each adjacent cell that are sent by all adjacent cells of the $i^{th}$ cell, where a global handover performance parameter of a $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell; and optimizing, if it is determined according to the handover problem of the $i^{th}$ cell, the handover problems of all the adjacent cells, and $R_i$, $r_i$, $R_j$, and $r_j$ which are within the preset time that the $i^{th}$ cell is a cell to be optimized, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time.

In an implementation of the first aspect, the handover parameter of the $i^{th}$ cell includes a hysteresis $H_i$, a time to trigger and individual offsets between the $i^{th}$ cell and all the adjacent cells, where an individual offset between the $i^{th}$ cell and the $j^{th}$ adjacent cell is represented by $O_{ij}$.

In an implementation of the first aspect, the global handover performance parameter $R_i$ of the $i^{th}$ cell includes a ratio $R_i^1$ of a sum of quantities of times that a too late handover of user equipment in the $i^{th}$ cell to all the adjacent cells occurs within the preset time to a total quantity of times that the user equipment in the $i^{th}$ cell is handed over to all the adjacent cells. The global handover performance parameter $R_i$ of the $i^{th}$ cell also includes a ratio $R_i^2$ of a sum of quantities of times that a too early handover of the user equipment in the $i^{th}$ cell to all the adjacent cells occurs within the preset time to a total quantity of times that the user equipment in the $i^{th}$ cell sends a handover request to all the adjacent cells. The global handover performance parameter $R_i$ of the $i^{th}$ cell further includes a ratio $R_i^3$ of a sum of quantities of times that a ping-pong handover of the user equipment in the $i^{th}$ cell to all the adjacent cells occurs within the preset time to a total quantity of times that the user equipment in the $i^{th}$ cell sends a handover request to all the adjacent cells. The local handover performance parameter $r_i$ of the $i^{th}$ cell includes a ratio $r_{ij}^1$ of a quantity of times that a too late handover of the user equipment in the $i^{th}$ cell to the $j^{th}$ adjacent cell occurs within the preset time to a total quantity of times that the user equipment in the $i^{th}$ cell is handed over to the $j^{th}$ adjacent cell. The local handover performance parameter $r_i$ of the $i^{th}$ cell also includes a ratio $r_{ij}^2$ of a quantity of times that a too early handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell. The local handover performance parameter $r_i$ of the $i^{th}$ cell further includes a ratio $r_{ij}^3$ of a quantity of times that a ping-pong handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell.

In an implementation of the first aspect, the handover problem includes a global handover problem and a local handover problem, where the global handover problem includes a global too late handover problem and a global too early handover or ping-pong handover problem, and the local handover problem includes a local too late handover problem and a local too early handover or ping-pong handover problem.

In an implementation of the first aspect, the detecting a handover problem, existing within the preset time, of the $i^{th}$ cell according to $R_i$ and $r_i$ includes:

determining that a global too late handover problem and a global too early handover or ping-pong handover problem exist in the $i^{th}$ cell, in response to a determination that both a too late handover and a too early handover or a ping-pong handover exist between the $i^{th}$ cell and A adjacent cells, where A is greater than or equal to ½ of a total quantity of all the adjacent cells of the $i^{th}$ cell;

determining that a global too late handover problem exists in the $i^{th}$ cell, in response to a determination that $R_i^1$ of the $i^{th}$ cell is greater than a first preset threshold, and it is determined that a too late handover exists between the $i^{th}$ cell and s adjacent cells, and that no too early handover or ping-pong handover exists between the $i^{th}$ cell and all the adjacent cells, where s is greater than or equal to ½ of a total quantity of all the adjacent cells of the $i^{th}$ cell;

determining that a global too early handover or ping-pong handover problem exists in the $i^{th}$ cell, in response to a determination that a sum of $R_i^2$ and $R_i^3$ of the $i^{th}$ cell is greater than a second preset threshold, it is determined that a too early handover or a ping-pong handover exists between the $i^{th}$ cell and t adjacent cells, and it is determined that no too late handover exists between the $i^{th}$ cell and all the adjacent cells, where t is greater than or equal to ½ of a total quantity of all the adjacent cells of the $i^{th}$ cell;

determining that a local too late handover problem exists in the $i^{th}$ cell, in response to a determination that no global handover problem exists in the $i^{th}$ cell, and that a too late handover exists between the $i^{th}$ cell and a $k^{th}$ adjacent cell, where the $k^{th}$ adjacent cell is any adjacent cell whose $r_{ik}^1$ is greater than the first preset threshold; and determining that a local too early handover or ping-pong handover problem exists in the $i^{th}$ cell, in response to a determination that no global handover problem exists in the $i^{th}$ cell, and that a too early handover or a ping-pong handover exists between the $i^{th}$ cell and an $m^{th}$ adjacent cell, where the $m^{th}$ adjacent cell is any adjacent cell whose $r_{im}^2$ or $r_{im}^3$ is greater than the second preset threshold.

In an implementation of the first aspect, the determining according to the handover problem of the $i^{th}$ cell, the handover problems of all the adjacent cells, and $R_i$, $r_i$, $R_j$, and $r_j$ which are within the preset time that the $i^{th}$ cell is a cell to be optimized includes:

determining that the $i^{th}$ cell is a cell to be optimized, in response to a determination that a global handover problem exists in the any adjacent cell, that a global handover problem exists in the $i^{th}$ cell, and that a weighted sum of $R_i^1$, $R_i^2$, and $R_i^3$ of the $i^{th}$ cell is greater than a weighted sum of $R_j^1$, $R_j^2$, and $R_j^3$ of each adjacent cell in which a global handover problem exists; or determining that the $i^{th}$ cell is a cell to be optimized, in response to a determination that a global handover problem exists in the any adjacent cell, that a global handover problem exists in the $i^{th}$ cell, and that a weighted sum of $R_i^1$, $R_i^2$, and $R_i^3$ of the $i^{th}$ cell is equal to a weighted sum of $R_j^1$, $R_j^2$, and $R_j^3$ of any adjacent cell in which a global handover problem exists, and it is determined that a sum of $R_i^1$ and $R_i^2$ of the $i^{th}$ cell is greater than a sum of $R_j^1$ and $R_j^2$ of each adjacent cell in which a global handover problem exists; or determining that the $i^{th}$ cell is a cell to be optimized, in response to a determination that a global handover problem exists in none of the adjacent cells, and that a global handover problem exists in the $i^{th}$ cell; or determining that the $i^{th}$ cell is a cell to be optimized, in response to a determination that a global handover problem exists in none of the adjacent cells, that no global handover problem exists in the $i^{th}$ cell, and that a local handover problem exists in the $i^{th}$ cell, and it is determined that a local handover problem exists in none of the adjacent cells; or determining that the $i^{th}$ cell is a cell to be optimized, in response to a determination that a global handover problem exists in none of the adjacent cells, that no global handover problem exists in the $i^{th}$ cell, and that a local handover problem exists in the $i^{th}$ cell, and it is determined that a local handover problem exists in any one of the adjacent cells, and that a weighted sum of $r_{ib}^1$, $r_{ib}^2$, and $r_{ib}^3$ of the $i^{th}$ cell with respect to a $b^{th}$ adjacent cell is greater than or equal to a weighted sum of $r_{bi}^1$, $r_{bi}^2$, and $r_{bi}^3$ of the $b^{th}$ adjacent cell with respect to the $i^{th}$ cell, where the $b^{th}$ adjacent cell is any one of adjacent cells in which a local handover problem exists.

In an implementation of the first aspect, the optimizing, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time includes:

setting, according to a global handover problem that exists in the $i^{th}$ cell, search space $\chi$ of the global handover problem;

acquiring $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n=\{x'_{ij}(c): j=1, \ldots, J, c=1, \ldots, n\}$, $x'_{ij}=x_i-z_{ij}$, $x_i=(H_i,T_i)^T$, and $z_{ij}=(O_{ij},0)^T$; $U_n=\{u'_{ij}(c): j=1, \ldots, J, c=1, \ldots, n\}$, $u'_{ij}=u_{ij}-v_{ij}$, $u_{ij}(H_i,T_i,H_j,T_j)^T$, and $v_{ij}(O_{ij}, 0, O_{ji}, 0)^T$; $Q_n$ is a sampled value of a function $F_i(x_i, z_{ij})$ of an indicator $L\_RLF_i$ of a link failure caused by a global too late handover from the $i^{th}$ cell to the $j^{th}$ adjacent cell, $F_i(x_i,z_{ij})=\Sigma_{j=1}^{J} w_{ij}^1 f(x_i-z_{ij})$, and $w_{ij}^1$ is a preset weighted value; and $Y_n$ is a sampled value of a function $G_i(u_{ij},v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, $G_i(u_{ij},v_{ij})=\Sigma_{j=1}^{J_i} W_{ij} g_{ij}(u_{ij}-v_{ij})$, and $W_{ij}$ is a preset weighted value, where $H_j$ is a hysteresis of the $j^{th}$ adjacent cell, $T_j$ is a time to trigger of the $j^{th}$ adjacent cell, and $O_{ji}$ is an individual offset between the $j^{th}$ adjacent cell and the $i^{th}$ cell;

calculating $$\tilde{x}_i(n+1) = \underset{x_i \in \chi}{\arg\min} L_i^n(x_i)$$

according to the Gaussian process regression model within the search space $\chi$ of the global handover problem, where $x_i$ is a variable of a handover parameter, $\tilde{x}_i(n+1)$ is an optimized handover parameter, to be calculated, of the $i^{th}$ cell within a new preset time, $L_i^n(\bullet)$ is a customized function and $L_i^n(x_i)=w^T(\mu_i(x_i|X_n,Q_n,U_n,Y_n)-C\sigma_i(x_i|X_n,Q_n,U_n,Y_n))$, $w^T$ is a weighted value of each handover performance parameter, $\mu_i(\bullet)$ is a mean value of a Gaussian function, $\sigma_i(\bullet)$ is a variance of the Gaussian function, and C is a compromise factor specified in advance; and using $\tilde{x}_i(n+1)$ as an optimized handover parameter, within the new preset time, calculated according to the preset Gaussian process regression model, for the handover parameter corresponding to the global handover problem of the $i^{th}$ cell.

In an implementation of the first aspect, when the handover problem of the $i^{th}$ cell is a global too late handover problem, the search space $\chi$ is $[H_{min},H_i] \times [T_{min},T_i]$, where $H_{min}$ represents a lower limit, of a value range of a hysteresis H, regulated in the standards, $T_{min}$ represents a lower limit, of a value range of a time to trigger T, regulated in the standards, $H_i$ represents a hysteresis, within the preset time, of the $i^{th}$ cell, and $T_i$ represents a time to trigger, within the preset time, of the $i^{th}$ cell; or when the handover problem of the $i^{th}$ cell is a global too early handover or ping-pong handover problem, the search space $\chi$ is $[H_i,H_{max}] \times [T_i,T_{max}]$, where $H_{max}$ represents an upper limit, of a value range of a hysteresis H, regulated in the standards, and $T_{max}$ represents an upper limit, of a value range of a time to trigger T, regulated in the standards.

In an implementation of the first aspect, the optimizing, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time includes:

setting, according to a local handover problem that exists in the $i^{th}$ cell, search space Z of the local handover problem;

acquiring $\{X_n,Q_n,U_n,Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n=\{x'_{ij}(c): j=1, \ldots, J, c=1, \ldots, n\}$, $x'_{ij}=x_i-z_{ij}$, $x_i=(H_i,T_i)^T$, and $z_{ij}=(O_{ij},0)^T$; $U_n=\{u'_{ij}(c): j=1, \ldots, J, c=1, \ldots, n\}$, $u'_{ij}=u_{ij}-v_{ij}$, $u_{ij}(H_i,T_i,H_j,T_j)^T$, and $v_{ij}(O_{ij}, 0, O_{ji}, 0)^T$; $Q_n$ is a sampled value of a function $F_i(x_i,z_{ij})$ of an indicator $L\_RLF_i$ of a link failure caused by a global too late handover from the $i^{th}$ cell to the $j^{th}$ adjacent cell, $F_i(x_i,z_{ij})=\Sigma_{j=1}^{J} w_{ij}^1 f(x_i-z_{ij})$, and $w_{ij}^1$ is a preset weighted value; and $Y_n$ is a sampled value of a function $G_i(u_{ij},v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, $G_i(u_{ij},v_{ij})=\Sigma_{j=1}^{J_i} W_{ij} g_{ij}(u_{ij}-v_{ij})$, and $W_{ij}$ is a preset weighted value, where $H_j$ is a hysteresis of the $j^{th}$ adjacent cell, $T_j$ is a time to trigger of the $j^{th}$ adjacent cell, and $O_{ji}$ is an individual offset between the $j^{th}$ adjacent cell and the $i^{th}$ cell;

calculating $$\tilde{z}_{ij}(n+1) = \underset{z_{ij} \in Z}{\arg\min} l_{ij}^n(z_{ij})$$

according to a Gaussian process regression model within the search space Z of the local handover problem, where $z_{ij}$ is a variable of a handover parameter, $\tilde{z}_{ij}(n+1)$ is an optimized handover parameter, to be calculated, of the $i^{th}$ cell within a new preset time, $l_{ij}^n(\bullet)$ is a customized function and $l_{ij}^n(z_{ij})=w^T(\mu_{ij}(z_{ij}|X_n,Q_n,U_n,Y_n)-C\sigma_{ij}(z_{ij}|X_n,Q_n,U_n,Y_n))$, $w^T$ is a weighted value of each handover performance parameter, $\mu_{ij}(\bullet)$ is a mean value of a Gaussian function, $\sigma_{ij}(\bullet)$ is a variance of the Gaussian function, and C is a compromise factor specified in advance; and using $\tilde{z}_{ij}(n+1)$ as an optimized handover parameter, within the new preset time, calculated according to the preset Gaussian process regression model, for the handover parameter corresponding to the local handover problem of the $i^{th}$ cell.

In an implementation of the first aspect, when the handover problem of the $i^{th}$ cell is a local too late handover problem, the search space Z is $[O_{ij}, O_{max}]$, where $O_{max}$ represents an upper limit, of a value range of a cell individual offset O, regulated in the standards, and $O_{ij}$ represents an individual offset between the $i^{th}$ cell and the $j^{th}$ adjacent cell; or when the handover problem of the $i^{th}$ cell is a local too early handover or ping-pong handover problem, the search space Z is $[O_{min},O_{ij}]$, where $O_{min}$ represents a lower limit, of a value range of a cell individual offset O, regulated in the standards.

In an implementation of the first aspect, when handover problems that exist in the $i^{th}$ cell include both a global too late handover problem and a global too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the global too late handover problem and an optimized handover parameter, within the new preset time, calculated for the global too early handover or ping-pong handover problem; or when handover problems that exist in the $i^{th}$ cell include both a local too late handover problem and a local too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the local too late handover problem and an optimized handover parameter within the new preset time calculated for the local too early handover or ping-pong handover problem.

In an implementation of the first aspect, before the acquiring a global handover performance parameter $R_i$, a local handover performance parameter $r_i$, and a handover parameter of an $i^{th}$ cell that are within a preset time, the method further includes:

classifying users in the $i^{th}$ cell into at least two types of users according to movement speeds of the users in the $i^{th}$ cell;

wherein the acquiring a global handover performance parameter $R_i$, a local handover performance parameter $r_i$, and a handover parameter of an $i^{th}$ cell that are within a preset time includes acquiring a global handover performance parameter $R_i$, a local handover performance parameter $r_i$, and a handover parameter of a first-type user in the $i^{th}$ cell within the preset time, where the first-type user is any one type of users of the at least two types of users into which the users in the $i^{th}$ cell are classified according to the movement speeds of the users in the $i^{th}$ cell, wherein the detecting a handover problem, existing within the preset time, of the $i^{th}$ cell according to $R_i$ and $r_i$ includes detecting a handover problem, existing within the preset time, of the first-type user in the $i^{th}$ cell according to $R_i$ and $r_i$ of the first-type user, wherein the receiving a global handover performance parameter, a local handover performance parameter, a handover parameter, and indication information for a handover problem, within the preset time, of each adjacent cell that are sent by all adjacent cells of the $i^{th}$ cell, where a global handover performance parameter of a $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell includes receiving a global handover performance parameter, a local handover performance parameter, a handover parameter, and indication information for a handover problem, within the preset time, of the first-type user in each adjacent cell that are sent by all the adjacent cells of the $i^{th}$ cell, where a global handover performance parameter of the first-type user in the $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell, and wherein the optimizing, if it is determined according to the handover problem of the $i^{th}$ cell, the handover problems of all the adjacent cells, and $R_i$, $r_i$, $R_j$, and $r_j$ which are within the preset time that the $i^{th}$ cell is a cell to be optimized, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time includes optimizing, according to $R_i$, $r_i$, $R_j$, and $r_j$, the handover parameter of the $i^{th}$ cell, and the handover parameters of the adjacent cells of the $i^{th}$ cell by using the data statistical regression method, a handover parameter corresponding to the handover problem of the first-type user in the $i^{th}$ cell, to acquire an optimized handover parameter of the first-type user in the $i^{th}$ cell within a new preset time, in response to a determination, according to the handover problem of the first-type user in the $i^{th}$ cell, the handover problems of the first-type users of all the adjacent cells, and $R_i$, $r_i$, $R_j$, and $r_j$ which are within the preset time, that the $i^{th}$ cell is a cell to be optimized.

In an implementation of the first aspect, the method further includes:

sending, to each adjacent cell of the $i^{th}$ cell, $R_i$, $r_i$, the handover parameter, and the indication information for the handover problem that are of the $i^{th}$ cell within the preset time.

According to a second aspect, a device for optimizing a handover parameter is provided. The device includes:

an acquiring unit, configured to acquire a global handover performance parameter Ri, a local handover performance parameter ri, and a handover parameter of an $i^{th}$ cell within a preset time;

a detection unit, configured to detect a handover problem, existing within the preset time, of the $i^{th}$ cell according to $R_i$ and $r_i$ that are acquired by the acquiring unit;

a receiving unit, configured to receive a global handover performance parameter, a local handover performance parameter, a handover parameter, and indication information for a handover problem, within the preset time, of each adjacent cell that are sent by all adjacent cells of the $i^{th}$ cell, where a global handover performance parameter of a $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell;

a determining unit, configured to determine, according to the handover problem, of the $i^{th}$ cell within the preset time, detected by the detection unit, the handover problems of all the adjacent cells and $R_i$, $r_i$, $R_j$, and $r_j$ that are received by the receiving unit, whether the $i^{th}$ cell is a cell to be optimized; and an optimization unit, configured to: if the determining unit determines according to the handover problem of the $i^{th}$ cell, the handover problems of all the adjacent cells, and $R_i$, $r_i$, $R_j$, and $r_j$ which are within the preset time that the $i^{th}$ cell is a cell to be optimized, optimize, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time.

In an implementation of the second aspect, the handover parameter of the $i^{th}$ cell includes: a hysteresis $H_i$, a time to trigger and individual offsets between the $i^{th}$ cell and all the adjacent cells, where an individual offset between the $i^{th}$ cell and the $j^{th}$ adjacent cell is represented by $O_{ij}$.

In an implementation of the second aspect, the global handover performance parameter $R_i$ of the $i^{th}$ cell includes a ratio $R_i^1$ of a sum of quantities of times that a too late handover of user equipment in the $i^{th}$ cell to all the adjacent cells occurs within the preset time to a total quantity of times that the user equipment in the $i^{th}$ cell is handed over to all the adjacent cells. The global handover performance parameter $R_i$ of the $i^{th}$ cell also includes a ratio $R_i^2$ of a sum of quantities of times that a too early handover of the user equipment in the $i^{th}$ cell to all the adjacent cells occurs within the preset time to a total quantity of times that the user equipment in the $i^{th}$ cell sends a handover request to all the adjacent cells. The global handover performance parameter $R_i$ of the $i^{th}$ cell further includes a ratio $R_i^3$ of a sum of quantities of times that a ping-pong handover of the user equipment in the $i^{th}$ cell to all the adjacent cells occurs within the preset time to a total quantity of times that the user equipment in the $i^{th}$ cell sends a handover request to all the adjacent cells. The local handover performance parameter ri of the $i^{th}$ cell includes a ratio $R_{ij}^1$ of a quantity of times that a too late handover of the user equipment in the $i^{th}$ cell to the $j^{th}$ adjacent cell occurs within the preset time to a total quantity of times that the user equipment in the $i^{th}$ cell is handed over to the $j^{th}$ adjacent cell. The local handover performance parameter $r_i$ of the $i^{th}$ cell also includes a ratio $r_{ij}^2$ of a quantity of times that a too early handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell. The local handover performance parameter $r_i$ of the $i^{th}$ cell further includes a ratio $r_{ij}^3$ of a quantity of times that a ping-pong handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell.

In an implementation of the second aspect, the handover problem includes a global handover problem and a local handover problem, where the global handover problem includes a global too late handover problem and a global too early handover or ping-pong handover problem, and where the local handover problem includes a local too late handover problem and a local too early handover or ping-pong handover problem.

In an implementation of the second aspect, the detection unit is configured to:
  determine that a global too late handover problem and a global too early handover or a ping-pong handover problem exist in the $i^{th}$ cell, in response to a determination that both a too late handover and a too early handover or a ping-pong handover exist between the $i^{th}$ cell and A adjacent cells, where a is greater than or equal to ½ of a total quantity of all the adjacent cells of the $i^{th}$ cell;
  determine that a global too late handover problem exists in the $i^{th}$ cell, in response to a determination that $R_i^1$ of the $i^{th}$ cell is greater than a first preset threshold, and it is determined that a too late handover exists between the $i^{th}$ cell and s adjacent cells, and that no too early handover or ping-pong handover exists between the $i^{th}$ cell and all the adjacent cells, where s is greater than or equal to ½ of a total quantity of all the adjacent cells of the $i^{th}$ cell;
  determine that a global too early handover or ping-pong handover problem exists in the $i^{th}$ cell, in response to a determination that a sum of $R_i^2$ and $R_i^3$ of the $i^{th}$ cell is greater than a second preset threshold, it is determined that a too early handover or a ping-pong handover exists between the $i^{th}$ cell and t adjacent cells, and it is determined that no too late handover exists between the $i^{th}$ cell and all the adjacent cells, where t is greater than or equal to ½ of a total quantity of all the adjacent cells of the $i^{th}$ cell;
  determine that a local too late handover problem exists in the $i^{th}$ cell, in response to a determination that no global handover problem exists in the $i^{th}$ cell, and that a too late handover exists between the $i^{th}$ cell and a $k^{th}$ adjacent cell, where the $k^{th}$ adjacent cell is any adjacent cell whose $r_{ik}^1$ is greater than the first preset threshold; and
  determine that a local too early handover or ping-pong handover problem exists in the $i^{th}$ cell, in response to a determination that no global handover problem exists in the $i^{th}$ cell, and that a too early handover or a ping-pong handover exists between the $i^{th}$ cell and an $m^{th}$ adjacent cell, where the $m^{th}$ adjacent cell is any adjacent cell whose $r_{im}^2$ or $r_{im}^3$ is greater than the second preset threshold.

In an implementation of the second aspect, the determining unit is configured to:
  determine that the $i^{th}$ cell is a cell to be optimized, if it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is greater than a weighted sum of $R_j^1$, $R_j^2$, and $R_j^3$ of each adjacent cell in which a global handover problem exists; or
  determine that the $i^{th}$ cell is a cell to be optimized, if it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is equal to a weighted sum of $R_j^1$, $R_j^2$, and $R_j^3$ of any adjacent cell in which a global handover problem exists, and it is determined that a sum of $R_i^1$ and $R_i^2$ of the $i^{th}$ cell is greater than a sum of $R_j^1$ and $R_j^2$ of each adjacent cell in which a global handover problem exists; or
  determine that the $i^{th}$ cell is a cell to be optimized, if it is determined that a global handover problem exists in none of the adjacent cells, and that a global handover problem exists in the $i^{th}$ cell; or
  determine that the $i^{th}$ cell is a cell to be optimized, if it is determined that a global handover problem exists in none of the adjacent cells, that no global handover problem exists in the $i^{th}$ cell, and that a local handover problem exists in the $i^{th}$ cell, and it is determined that a local handover problem exists in none of the adjacent cells; or
  determine that the $i^{th}$ cell is a cell to be optimized, if it is determined that a global handover problem exists in none of the adjacent cells, that no global handover problem exists in the $i^{th}$ cell, and that a local handover problem exists in the $i^{th}$ cell, and it is determined that a local handover problem exists in any one of the adjacent cells, and that a weighted sum of $r_{ib}^1$, $r_{ib}^2$, and $r_{ib}^3$ of the $i^{th}$ cell with respect to a $b^{th}$ adjacent cell is greater than or equal to a weighted sum of $r_{bi}^1$, $r_{bi}^2$, and $r_{bi}^3$ of the $b^{th}$ adjacent cell with respect to the $i^{th}$ cell, where the $b^{th}$ adjacent cell is any one of adjacent cells in which a local handover problem exists.

In an implementation of the second aspect, the optimization unit is configured to:

set, according to a global handover problem that exists in the $i^{th}$ cell, search space $\chi$ of the global handover problem;

acquire $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n = \{x'_{ij}(c): j=1, \ldots, J, c=1, \ldots, n\}$, $x'_{ij} = x_i - z_{ij}$, $x_i = (H_i, T_i)^T$, and $z_{ij} = (O_{ji}, 0)^T$; $U_n = \{u'_{ij}(c): j=1, \ldots, J, c=1, \ldots, n\}$, $u'_{ij} = i_j - v_{ij}$, $u_{ij} = (H_i, T_i, H_j, T_j)^T$, and $v_{ij} = (O_{ij}, 0, O_{ji}, 0)^T$; $Q_n$ is a sampled value of a function $F_i(x_i, z_{ij})$ of an indicator $L\_RLF_i$ of a link failure caused by a global too late handover from the $i^{th}$ cell to the $j^{th}$ adjacent cell, $F_i(x_i, z_{ij}) = \Sigma_{j=1}^J w_{ij}^1 f(x_i - z_{ij})$, and $w_{ij}^1$ is a preset weighted value; and $Y_n$ is a sampled value of a function $G_i(u_{ij}, v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, $G_i(u_{ij}, v_{ij}) = \Sigma_{j=1}^{J_i} W_{ij} g_{ij}(u_{ij} - v_{ij})$, and $W_{ij}$ is a preset weighted value, where $H_j$ is a hysteresis of the $j^{th}$ adjacent cell, $T_j$ is a time to trigger of the $j^{th}$ adjacent cell, and $O_{ji}$ is an individual offset between the $j^{th}$ adjacent cell and the $i^{th}$ cell;

calculate $$\tilde{x}_i(n+1) = \underset{x_i \in \chi}{\operatorname{argmin}} L_i^n(x_i)$$

according to the Gaussian process regression model within the search space $\chi$ of the global handover problem, where $x_i$ is a variable of a handover parameter, $\tilde{x}_i(n+1)$ is an optimized handover parameter, to be calculated, of the $i^{th}$ cell within a new preset time, $L_i^n(\bullet)$ is a customized function and $L_i^n(x_i) = w^T(\mu_i(x_i|X_n, Q_n, U_n, Y_n) - C\sigma_i(x_i|X_n, Q_n, U_n, Y_n))$, $w^T$ is a weighted value of each handover performance parameter, is $\mu_i(\bullet)$ is a mean value of a Gaussian function, $\sigma_i(\bullet)$ is a variance of the Gaussian function, and C is a compromise factor specified in advance; and use $\tilde{x}_i(n+1)$ as an optimized handover parameter, within the new preset time, calculated according to the preset Gaussian process regression model, for the handover parameter corresponding to the global handover problem of the $i^{th}$ cell.

In an implementation of the second aspect, in response to the handover problem of the $i^{th}$ cell being a global too late handover problem, the search space $\chi$ is $[H_{min}, H_i] \times [T_{min}, T_i]$, where $H_{min}$ represents a lower limit, of a value range of a hysteresis H, regulated in the standards, $T_{min}$ represents a lower limit, of a value range of a time to trigger T, regulated in the standards, $H_i$ represents a hysteresis, within the preset time, of the $i^{th}$ cell, and $T_i$ represents a time to trigger, within the preset time, of the $i^{th}$ cell; or in response to the handover problem of the $i^{th}$ cell being a global too early handover or ping-pong handover problem, the search space $\chi$ is $[H_i, H_{max}] \times [T_i, T_{max}]$, where $H_{max}$ represents an upper limit, of a value range of a hysteresis H, regulated in the standards, and $T_{max}$ represents an upper limit, of a value range of a time to trigger T, regulated in the standards.

In an implementation of the second aspect, the optimization unit is configured to:

set, according to a local handover problem that exists in the $i^{th}$ cell, search space Z of the local handover problem;

acquire $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n = \{x'_{ij}(c): j=1, \ldots, J, c=1, \ldots, n\}$, $x'_{ij} = x_i - z_{ij}$, $x_i = (H_i, T_i)^T$, and $z_{ij} = (O_{ij}, 0)^T$; $U_n = \{u'_{ij}(c): j=1, \ldots, c=1, \ldots, n\}$, $u'_{ij} = u_{ij} - v_{ij}$, $u_{ij} = (H_i, T_i, H_j, T_j)^T$, and $v_{ij} = (O_{ij}, 0, O_{ji}, 0)^T$; $Q_n$ is a sampled value of a function $F_i(x_i, z_{ij})$ of an indicator $L\_RLF_i$ of a link failure caused by a global too late handover from the $i^{th}$ cell to the $j^{th}$ adjacent cell, $F_i(x_i, z_{ij}) = \Sigma_{j=1}^J w_{ij}^1 f(x_i - z_{ij})$, and $w_{ij}^1$ is a preset weighted value; and $Y_n$ is a sampled value of a function $G_i(u_{ij}, v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, $G_i(u_{ij}, v_{ij}) = \Sigma_{j=1}^{J_i} W_{ij} g_{ij}(u_{ij} - v_{ij})$, and $W_{ij}$ is a preset weighted value, where $H_j$ is a hysteresis of the $j^{th}$ adjacent cell, $T_j$ is a time to trigger of the $j^{th}$ adjacent cell, and $O_{ji}$ is an individual offset between the $j^{th}$ adjacent cell and the $j^{th}$ cell;

calculate $$\tilde{z}_{ij}(n+1) = \underset{z_{ij} \in Z}{\operatorname{argmin}} l_{ij}^n(z_{ij})$$

according to a Gaussian process regression model within the search space Z of the local handover problem, where $z_{ij}$ is a variable of a handover parameter, $\tilde{z}_{ij}(n+1)$ is an optimized handover parameter, to be calculated, of the $i^{th}$ cell within a new preset time, $l_{ij}^n(\bullet)$ is a customized function and $l_{ij}^n(z_{ij}) = w^T(\mu_{ij}(z_{ij}|X_n, Q_n, U_n, Y_n) - C\sigma_{ij}(z_{ij}|X_n, Q_n, U_n, Y_n))$, $w^T$ is a weighted value of each handover performance parameter, $\mu_{ij}(\bullet)$ is a mean value of a Gaussian function, $\sigma_{ij}(\bullet)$ is a variance of the Gaussian function, and C is a compromise factor specified in advance; and use $\tilde{z}_{ij}(n+1)$ as an optimized handover parameter, within the new preset time, calculated according to the preset Gaussian process regression model, for the handover parameter corresponding to the local handover problem of the $i^{th}$ cell.

In an implementation of the second aspect, in response to the handover problem of the $i^{th}$ cell being a local too late handover problem, the search space Z is $[O_{ij}, O_{max}]$, where $O_{max}$ represents an upper limit, of a value range of a cell individual offset O, regulated in the standards, and $O_{ij}$ represents an individual offset between the $i^{th}$ cell and the $j^{th}$ adjacent cell; or in response to the handover problem of the $i^{th}$ cell being a local too early handover or ping-pong handover problem, the search space Z is [$O_{min}, O_{ij}$], where $O_{min}$ represents a lower limit, of a value range of a cell individual offset O, regulated in the standards.

In an implementation of the second aspect, when handover problems that exist in the $i^{th}$ cell include both a global too late handover problem and a global too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the global too late handover problem and an optimized handover parameter, within the new preset time, calculated for the global too early handover or ping-pong handover problem. Alternatively, or additionally, when handover problems that exist in the $i^{th}$ cell include both a local too late handover problem and a local too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the local too late handover problem and an optimized handover parameter within the new preset time calculated for the local too early handover or ping-pong handover problem.

In an implementation of the second aspect, the device further includes:
a classification unit, configured to classify users in the $i^{th}$ cell into at least two types of users according to movement speeds of the users in the $i^{th}$ cell;
correspondingly, the acquiring unit is configured to:
acquire a global handover performance parameter $R_i$, a local handover performance parameter $r_i$, and a handover parameter, within the preset time, of a first-type user in the $i^{th}$ cell, where the first-type user is any one type of users of the at least two types of users into which the users in the $i^{th}$ cell are classified according to the movement speeds of the users in the $i^{th}$ cell.

The detection unit is configured to:
detect a handover problem, existing within the preset time, of the first-type user in the $i^{th}$ cell according to $R_i$ and $r_i$, of the first-type user in the $i^{th}$ cell, acquired by the acquiring unit.

The receiving unit is configured to:
receive a global handover performance parameter, a local handover performance parameter, a handover parameter, and indication information for a handover problem, within the preset time, of the first-type user in each adjacent cell that are sent by all the adjacent cells of the $i^{th}$ cell, where a global handover performance parameter of the first-type user in the $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell.

The determining unit is configured to:
determine, according to the handover problem, of the first-type user in the $i^{th}$ cell within the preset time, detected by the detection unit, the handover problems of the first-type users in all the adjacent cells and $R_i$, $r_i$, $R_j$, and $r_j$ that are received by the receiving unit, whether the $i^{th}$ cell is a cell to be optimized.

The optimization unit is configured to:
optimize, according to $R_i$, $r_i$, $R_j$, and $r_j$, the handover parameter of the $i^{th}$ cell, and the handover parameters of the adjacent cells of the $i^{th}$ cell by using the data statistical regression method, a handover parameter corresponding to the handover problem of the first-type user in the $i^{th}$ cell, to acquire an optimized handover parameter of the first-type user in the $i^{th}$ cell within the new preset time, in response to the determining unit determining according to the handover problem of the first-type user in the $i^{th}$ cell within the preset time, the handover problems of the first-type users in all the adjacent cells, and $R_i$, $r_i$, $R_j$, and $r_j$ that the $i^{th}$ cell is a cell to be optimized.

In an implementation of the second aspect, the device further includes:
a sending unit, configured to send, to each adjacent cell of the $i^{th}$ cell, $R_i$, $r_i$, and the handover parameter of the $i^{th}$ cell that are within the preset time and acquired by the acquiring unit, and indication information, for the handover problem, detected by the detection unit.

According to a third aspect, a device for optimizing a handover parameter is provided, including a processor, a receiver, a sender, and a computer-readable storage medium storing a program to be executed by the processor. The program includes instructions for acquiring a global handover performance parameter Ri, a local handover performance parameter ri, and a handover parameter of an ith cell within a preset time; and
detecting a handover problem, existing within the preset time, of the $i^{th}$ cell according to $R_i$ and $r_i$. The receiver is configured to receive a global handover performance parameter, a local handover performance parameter, a handover parameter, and indication information for a handover problem, within the preset time, of each adjacent cell that are sent by all adjacent cells of the $i^{th}$ cell, where a global handover performance parameter of a $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell.

The program further includes instructions for determining, according to the handover problem of the $i^{th}$ cell within the preset time, handover problems, of all the adjacent cells, received by the receiver, and $R_i$, $r_i$, $R_j$, and $r_j$, whether the $i^{th}$ cell is a cell to be optimized. The program also includes instructions for optimizing, according to $R_i$, $r_i$, $R_j$, and $r_j$ the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time, in response to a determination, according to the handover problem of the $i^{th}$ cell, the handover problems of all the adjacent cells, $R_i$, $r_i$, $R_j$, and $r_j$ which are within the preset time, that the $i^{th}$ cell is a cell to be optimized.

In an implementation of the third aspect, the handover parameter of the $i^{th}$ cell includes: a hysteresis $H_i$, a time to trigger $T_i$, and individual offsets between the $i^{th}$ cell and all the adjacent cells, where an individual offset between the $i^{th}$ cell and the $j^{th}$ adjacent cell is represented by $O_{ij}$.

In an implementation of the third aspect, the global handover performance parameter $R_i$ of the $i^{th}$ cell includes: a ratio $R_i^1$ of a sum of quantities of times that a too late handover of user equipment in the $i^{th}$ cell to all the adjacent cells occurs within the preset time to a total quantity of times that the user equipment in the $i^{th}$ cell is handed over to all the adjacent cells; a ratio $R_i^2$ of a sum of quantities of times that a too early handover of the user equipment in the $i^{th}$ cell to all the adjacent cells occurs within the preset time to a total quantity of times that the user equipment in the $i^{th}$ cell sends a handover request to all the adjacent cells; and a ratio $R_i^3$ of a sum of quantities of times that a ping-pong handover of the user equipment in the $i^{th}$ cell to all the adjacent cells occurs within the preset time to a total quantity of times that the user equipment in the $i^{th}$ cell sends a handover request to all the adjacent cells; and the local handover performance parameter $r_i$ of the $i^{th}$ cell includes: a ratio $r_{ij}^1$ of a quantity of times that a too late handover of the user equipment in the $i^{th}$ cell to the $j^{th}$ adjacent cell occurs within the preset time to a total quantity of times that the user equipment in the $i^{th}$ cell is handed over to the $j^{th}$ adjacent cell; a ratio $r_{ij}^2$ of a quantity of times that a too early handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell; and a ratio $r_{ij}^3$ of a quantity of times that a ping-pong handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell.

In an implementation of the third aspect, the handover problem includes a global handover problem and a local handover problem, where the global handover problem includes a global too late handover problem and a global too early handover or ping-pong handover problem, and the local handover problem includes a local too late handover problem and a local too early handover or ping-pong handover problem.

In an implementation of the third aspect, the processor is configured to:

determine that a global too late handover problem and a global too early handover or a ping-pong handover problem exist in the $i^{th}$ cell, if it is determined that both a too late handover and a too early handover or a ping-pong handover exist between the $i^{th}$ cell and A adjacent cells, where A is greater than or equal to ½ of a total quantity of all the adjacent cells of the $i^{th}$ cell;

determine that a global too late handover problem exists in the $i^{th}$ cell, if it is determined that $R_i^1$ of the $i^{th}$ cell is greater than a first preset threshold, and it is determined that a too late handover exists between the $i^{th}$ cell and s adjacent cells, and that no too early handover or ping-pong handover exists between the $i^{th}$ cell and all the adjacent cells, where s is greater than or equal to ½ of a total quantity of all the adjacent cells of the $i^{th}$ cell;

determine that a global too early handover or ping-pong handover problem exists in the $i^{th}$ cell, if it is determined that a sum of $R_i^2$ and $R_i^3$ of the $i^{th}$ cell is greater than a second preset threshold, it is determined that a too early handover or a ping-pong handover exists between the $i^{th}$ cell and t adjacent cells, and it is determined that no too late handover exists between the $i^{th}$ cell and all the adjacent cells, where t is greater than or equal to ½ of a total quantity of all the adjacent cells of the $i^{th}$ cell;

determine that a local too late handover problem exists in the $i^{th}$ cell, if it is determined that no global handover problem exists in the $i^{th}$ cell, and that a too late handover exists between the $i^{th}$ cell and a $k^{th}$ adjacent cell, where the $k^{th}$ adjacent cell is any adjacent cell whose $r_{ik}^1$ is greater than the first preset threshold; and determine that a local too early handover or ping-pong handover problem exists in the $i^{th}$ cell, if it is determined that no global handover problem exists in the $i^{th}$ cell, and that a too early handover or a ping-pong handover exists between the $i^{th}$ cell and an $m^{th}$ adjacent cell, where the $m^{th}$ adjacent cell is any adjacent cell whose $r_{im}^2$ or $r_{im}^3$ is greater than the second preset threshold.

In an implementation of the third aspect, the processor is configured to:

determine that the $i^{th}$ cell is a cell to be optimized, if it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is greater than a weighted sum of $R_j^1$, $R_j^2$, and $R_j^3$ of each adjacent cell in which a global handover problem exists; or determine that the $i^{th}$ cell is a cell to be optimized, if it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is equal to a weighted sum of $R_j^1$, $R_j^2$, and $R_j^3$ of any adjacent cell in which a global handover problem exists, and it is determined that a sum of and $R_i^1$ and $R_i^2$ of the $i^{th}$ cell is greater than a sum of $R_j^1$ and $R_j^2$ of each adjacent cell in which a global handover problem exists; or determine that the $i^{th}$ cell is a cell to be optimized, if it is determined that a global handover problem exists in none of the adjacent cells, and that a global handover problem exists in the $i^{th}$ cell; or determine that the $i^{th}$ cell is a cell to be optimized, if it is determined that a global handover problem exists in none of the adjacent cells, that no global handover problem exists in the $i^{th}$ cell, and that a local handover problem exists in the $i^{th}$ cell, and it is determined that a local handover problem exists in none of the adjacent cells; or determine that the $i^{th}$ cell is a cell to be optimized, if it is determined that a global handover problem exists in none of the adjacent cells, that no global handover problem exists in the $i^{th}$ cell, and that a local handover problem exists in the $i^{th}$ cell, and it is determined that a local handover problem exists in any one of the adjacent cells, and that a weighted sum of $r_{ib}^1$, $r_{ib}^2$, and $r_{ib}^3$ of the $i^{th}$ cell with respect to a $b^{th}$ adjacent cell is greater than or equal to a weighted sum of $r_{bi}^1$, $r_{bi}^2$, and $r_{bi}^3$ of the $b^{th}$ adjacent cell with respect to the $i^{th}$ cell, where the $b^{th}$ adjacent cell is any one of adjacent cells in which a local handover problem exists.

In an implementation of the third aspect, the processor is configured to:

set, according to a global handover problem that exists in the $i^{th}$ cell, search space $\chi$ of the global handover problem;

acquire $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $r_i$, where $X_n=\{x'_{ij}(c): j=1, \ldots, J, c=1, \ldots, n\}$, $x'_{ij}=x_i-x_{ij}$, $x_i=(H_i,T_i)^T$, and $z_{ij}=(O_{ij},0)^T$; $U_n=\{u'_{ij}(c): j=1, \ldots, J, c=1, \ldots, n\}$, $u'_{ij}=u_{ij}-v_{ij}$, $u_{ij}=(H_i,T_i,H_j,T_j)^T$, and $v_{ij}=(O_{ij},0,O_{ji},0)^T$; $Q_n$ is a sampled value of a function $F_i(x_i,z_{ij})$ of an indicator $L\_RLF_i$ of a link failure caused by a global too late handover from the $i^{th}$ cell to the $j^{th}$ adjacent cell, $F_i(x_i,z_{ij})=\Sigma_{j=1}^J w_{ij}^1 f(x_i-z_{ij})$, and $w_{ij}^1$ is a preset weighted value; and $Y_n$ is a sampled value of a function $G_i(u_{ij},v_{ij})$ of superposition of an indicator E_RLF$_{ij}$ of a link failure caused by a global too early handover from the i$^{th}$ cell to the j$^{th}$ adjacent cell and an indicator PPH$_{ij}$ of a link failure caused by a ping-pong handover from the i$^{th}$ cell to the j$^{th}$ adjacent cell, $G_i(u_{ij},v_{ij}) = \sum_{j=1}^{J_i} W_{ij} g_{ij}(u_{ij}-v_{ij})$, and W$_{ij}$ is a preset weighted value, where H$_j$ is a hysteresis of the j$^{th}$ adjacent cell, T$_j$ is a time to trigger of the j$^{th}$ adjacent cell, and O$_{ji}$ is an individual offset between the j$^{th}$ adjacent cell and the i$^{th}$ cell;

calculate $$\tilde{x}_i(n+1) = \underset{x_i \in \chi}{\operatorname{argmin}} L_i^n(x_i)$$

according to the Gaussian process regression model within the search space $\chi$ of the global handover problem, where

- x$_i$ is a variable of a handover parameter, $\tilde{x}_i(n+1)$ is an optimized handover parameter, to be calculated, of the i$^{th}$ cell within a new preset time, $L_i^n(\bullet)$ is a customized function and $L_i^n(x_i) = w^T(\mu_i(x_i|X_n,Q_n,U_n,Y_n) - C\sigma_i(x_i|X_n,Q_n,U_n,Y_n))$, $w^T$ is a weighted value of each handover performance parameter, $\mu_i(\bullet)$ is a mean value of a Gaussian function, $\sigma_i(\bullet)$ is a variance of the Gaussian function, and C is a compromise factor specified in advance; and
- use $\tilde{x}_i(n+1)$ as an optimized handover parameter, within the new preset time, calculated according to the preset Gaussian process regression model, for the handover parameter corresponding to the global handover problem of the i$^{th}$ cell.

In an implementation of the third aspect, when the handover problem of the i$^{th}$ cell is a global too late handover problem, the search space $\chi$ is $[H_{min},H_i] \times [T_{min},T_i]$, where H$_{min}$ represents a lower limit, of a value range of a hysteresis H, regulated in the standards, in T$_{min}$ represents a lower limit, of a value range of a time to trigger T, regulated in the standards, H$_i$ represents a hysteresis, within the preset time, of the i$^{th}$ cell, and T$_i$ represents a time to trigger, within the preset time, of the i$^{th}$ cell; or when the handover problem of the i$^{th}$ cell is a global too early handover or ping-pong handover problem, the search space $\chi$ is $[H_i,H_{max}] \times [T_i,T_{max}]$, where H$_{max}$ represents an upper limit, of a value range of a hysteresis H, regulated in the standards, and T$_{max}$ represents an upper limit, of a value range of a time to trigger T, regulated in the standards.

In an implementation of the third aspect, the processor is configured to:

- set, according to a local handover problem that exists in the i$^{th}$ cell, search space Z of the local handover problem;
- acquire $\{X_n, Q_n, U_n, Y_n\}$ through calculation according to handover parameters at a current sampling moment and consecutive (n-1) sampling moments before the current sampling moment within the preset time, the global handover performance parameter R$_i$, and the local handover performance parameter r$_i$, where $X_n = \{x'_i(c): j=1, \ldots, J, c=1, \ldots, n\}$, $x'_{ij} = x_i - z_{ij}$, $x_i = (H_i, T_i)^T$, and $z_{ij} = (O_{ij}, 0)^T$; $U_n = \{u'_{ij}(c): j=1, \ldots, J, c=1, \ldots, n\}$, $u'_{ij} = u_{ij} - v_{ij}$, $u_{ij} = (H_i, T_i, H_j, T_j)^T$, and $v_{ij} = (O_{ji}, 0, O_{ji}, 0)^T$; Q$_n$ is a sampled value of a function $F_i(x_i, z_{ij})$ of an indicator L_RLF$_i$ of a link failure caused by a global too late handover from the i$^{th}$ cell to the j$^{th}$ adjacent cell, $F_i(x_i,z_{ij}) = \sum_{j=1}^{J} w_{ij}^1 f(x_i - z_{ij})$, and $w_{ij}^1$ is a preset weighted value; and Y$_n$ is a sampled value of a function $G_i(u_{ij}, v_{ij})$ of superposition of an indicator E_RLF$_{ij}$ of a link failure caused by a global too early handover from the i$^{th}$ cell to the j$^{th}$ adjacent cell and an indicator PPH$_{ij}$ of a link failure caused by a ping-pong handover from the i$^{th}$ cell to the j$^{th}$ adjacent cell, $G_i(u_{ij},v_{ij}) = \sum_{j=1}^{J_i} W_{ij} g_{ij}(u_{ij}-v_{ij})$, and W$_{ij}$ is a preset weighted value, where H$_j$ is a hysteresis of the j$^{th}$ adjacent cell, T$_j$ is a time to trigger of the j$^{th}$ adjacent cell, and O$_{ji}$ is an individual offset between the j$^{th}$ adjacent cell and the i$^{th}$ cell;

calculate $$\tilde{z}_{ij}(n+1) = \underset{z_{ij} \in Z}{\operatorname{argmin}} l_{ij}^n(z_{ij})$$

according to a Gaussian process regression model within the search space Z of the local handover problem, where z$_{ij}$ is a variable of a handover parameter, $\tilde{z}_{ij}(n+1)$ is an optimized handover parameter, to be calculated, of the i$^{th}$ cell within a new preset time, $l_{ij}^n(\bullet)$ is a customized function and $l_{ij}^n(z_{ij}) = w^T(\mu_{ij}(z_{ij}|X_n,Q_n,U_n,Y_n) - C\sigma_{ij}(z_{ij}|X_n,Q_n,U_n,Y_n))$, $w^T$ is a weighted value of each handover performance parameter, $\mu_{ij}(\bullet)$ is a mean value of a Gaussian function, $\sigma_{ij}(\bullet)$ is a variance of the Gaussian function, and C is a compromise factor specified in advance; and use $\tilde{z}_{ij}(n+1)$ as an optimized handover parameter, within the new preset time, calculated according to the preset Gaussian process regression model, for the handover parameter corresponding to the local handover problem of the i$^{th}$ cell.

In an implementation of the third aspect, when the handover problem of the i$^{th}$ cell is a local too late handover problem, the search space Z is $[O_{ij},O_{max}]$, where O$_{max}$ represents an upper limit, of a value range of a cell individual offset O, regulated in the standards, and O$_{ij}$ represents an individual offset between the i$^{th}$ cell and the j$^{th}$ adjacent cell; or when the handover problem of the i$^{th}$ cell is a local too early handover or ping-pong handover problem, the search space Z is $[O_{min},O_{ij}]$, where O$_{min}$ represents a lower limit, of a value range of a cell individual offset O, regulated in the standards.

In an implementation of the third aspect, when handover problems that exist in the i$^{th}$ cell include both a global too late handover problem and a global too early handover or ping-pong handover problem, the optimized handover parameter, within the new preset time, for the handover parameter corresponding to the handover problem of the i$^{th}$ cell is a weighted sum of an optimized handover parameter, within the new preset time, calculated for the global too late handover problem and an optimized handover parameter, within the new preset time, calculated for the global too early handover or ping-pong handover problem; or when handover problems that exist in the i$^{th}$ cell include both a local too late handover problem and a local too early handover or ping-pong handover problem, the optimized handover parameter, within the new preset time, for the handover parameter corresponding to the handover problem of the i$^{th}$ cell is a weighted sum of an optimized handover parameter, within the new preset time, calculated for the local too late handover problem and an optimized handover parameter within the new preset time calculated for the local too early handover or ping-pong handover problem.

In an implementation of the third aspect, program further includes instructions for:

classifying users in the $i^{th}$ cell into at least two types of users according to movement speeds of the users in the $i^{th}$ cell;

correspondingly, the processor is configured to:

acquire a global handover performance parameter $R_i$, a local handover performance parameter $r_i$, and a handover parameter, within the preset time, of a first-type user in the $i^{th}$ cell, where the first-type user is any one type of users of the at least two types of users into which the users in the $i^{th}$ cell are classified according to the movement speeds of the users in the $i^{th}$ cell;

detect a handover problem, existing within the preset time, of the first-type user in the $i^{th}$ cell according to $R_i$ and $r_i$, of the first-type user in the $i^{th}$ cell, acquired by the processor;

the receiver is further configured to receive a global handover performance parameter, a local handover performance parameter, a handover parameter, and indication information for a handover problem, within the preset time, of the first-type user in each adjacent cell that are sent by all the adjacent cells of the $i^{th}$ cell, where a global handover performance parameter of the first-type user in the $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell;

the processor is further configured to:

determine, according to the handover problem, of the first-type user in the $i^{th}$ cell within the preset time, detected by the processor, the handover problems of the first-type users in all the adjacent cells and $R_i$, $r_i$, $R_j$, and $r_j$ that are received by the receiver, whether the $i^{th}$ cell is a cell to be optimized; and if the processor determines according to the handover problem of the first-type user in the $i^{th}$ cell within the preset time, the handover problems of the first-type users in all the adjacent cells, and $R_i$, $r_i$, $R_j$, and $r_j$ that the $i^{th}$ cell is a cell to be optimized, optimize, according to $R_i$, $r_i$, $R_j$, and $r_j$, the handover parameter of the $i^{th}$ cell and the handover parameters of the adjacent cells of the $i^{th}$ cell by using the data statistical regression method, a handover parameter corresponding to the handover problem of the first-type user in the $i^{th}$ cell, to acquire an optimized handover parameter of the first-type user in the $i^{th}$ cell within the new preset time.

In an implementation of the third aspect, the device further includes:

the sender, configured to send, to each adjacent cell of the $i^{th}$ cell, $R_i$, $r_i$, and the handover parameter of the $i^{th}$ cell that are within the preset time, and indication information, for the handover problem, detected by the processor.

According to the method and device for optimizing a handover parameter provided in the embodiments of the present disclosure, all cells separately acquire a global handover performance parameter R, a local handover performance parameter r, and a handover parameter of a respective cell that are within a preset time; detect handover problem, existing within the preset time, of the respective cell according to R and r; receive a global handover performance parameter, a local handover performance parameter, a handover parameter, and indication information for a handover problem, within the preset time, of each adjacent cell that are sent by all adjacent cells; determine whether the respective cell is a cell to be optimized; and if an $i^{th}$ cell is a cell to be optimized, optimize, according to $R_i$, $r_i$, $R_j$, and $r_j$, a handover parameter of the $i^{th}$ cell, and the handover parameters of the adjacent cells of the $i^{th}$ cell by using a data statistical regression method, a handover parameter corresponding to a handover problem of the $i^{th}$ cell. Distributed selection of a cell to be optimized is implemented, so that optimization of a handover parameter of the cell to be optimized is beneficial to improvement of performance of an entire network, thereby resolving defects, during optimization of a handover parameter of a problematic cell according to a statistical observation method, of failing to consider optimization of an entire network and failing to improve performance of the entire network.

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present disclosure With reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

A method provided in the embodiments of the present disclosure may be applicable to various communications systems, for example, a Global System for Mobile Communications (GSM for short) network, a General Packet Radio Service technology (GPRS for short) network, a Wideband Code Division Multiple Access (WCDMA for short) network, a CDMA-2000 network, a Time Division-Synchronous Code Division Multiple Access (TD-SCDMA for short) network, or a Worldwide Interoperability for Microwave Access (WiMAX for short) network. The embodiments of the present disclosure are described below by using an example of a Long Term Evolution (LTE for short) network, and certainly the present disclosure is not limited to this scenario.

Embodiment 1

Figure 1:
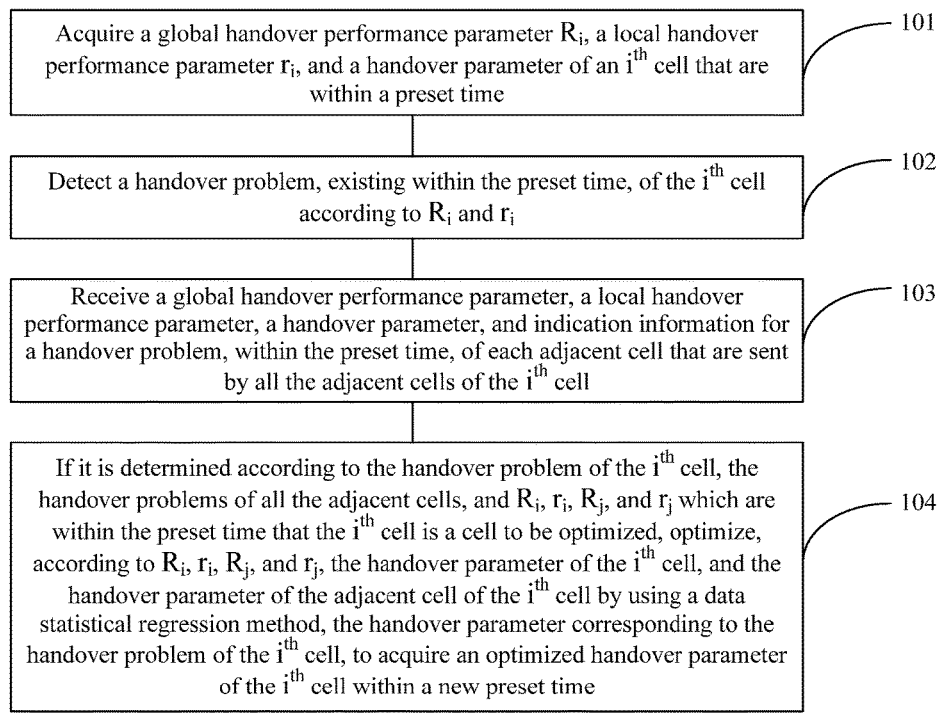
FIG. 1 is a schematic flowchart of a method for optimizing a handover parameter according to an embodiment of the present disclosure.

This embodiment of the present disclosure provides a method for optimizing a handover parameter. Referring to FIG. 1, the method may include step 101: Acquire a global handover performance parameter $R_i$, a local handover performance parameter $r_i$, and a handover parameter of an $i^{th}$ cell that are within a preset time.

The $i^{th}$ cell in this embodiment of the present disclosure is any cell. A cell in a system may be identified by using a cell number. This embodiment of the present disclosure is described by using an example of the $i^{th}$ cell. Certainly, an implementation process of handover parameter optimization for each cell is same or similar, and details are not described herein again.

In this embodiment of the present disclosure, sampling, statistics collection, and optimization are performed on a handover parameter according to the preset time, where sampling moments may be defined as moments of multiple times of sampling within the preset time, and duration between consecutive sampling moments may be set according to an actual need. For example, sampling may be performed at a sampling interval in the unit of millisecond or second, and statistics may be collected and optimization may be performed by using a preset time in the unit of minute or hour.

The handover parameter of the $i^{th}$ cell may include a hysteresis $H_i$, a time to trigger and individual offsets between the $i^{th}$ cell and all adjacent cells, where an individual offset between the $i^{th}$ cell and a $j^{th}$ adjacent cell is represented by $O_{ij}$.

The global handover performance parameter of the $i^{th}$ cell refers to performance of handovers between the $i^{th}$ cell and all the adjacent cells, and the global handover performance parameter $R_i$ of the $i^{th}$ cell may include a ratio $R_i^1$ of a sum of quantities of times that a too late handover of user equipment in the $i^{th}$ cell to all the adjacent cells occurs within the preset time to a total quantity of times that the user equipment in the $i^{th}$ cell is handed over to all the adjacent cells. The global handover performance parameter $R_i$ of the $i^{th}$ cell may also include a ratio $R_i^2$ of a sum of quantities of times that a too early handover of the user equipment in the $i^{th}$ cell to all the adjacent cells occurs within the preset time to a total quantity of times that the user equipment in the $i^{th}$ cell sends a handover request to all the adjacent cells. The global handover performance parameter $R_i$ of the $i^{th}$ cell may further include a ratio $R_i^3$ of a sum of quantities of times that a ping-pong handover of the user equipment in the $i^{th}$ cell to all the adjacent cells occurs within the preset time to a total quantity of times that the user equipment in the $i^{th}$ cell sends a handover request to all the adjacent cells, where the $j^{th}$ adjacent cell is any adjacent cell of all the adjacent cells of the $i^{th}$ cell, j=1, . . . , J, and J is a quantity of all the adjacent cells of the $i^{th}$ cell.

The local handover performance parameter of the $i^{th}$ cell refers to performance of a handover between the $i^{th}$ cell and an adjacent cell, and the local handover performance parameter $r_i$ of the $i^{th}$ cell may include the following. A ratio $r_{ij}^1$ of a quantity of times that a too late handover of the user equipment in the $i^{th}$ cell to the $j^{th}$ adjacent cell occurs within the preset time to a total quantity of times that the user equipment in the $i^{th}$ cell is handed over to the $j^{th}$ adjacent cell; a ratio $r_{ij}^2$ of a quantity of times that a too early handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell; and a ratio $r_{ij}^3$ of a quantity of times that a ping-pong handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell.

The method in FIG. 1 may include step 102: Detect a handover problem, existing within the preset time, of the $i^{th}$ cell according to $R_i$ and $r_i$.

The handover problem may include a global handover problem and a local handover problem, where the global handover problem includes a global too late handover problem and a global too early handover or ping-pong handover problem, and the local handover problem includes a local too late handover problem and a local too early handover or ping-pong handover problem.

Optionally, if it is determined that both a too late handover and a too early handover or a ping-pong handover exist between the $i^{th}$ cell and A adjacent cells, it is determined that a global too late handover problem and a global too early handover or ping-pong handover problem exist in the $i^{th}$ cell, where a is greater than or equal to ½ of a total quantity of all the adjacent cells of the $i^{th}$ cell.

Optionally, if it is determined that $R_i^1$ of the $i^{th}$ cell is greater than a first preset threshold, and it is determined that a too late handover exists between the $i^{th}$ cell and s adjacent cells, and that no too early handover or ping-pong handover exists between the $i^{th}$ cell and all the adjacent cells, it is determined that a global too late handover problem exists in the $i^{th}$ cell, where s is greater than or equal to ½ of a total quantity of all the adjacent cells of the $i^{th}$ cell.

Optionally, if it is determined that a sum of $R_i^2$ and $R_i^3$ of the $i^{th}$ cell is greater than a second preset threshold, it is determined that a too early handover or a ping-pong handover exists between the $i^{th}$ cell and t adjacent cells, and it is determined that no too late handover exists between the $i^{th}$ cell and all the adjacent cells, it is determined that a global too early handover or ping-pong handover problem exists in the $i^{th}$ cell, where t is greater than or equal to ½ of a total quantity of all the adjacent cells of the $i^{th}$ cell.

Optionally, if it is determined that no global handover problem exists in the $i^{th}$ cell, and that a too late handover exists between the $i^{th}$ cell and a $k^{th}$ adjacent cell, it is determined that a local too late handover problem exists in the $i^{th}$ cell, where the $k^{th}$ adjacent cell is any adjacent cell whose $r_{ik}^1$ is greater than the first preset threshold.

Optionally, if it is determined that no global handover problem exists in the $i^{th}$ cell, and that a too early handover or a ping-pong handover exists between the $i^{th}$ cell and an $m^{th}$ adjacent cell, it is determined that a local too early handover or ping-pong handover problem exists in the $i^{th}$ cell, where the $m^{th}$ adjacent cell is any adjacent cell whose $r_{im}^2$ or $r_{im}^3$ is greater than the second preset threshold.

The method in FIG. 1 may include step 103: Receive a global handover performance parameter, a local handover performance parameter, a handover parameter, and indication information for a handover problem, within the preset time, of each adjacent cell that are sent by all the adjacent cells of the $i^{th}$ cell.

A global handover performance parameter of the $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell.

The method in FIG. 1 may include step 104: If it is determined according to the handover problem of the $i^{th}$ cell, the handover problems of all the adjacent cells, and $R_i$, $r_i$, $R_j$, and $r_j$ which are within the preset time that the $i^{th}$ cell is a cell to be optimized, optimize, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time.

A process of determining according to the handover problem of the $i^{th}$ cell, the handover problems of all the adjacent cells, and $R_i$, $r_i$, $R_j$, and $r_j$ which are within the preset time that the $i^{th}$ cell is a cell to be optimized may include the following.

Determining that the $i^{th}$ cell is a cell to be optimized, if it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is greater than a weighted sum of $R_j^1$, $R_j^2$, and $R_j^3$ of each adjacent cell in which a global handover problem exists; or determining that the $i^{th}$ cell is a cell to be optimized, if it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is equal to a weighted sum of $R_j^1$, $R_j^2$, and $R_j^3$ of any adjacent cell in which a global handover problem exists, and it is determined that a sum of $R_i^1$ and $R_i^2$ of the $i^{th}$ cell is greater than a sum of $R_j^1$ and $R_j^2$ of each adjacent cell in which a global handover problem exists; or determining that the $i^{th}$ cell is a cell to be optimized, if it is determined that a global handover problem exists in none of the adjacent cells, and that a global handover problem exists in the $i^{th}$ cell; or determining that the $i^{th}$ cell is a cell to be optimized, if it is determined that a global handover problem exists in none of the adjacent cells, that no global handover problem exists in the $i^{th}$ cell, and that a local handover problem exists in the $i^{th}$ cell, and it is determined that a local handover problem exists in none of the adjacent cells; or determining that the $i^{th}$ cell is a cell to be optimized, if it is determined that a global handover problem exists in none of the adjacent cells, that no global handover problem exists in the $i^{th}$ cell, and that a local handover problem exists in the $i^{th}$ cell, and it is determined that a local handover problem exists in any one of the adjacent cells, and that a weighted sum of $R_{ib}^1$, $r_{ib}^2$, and $r_{ib}^3$ of the $i^{th}$ cell with respect to a $b^{th}$ adjacent cell is greater than or equal to a weighted sum of $r_{bi}^1$, $r_{bi}^2$, and $r_{bi}^3$ of the $b^{th}$ adjacent cell with respect to the $i^{th}$ cell, where the $b^{th}$ adjacent cell is any one of adjacent cells in which a local handover problem exists.

A process of optimizing, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time is related to the existing handover problem of the $i^{th}$ cell within the preset time, and may include the following two methods.

In a first method, when the existing handover problem of the $i^{th}$ cell within the preset time is a global handover problem, the process of optimizing, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time is as follows:

setting, according to a global handover problem that exists in the $i^{th}$ cell, search space $\chi$ of the global handover problem, where optionally, when the handover problem of the $i^{th}$ cell is a global too late handover problem, the search space $\chi$ is $[H_{min}, H_i] \times [T_{min}, T_i]$, that is, combined two-dimensional search space with ranges being $[H_{min}, H_i]$ and $[T_{min}, T_i]$ involving two handover parameters H and T respectively, where $H_{min}$ represents a lower limit, of a value range of a hysteresis H, regulated in the standards, and $T_{min}$ represents a lower limit, of a value range of a time to trigger T, regulated in the standards; or when the handover problem of the $i^{th}$ cell is a global too early handover or ping-pong handover problem, the search space $\chi$ is $[H_i, H_{max}] \times [T_i, T_{max}]$, that is, combined two-dimensional search space with ranges being $[H_i, H_{max}]$ and $[T_i, T_{max}]$ that are formed of two handover parameters H and T respectively, where $H_{max}$ represents an upper limit, of a value range of a hysteresis H, regulated in the standards, and $T_{max}$ represents an upper limit, of a value range of a time to trigger T, regulated in the standards. The first method may further include acquiring $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n = \{x'_{ij}(c): j=1, \ldots, J, c=1, \ldots, n\}$, $x'_{ij} = x_i - x_{ij}$, $x_i = (H_i, T_i)^T$, and $z_{ij} = (O_{ij}, 0)^T$; $U_n = \{u'_{ij}(c): j=1, \ldots, J, c=1, \ldots, n\}$, $u'_{ij} = u_{ij} - v_{ij}$, $u_{ij} = (H_i, T_i, H_j, T_j)^T$, and $v_{ij} = (O_{ij}, 0, O_{ji}, 0)^T$; $Q_n$ is a sampled value of a function $F_i(x_i, z_{ij})$ of an indicator $L\_RLF_i$ of a link failure caused by a global too late handover from the $i^{th}$ cell to the $j^{th}$ adjacent cell, $F_i(x_i, z_{ij}) = \Sigma_{j=1}^J w_{ij}^1 f(x_i - z_{ij})$, and $w_{ij}^1$ is a preset weighted value; and $Y_n$ is a sampled value of a function $G_i(u_{ij}, v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, $G_i(u_{ij}, v_{ij}) = \Sigma_{j=1}^J W_{ij} g_{ij}(u_{ij} - v_{ij})$, and $W_{ij}$ is a preset weighted value, where $H_j$ is a hysteresis of the $j^{th}$ adjacent cell, $T_j$ is a time to trigger of the $j^{th}$ adjacent cell, and $O_{ji}$ is an individual offset between the $j^{th}$ adjacent cell and the $i^{th}$ cell. The first method may further include calculating $$\tilde{x}_i(n+1) = \underset{x_i \in \chi}{\arg\min} L_i^n(x_i)$$

according to a Gaussian process regression model within the search space $\chi$ of the global handover problem, where x$_i$ is a variable of a handover parameter, $\tilde{x}_i(n+1)$ is an optimized handover parameter, to be calculated, of the $i^{th}$ cell within a new preset time, $L_i^n(\bullet)$ is a customized function and $L_i^n(x_i)=w^T(\mu_i(x_i|X_n,Q_n,U_n,Y_n)-C\sigma_i(x_i|X_n,Q_n,U_n,Y_n))$, $w^T$ represents a weighted value of each handover performance parameter, $\mu_i(\bullet)$ is a mean value of a Gaussian function, $\sigma_i(\bullet)$ is a variance of the Gaussian function, and C is a compromise factor specified in advance. The first method may further include using $\tilde{x}_i(n+1)$ as an optimized handover parameter, within the new preset time, calculated according to the preset Gaussian process regression model, for the handover parameter corresponding to the global handover problem of the $i^{th}$ cell.

In a second method, when the existing handover problem of the $i^{th}$ cell within the preset time is a local handover problem, the process of optimizing, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time is as follows:

setting, according to a local handover problem that exists in the $i^{th}$ cell, search space Z of the local handover problem, where optionally, when the handover problem of the $i^{th}$ cell is a local too late handover problem, the search space Z is $[O_{ij}, O_{max}]$, that is, one-dimensional search space with a range being $[O_{ij}, O_{max}]$ that is formed of a handover parameter O, where $O_{max}$ represents an upper limit, of a value range of a cell individual offset O, regulated in the standards, or when the handover problem of the $i^{th}$ cell is a local too early handover or ping-pong handover problem, the search space Z is $[O_{min}, O_{ij}]$, that is, one-dimensional search space with a range being $[O_{min}, O_{ij}]$ that is formed of a handover parameter O, where $O_{min}$ represents a lower limit, of a value range of a cell individual offset O, regulated in the standards. The second method may further include acquiring $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n=\{x'_{ij}(c): j=1, \ldots, J, c=1, \ldots, n\}$, $x'_{ij}=x_i-z_{ij}$, $x_i=(H_i,T_i)^T$, and $z_{ij}=(O_{ij},0)^T$; $U_n=\{u'_{ij}(c): j=1, \ldots, J, c=1, \ldots, n\}$, $u'_{ij}=u_{ij}-v_{ij}$, $u_{ij}=(H_i,T_i,H_j,T_j)^T$, and $v_{ij}=(O_{ij},0,O_{ji},0)^T$; $Q_n$ is a sampled value of a function $F_i(x_i,z_{ij})$ of an indicator $L\_RLF_i$ of a link failure caused by a global too late handover from the $i^{th}$ cell to the $j^{th}$ adjacent cell, $F_i(x_i,z_{ij})=\Sigma_{j=1}^J w_{ij}^1 f(x_i-z_{ij})$, and $w_{ij}^1$ is a preset weighted value; and $Y_n$ is a sampled value of a function $G_i(u_{ij},v_{ij})$ of superposition of an indicator $E\_RLF_{ij}$ of a link failure caused by a global too early handover from the $i^{th}$ cell to the $j^{th}$ adjacent cell and an indicator $PPH_{ij}$ a link failure caused by a ping-pong handover from the $i^{th}$ cell to the $j^{th}$ adjacent cell, $G_i(u_{ij},v_{ij})=\Sigma_{j=1}^J W_{ij} G_{ij}(u_{ij}-v_{ij})$, and $W_{ij}$ is a preset weighted value, where $H_j$ is a hysteresis of the $j^{th}$ adjacent cell, $T_j$ is a time to trigger of the $j^{th}$ adjacent cell, and $O_{ji}$ is an individual offset between the $j^{th}$ adjacent cell and the $i^{th}$ cell. The second method may further include calculating $$\tilde{z}_{ij}(n+1) = \underset{z_{ij}\in Z}{\operatorname{argmin}} l_{ij}^n(z_{ij})$$

according to a Gaussian process regression model within the search space Z of the local handover problem, where $z_{ij}$ is a variable of a handover parameter, $\tilde{z}_{ij}(n+1)$ is an optimized handover parameter, to be calculated, of the $i^{th}$ cell within a new preset time, $l_{ij}^n(\bullet)$ is a customized function and $l_{ij}^n(z_{ij})=w^T(\mu_{ij}(z_{ij}|X_n,Q_n,U_n,Y_n)-C\sigma_{ij}(z_{ij}|X_n,Q_n,U_n,Y_n))$, $w^T$ represents a weighted value of each handover performance parameter, $\mu_{ij}(\bullet)$ is a mean value of a Gaussian function, $\sigma_{ij}(\bullet)$ is a variance of the Gaussian function, and C is a compromise factor specified in advance. The second method may further include using $\tilde{z}_{ij}(n+1)$ as an optimized handover parameter, within the new preset time, calculated according to the preset Gaussian process regression model, for the handover parameter corresponding to the local handover problem of the $i^{th}$ cell.

Further, when handover problems that exist in the $i^{th}$ cell include both a global too late handover problem and a global too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the global too late handover problem and an optimized handover parameter, within the new preset time, calculated for the global too early handover or ping-pong handover problem; or when handover problems that exist in the $i^{th}$ cell include both a local too late handover problem and a local too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the local too late handover problem and an optimized handover parameter within the new preset time calculated for the local too early handover or ping-pong handover problem.

It should be noted that, the optimized handover parameter, within the new preset time, corresponding to the handover problem of the $i^{th}$ cell may be calculated by using the Gaussian process regression model, or may be calculated by using another data statistical regression model. A method used is not limited in this embodiment of the present disclosure.

Further, the method for optimizing a handover parameter may further include: sending, to each adjacent cell of the $i^{th}$ cell, $R_i$, $r_i$, the handover parameter, and the indication information for the handover problem that are of the $i^{th}$ cell within the preset time.

According to the method for optimizing a handover parameter provided in this embodiment of the present disclosure, each cell acquires a global handover performance parameter R, a local handover performance parameter r, and a handover parameter of a respective cell that are within a preset time; detects a handover problem, existing within the preset time, of the respective cell according to R and r; receives a global handover performance parameter, a local handover performance parameter, a handover parameter, and indication information for a handover problem, within the preset time, of each adjacent cell that are sent by all adjacent cells of the cell; determines whether the cell is a cell to be optimized; and if it is determined that an $i^{th}$ cell is a cell to be optimized, optimizes, according to $R_i$, $r_i$, $R_j$, and $r_j$, a handover parameter of the $i^{th}$ cell, and the handover parameters of the adjacent cells of the $i^{th}$ cell by using a data statistical regression method, a handover parameter corresponding to a handover problem of the $i^{th}$ cell. Distributed selection of a cell to be optimized is implemented, so that optimization of a handover parameter of the cell to be optimized is beneficial to improvement of performance of an entire network, thereby resolving defects, during optimization of a handover parameter of a problematic cell according to a statistical observation method, of failing to consider optimization of an entire network and failing to improve performance of the entire network.

Embodiment 2

Figure 2:
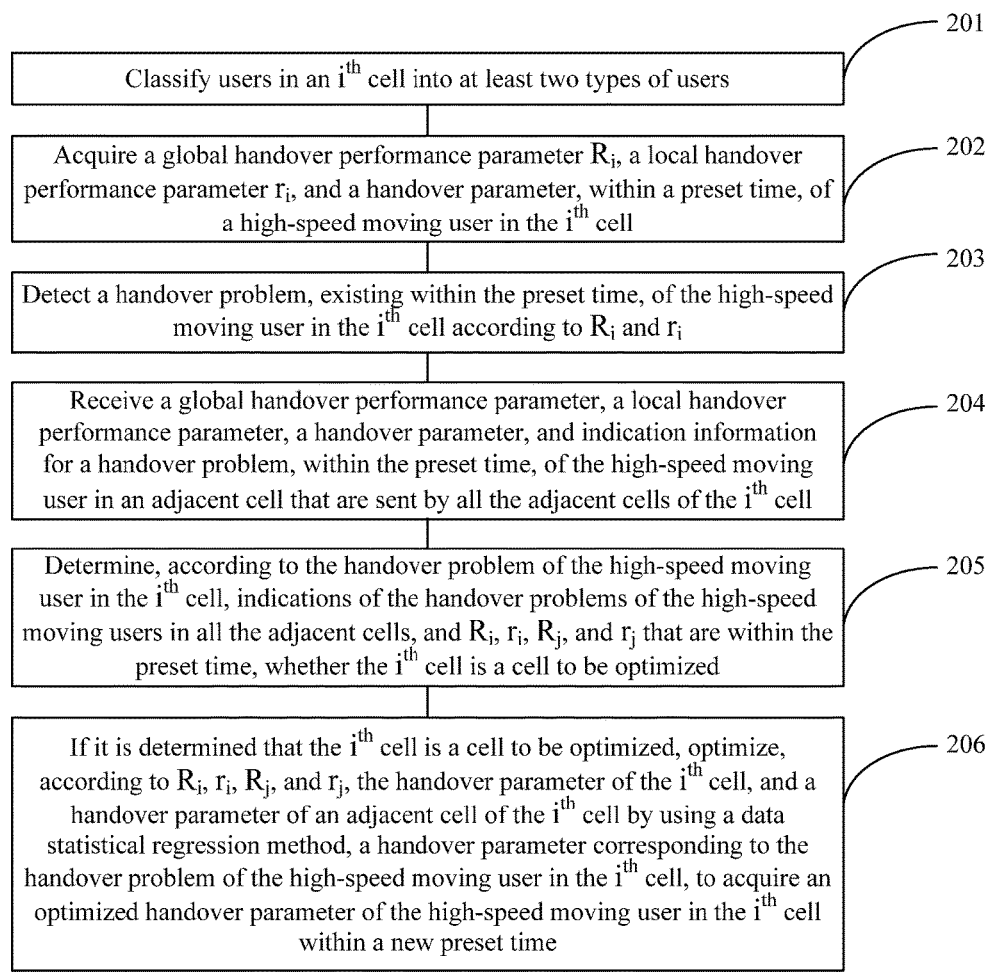
FIG. 2 is a schematic flowchart of another method for optimizing a handover parameter according to an embodiment of the present disclosure.

This embodiment of the present disclosure provides another method for optimizing a handover parameter. Referring to FIG. 2, the method may include step 201: Classify users in an $i^{th}$ cell into at least two types of users.

To improve precision of handover parameter optimizing, the users of the $i^{th}$ cell may be classified, and for each type of user, a handover parameter of the type of user is optimized separately. Because handover parameter optimization of the types of users is not interfered with one another, when different types of users need to optimize different handover parameters, more targeted optimization may be performed on a handover parameter that needs to be optimized by each type of user, thereby improving precision of handover parameter optimization.

For the users in the $i^{th}$ cell, classification may be performed according to movement speeds of the users in the $i^{th}$ cell, or may be performed according to another characteristic of the users in the $i^{th}$ cell, which is not limited in this embodiment of the present disclosure.

For example, in this embodiment, the users in the $i^{th}$ cell are classified into three types according to the movement speeds of the users in the $i^{th}$ cell: high-speed moving users, middle-speed moving users, and low-speed moving users separately.

Specific speeds for classifying the high-speed moving user, the middle-speed moving user, and the low-speed moving user may be set according to an actual need, and setting of specific speeds does not affect implementation of the objective of this embodiment of the present disclosure, and therefore is not limited herein in this embodiment of the present disclosure.

For each type of user, step 202 to step 206 may be performed independently, and a process of cell handover parameter optimization for each type of user is same or similar. Therefore, step 202 to step 206 in this embodiment are described by using only the high-speed moving user as an example.

It should be noted that, the users in the $i^{th}$ cell are classified into three types according to step 201, and in the present disclosure, a process of step 202 to step 206 needs to be performed for each type of user, so as to optimize a cell handover parameter to improve handover performance of the type of user, until handover problems of all types of users are resolved.

The method in FIG. 2 may further include step 202: Acquire a global handover performance parameter $R_i$, a local handover performance parameter $r_i$, and a handover parameter, within a preset time, of a high-speed moving user in the $i^{th}$ cell.

In this embodiment, sampling, statistics, and optimization are performed on a handover parameter according to the preset time, where sampling moments may be defined as moments of multiple times of sampling within the preset time, and duration between consecutive sampling moments may be set according to an actual need. For example, sampling may be performed at a sampling interval in the unit of millisecond or second, and statistics may be collected and optimization may be performed by using a preset time in the unit of minute or hour.

Exemplarily, in this embodiment of the present disclosure, a $j^{th}$ adjacent cell is any adjacent cell of the $i^{th}$ cell, where $j=1, \ldots, J$, and $J$ is a quantity of all adjacent cells of the $i^{th}$ cell.

Methods of acquiring a global handover performance parameter and a local handover performance parameter, and acquiring a handover parameter are separately introduced below.

For example, acquiring the global handover performance parameter $R_i$ and the local handover performance parameter $r_i$ may be:

acquiring $N_{L\_RLF_{ij}}$, $N_{E\_RLF_{ij}}$, $N_{PPH_{ij}}$, $N_{CALL_{ij}}$, $N_{HRQ_{ij}}$, $N_{CALL_i}$, and $N_{HRQ_i}$, within the preset time, of the high-speed moving user in the $i^{th}$ cell, where $N_{L\_RLF_{ij}}$ is a quantity of times that a too late handover of the high-speed moving user in the $i^{th}$ cell to the $j^{th}$ adjacent cell occurs within the preset time;

where $N_{E\_RLF_{ij}}$ is a quantity of times that a too early handover of the high-speed moving user in the $i^{th}$ cell to the $j^{th}$ adjacent cell occurs within the preset time;

where $N_{PPH_{ij}}$ is a quantity of times that a ping-pong handover of the high-speed moving user in the $i^{th}$ cell to the $j^{th}$ adjacent cell occurs within the preset time;

where $N_{CALL_{ij}}$ is a quantity of times that a handover of the high-speed moving user in the $i^{th}$ cell to the $j^{th}$ adjacent cell occurs in total;

where $N_{HRQ_{ij}}$ is a quantity of times that the high-speed moving user in the $i^{th}$ cell sends a handover request to the $j^{th}$ adjacent cell in total;

where $N_{CALL_i}$ is a quantity of times that a handover of the high-speed moving user in the $i^{th}$ cell to all the adjacent cells occurs in total; and where $N_{HRQ_i}$ is a quantity of times that the high-speed moving user in the $i^{th}$ cell sends a handover request to all the adjacent cells in total. Acquiring the global handover performance parameter $R_i$ and the local handover performance parameter $r_i$ may further include defining the local handover performance parameter of the high-speed moving user in the $i^{th}$ cell as:

$$r_{ij}^1 = N_{L\_RLF_{ij}}/N_{CALL_{ij}};$$

$$r_{ij}^2 = N_{E\_RLF_{ij}}/N_{HRQ_{ij}}; \text{ and}$$

$$r_{ij}^3 = N_{PPH_{ij}}/N_{HRQ_{ij}}; \text{ and}$$

defining the global handover performance parameter of the high-speed moving user in the $i^{th}$ cell as:

$$R_i^m = \sum_{j=1}^{J_i} \alpha_{ij}^m r_{ij}^m,$$

and $$\alpha_{ij}^m = \begin{cases} N_{CALL_{ij}}/N_{CALL_i}, & \text{if } m = 1 \\ N_{HRQ_{ij}}/N_{HRQ_i}, & \text{if } m = 2, 3 \end{cases}.$$

The handover parameter may be directly acquired by reading, from a base station configuration, a handover parameter, of the high-speed moving user, configured in the $i^{th}$ cell within the preset time.

The handover parameter of the high-speed moving user in the $i^{th}$ cell may include: a hysteresis $H_i$, a time to trigger $T_i$, and individual offsets between the high-speed moving user in the $i^{th}$ cell and all the adjacent cells, where an individual offset between the $i^{th}$ cell and the $j^{th}$ adjacent cell is represented by $O_{ij}$.

The method shown in FIG. 2 further includes step 203: Detect a handover problem, existing within the preset time, of the high-speed moving user in the $i^{th}$ cell according to $R_i$ and $r_i$.

Figure 3A:
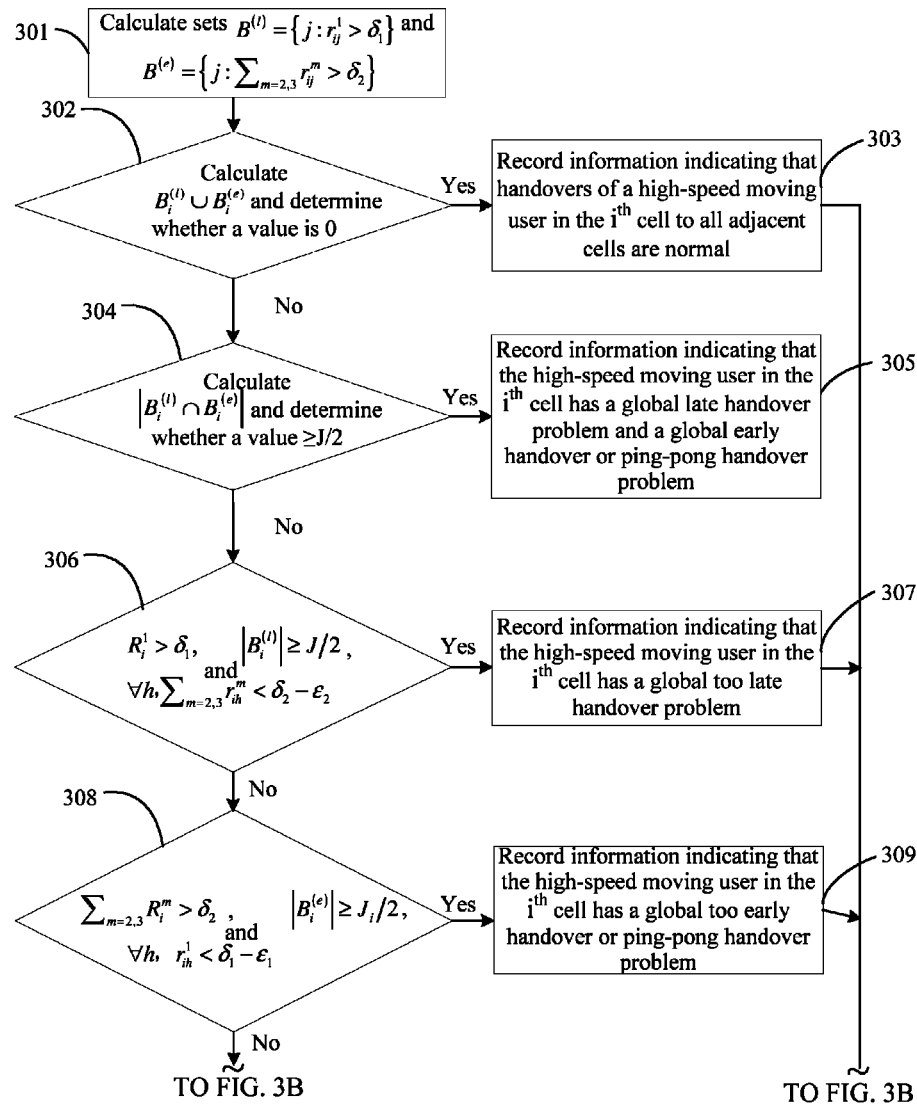
FIG. 3A and FIG. 3B are schematic flowcharts of detecting a handover problem according to an embodiment of the present disclosure.
Figure 3B:
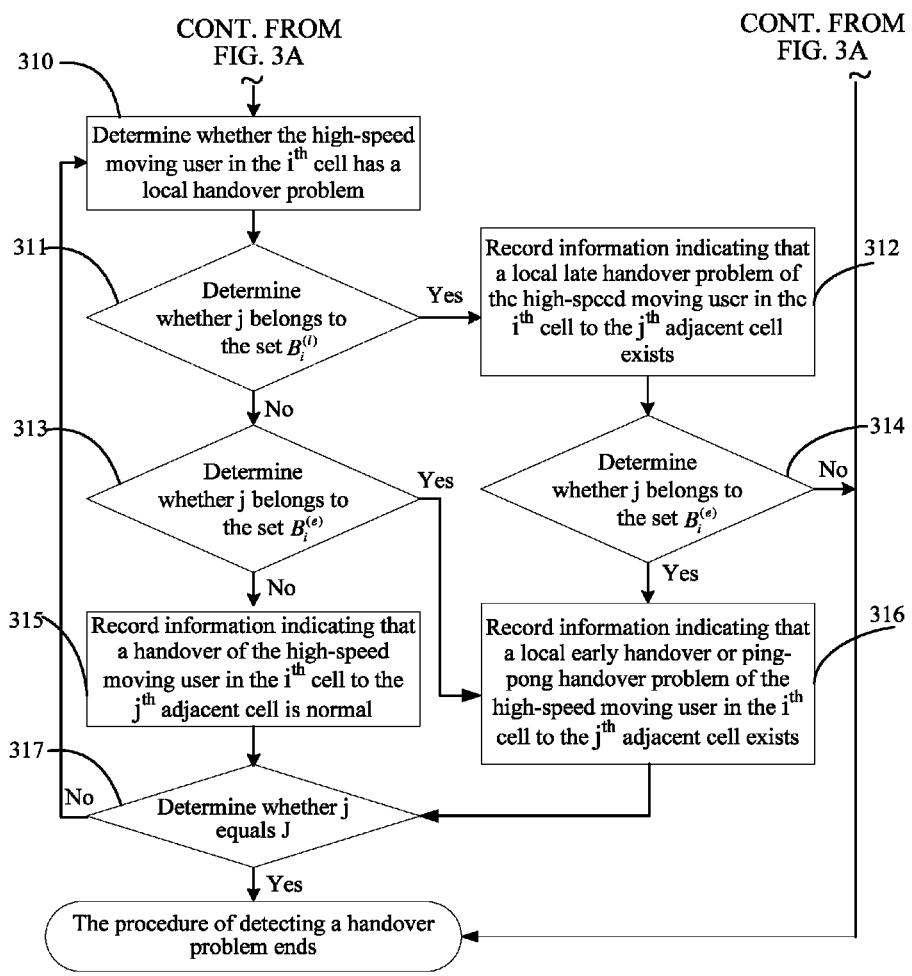

Referring to FIG. 3A and FIG. 3B, a method for detecting a handover problem may include step 301: Calculate sets $B^{(l)}=\{j: r_{ij}^{1}>\delta_1\}$ and $B^{(e)}=\{j: \Sigma_{m=2,3}r_{ij}^{m}>\delta_2\}$. Sets $B_i^{(l)}=\{j: r_{ij}^{1}>\delta_1\}$ and $B_i^{(e)}=\{j: \Sigma_{m=2,3}r_{ij}^{m}>\delta_2\}$ are calculated according to $R_i^1$, $R_i^2$, and $R_i^3$ and $r_{ij}^{1}$, $r_{ij}^{2}$, and $r_{ij}^{3}$, of the high-speed moving user in the $i^{th}$ cell, acquired in step 202. The parameter $\delta_1$ is a first preset threshold and is used to define a degree of severity of a too late handover of the high-speed moving user in the $i^{th}$ cell. For example, if $r_{ij}^{1}>\delta_1$, it may be regarded that a condition of a too late handover of the high-speed moving user in the $i^{th}$ cell to the $j^{th}$ adjacent cell is severe. Alternatively, if $r_{ij}^{1}<\delta_1$, it may be regarded that a condition of a too late handover of the high-speed moving user in the $i^{th}$ cell to the $j^{th}$ adjacent cell is not severe. Parameter $B_i^{(l)}$ represents a set of numbers of adjacent cells to which the high-speed moving user in the $i^{th}$ cell is extremely handed over. For example, the $i^{th}$ cell has 6 adjacent cells, which are separately marked as an adjacent cell 1, an adjacent cell 2, an adjacent cell 3, an adjacent cell 4, an adjacent cell 5, and an adjacent cell 6. If $r_{ij}^{1}>\delta_1$ for the high-speed moving user in the $i^{th}$ cell to the adjacent cell 1, the adjacent cell 3, the adjacent cell 4, and the adjacent cell 6, $B_i^{(l)}=\{1, 3, 4, 6\}$.

Parameter $\delta_2$ is a second preset threshold and is used to define a status of a too early handover or a ping-pong handover of the high-speed moving user in the $i^{th}$ cell. For example, if $\Sigma_{m=2,3}r_{ij}^{m}>\delta_2$, it may be regarded that a condition of a too early handover or a ping-pong handover of the high-speed moving user in the $i^{th}$ cell to the $j^{th}$ adjacent cell is severe. If $\Sigma_{m=2,3}r_{ij}^{m}<\delta_2$, it may be regarded that a condition of a too early handover or a ping-pong handover of the high-speed moving user in the $i^{th}$ cell to the $j^{th}$ adjacent cell is not severe. $B_i^{(e)}$ represents a set of numbers of adjacent cells to which having a severe condition of a too early handover or a ping-pong handover of the high-speed moving user in the $i^{th}$ cell to an adjacent cell. For example, the $i^{th}$ cell has 6 adjacent cells, which are separately marked as an adjacent cell 1, an adjacent cell 2, an adjacent cell 3, an adjacent cell 4, an adjacent cell 5, and an adjacent cell 6. If $\Sigma_{m=2,3}r_{ij}^{m}>\delta_2$ for the high-speed moving user in the $i^{th}$ cell to the adjacent cell 5, $B_i^{(e)}=\{5\}$.

Parameters $\delta_1$ and $\delta_2$ are limit values used to define whether a condition of a handover is severe, and specific values of $\delta_1$ and $\delta_2$ may be determined according to an actual need, which are not limited herein in this embodiment of the present disclosure.

It should be noted that, superscript (l) in *(l) in this embodiment of the present disclosure is only used to represent a parameter in a too late handover problem, but is not used to limit or describe the parameter. Superscript (e) in *(e) in this embodiment of the present disclosure is only used to represent a parameter in a too early handover or ping-pong handover problem, but is not used to limit or describe the parameter.

The method in FIG. 3A includes step 302: Calculate $B_i^{(l)} \cup B_i^{(e)}$ and determine whether a value is 0, and if $B_i^{(l)} \cup B_i^{(e)}=0$, perform step 303, or if $B_i^{(l)} \cup B_i^{(e)} \neq 0$, perform step 304.

For example, $B_i^{(l)}$ and $B_i^{(e)}$ in step 301 are used as an example; $B_i^{(l)} \cup B_i^{(e)}=\{1, 2, 4, 5, 6\} \neq 0$, and step 304 is performed.

The method in FIG. 3A includes step 303: Record information indicating that handovers of the high-speed moving user in the $i^{th}$ cell to all adjacent cells are normal, and exit the procedure of detecting a handover problem.

When $B_i^{(l)} \cup B_i^{(e)}=0$, it indicates that no severe too late handover, too early handover or ping-pong handover occurs between the high-speed moving user in the $i^{th}$ cell and any adjacent cell, and it is detected that the high-speed moving user in the $i^{th}$ cell does not have a handover problem. Therefore, the information indicating that handovers of the high-speed moving user in the $i^{th}$ cell to all adjacent cells are normal is recorded.

When it is detected that the high-speed moving user in the $i^{th}$ cell does not have a handover problem, the procedure of detecting a handover problem ends.

The method in FIG. 3A includes step 304: Calculate $|B_i^{(l)} \cup B_i^{(e)}|$ and determine whether the value $\geq J/2$; if $|B_i^{(l)} \cap B_i^{(e)}| \geq J/2$, perform step 305, or if $|B_i^{(l)} \cap B_i^{(e)}| < J/2$, perform step 306.

For example, $B_i^{(l)}$ and $B_i^{(e)}$ in step 301 are used as an example; $B_i^{(l)} \cap B_i^{(e)} \leq J/2$, and step 306 is performed.

The method in FIG. 3A includes step 305: Record information indicating that the high-speed moving user in the $i^{th}$ cell has a global too late handover problem and a global too early handover or ping-pong handover problem, and exit the procedure of detecting a handover problem.

When $|B_i^{(l)} \cap B_i^{(e)}| \geq J/2$, it indicates that both a severe too late handover and a severe a too early handover or ping-pong handover occur between the high-speed moving user in the $i^{th}$ cell and more than half adjacent cells. Therefore, the information indicating that the high-speed moving user in the $i^{th}$ cell has a global too late handover problem and a global too early handover or ping-pong handover problem is recorded.

It should be noted that, for any cell, a global too late handover problem and a global too early handover or ping-pong handover problem may exist at the same time, but a global handover problem and a local handover problem cannot exist at the same time. Therefore, after the information indicating that the high-speed moving user in the $i^{th}$ cell has a global too late handover problem and a global too early handover or ping-pong handover problem is recorded in step 305, the procedure of detecting a handover problem ends.

The method in FIG. 3A includes step 306: Determine whether a handover performance parameter of the high-speed moving user in the $i^{th}$ cell meets a first condition $(R_i^1 > \delta_1, |B_i^{(l)}| \geq J/2$, and $\forall h, \Sigma_{m=2,3}r_{ih}^{m} < \delta_2 - \in_2)$; if the handover performance parameter meets the first condition, perform step 307, or if the handover performance parameter does not meet the first condition, perform step 308.

If $R_i^1 > \delta_1$, it may be regarded that a global too late handover of the high-speed moving user in the $i^{th}$ cell is severe, where $|B_i^{(l)}|$ represents a quantity of elements included in the set $B_i^{(l)}$;

$\forall$ represents there is an arbitrary adjacent cell;

h is used to identify an adjacent cell of the $i^{th}$ cell, where h=1, . . . , J; and ∈$_2$ is an artificially set error, may be determined according to an actual demand, and is not limited herein in this embodiment of the present disclosure.

For example, $B_i^{(l)}$ in step 301 is used as an example. $R_i^1 > \delta_1$, and $|B_i^{(l)}| \geq J/2$, but a too early handover or a ping-pong handover occurs between the high-speed moving user in the $i^{th}$ cell to the adjacent cell 5; therefore, the first condition is not met, and step 308 is performed.

The method in FIG. 3A includes step 307: Record information indicating that the high-speed moving user in the $i^{th}$ cell has a global too late handover problem, and exit the procedure of detecting a handover problem.

When the handover performance parameter of the high-speed moving user in the $i^{th}$ cell meets the first condition in step 306, it indicates that a severe too late handover occurs between the high-speed moving user in the $i^{th}$ cell and more than half adjacent cells, and that no severe too early handover or ping-pong handover occurs between the high-speed moving user in the $i^{th}$ cell and the rest adjacent cells; therefore, it is detected that the high-speed moving user in the $i^{th}$ cell has a global too late handover problem. In this case, the information indicating that the high-speed moving user in the $i^{th}$ cell has a global too late handover problem is recorded.

The method in FIG. 3A includes step 308: Determine whether the handover performance parameter of the high-speed moving user in the $i^{th}$ cell meets a second condition ($\Sigma_{m=2,3} R_i^m > \delta_2$, $|B_i^{(e)}| \geq J/2$, and $\forall h, r_{ih}^1 < \delta_1 - \in_1$); if the handover performance parameter meets the second condition, perform step 309, or if the handover performance parameter does not meet the second condition, perform step 310.

If $\Sigma_{m=2,3} R_i^m > \delta_2$, it may be regarded that a global too early handover or a ping-pong handover of the high-speed moving user in the $i^{th}$ cell is severe, where $|B_i^{(e)}|$ represents a quantity of elements included in the set $B_i^{(e)}$;

∀ represents there is an arbitrary adjacent cell;

h is used to identify an adjacent cell of the $i^{th}$ cell, where h=1, . . . , J; and ∈$_1$ is an artificially set error, may be determined according to an actual demand, and is not limited herein in this embodiment of the present disclosure.

The method in FIG. 3A includes step 309: Record information indicating that the high-speed moving user in the $i^{th}$ cell has a global too early handover or ping-pong handover problem, and exit the procedure of detecting a handover problem.

When the handover performance parameter of the high-speed moving user in the $i^{th}$ cell meets the second condition, it indicates that a severe a too early handover or ping-pong handover occurs between the high-speed moving user in the $i^{th}$ cell and more than half adjacent cells, and that no severe too late handover occurs between the high-speed moving user in the $i^{th}$ cell and the rest adjacent cells; therefore, it is detected that the high-speed moving user in the $i^{th}$ cell has a global too early handover or ping-pong handover problem. In this case, the information indicating that the high-speed moving user in the $i^{th}$ cell has a global too early handover or ping-pong handover problem is recorded.

It should be noted that, for any cell, a global too late handover problem and a global too early handover or ping-pong handover problem may exist at the same time, but a global handover problem and a local handover problem cannot exist at the same time. Because it has been detected whether the high-speed moving user in the $i^{th}$ cell has a global too late handover problem, after the information indicating that the high-speed moving user in the $i^{th}$ cell has a global too early handover or ping-pong handover problem is recorded in step 309, the procedure of detecting a handover problem ends.

The method in FIG. 3B includes step 310: Determine whether the high-speed moving user in the $i^{th}$ cell has a local handover problem.

Whether the high-speed moving user in the $i^{th}$ cell has a local handover problem may be detected in a of traversing all the adjacent cells of the $i^{th}$ cell. For example, step 310 to step 317 may be first performed for the adjacent cell 1, and step 310 to step 317 are then performed for the adjacent cell 2, and so on, until all the adjacent cells of the $i^{th}$ cell have been traversed.

The method in FIG. 3B includes step 311: Determine whether j belongs to the set $B_i^{(l)}$; if $j \in B_i^{(l)}$, perform step 312, or if $j \notin B_i^{(l)}$, perform step 313.

For example, when j=1, it is determined according to $B_i^{(l)}$ in step 301 that j belongs to the set $B_i^{(l)}$, and step 312 is performed.

The method in FIG. 3B includes step 312: Record information indicating that a local late handover problem of the high-speed moving user in the $i^{th}$ cell to the $j^{th}$ adjacent cell exists.

If $j \in B_i^{(l)}$, it indicates that a severe too late handover occurs between the high-speed moving user in the $i^{th}$ cell and the $j^{th}$ adjacent cell, and therefore, it is detected that a local late handover problem of the high-speed moving user in the $i^{th}$ cell to the $j^{th}$ adjacent cell exists; therefore, an indication indicating that a local late handover problem of the high-speed moving user in the $i^{th}$ cell to the $j^{th}$ adjacent cell exists is recorded.

It should be noted that, the high-speed moving user in the $i^{th}$ cell may have a local too late handover problem and a local too early handover or ping-pong handover problem at the same time. Therefore, after step 312, step 314 further needs to be performed to determine whether the high-speed moving user in the $i^{th}$ cell further has a local too early handover or ping-pong handover problem.

The method in FIG. 3B includes step 313: Determine whether j belongs to the set $B_i^{(e)}$; if $j \in B_i^{(e)}$, perform step 316, or if $j \notin B_i^{(e)}$, perform step 317.

For example, when j=1, it is determined according to $B_i^{(e)}$ in step 301 that j does not belong to the set $B_i^{(e)}$, and step 317 is performed.

The method in FIG. 3B includes step 314: Determine whether j belongs to the set $B_i^{(e)}$; if $j \in B_i^{(e)}$, perform step 316, or if $j \notin B_i^{(e)}$, exit the procedure of detecting a handover problem.

It should be noted that, the determining conditions in step 314 and step 313 are the same, but only preconditions for performing step 313 and step 314 are different.

The method in FIG. 3B includes step 315: Record information indicating that a handover of the high-speed moving user in the $i^{th}$ cell to the $j^{th}$ adjacent cell is normal.

When $j \notin B_i^{(l)}$ and $j \notin B_i^{(e)}$, it indicates that the high-speed moving user in the $i^{th}$ cell has neither a severe local too late handover problem nor a severe local too early handover or ping-pong handover problem; it is detected that the high-speed moving user in the $i^{th}$ cell does not have a local handover problem, and therefore, the information indicating that a handover of the high-speed moving user in the $i^{th}$ cell to the $j^{th}$ adjacent cell is normal is recorded.

The method in FIG. 3B includes step 316: Record information indicating that a local early handover or ping-pong handover problem of the high-speed moving user in the $i^{th}$ cell to the $j^{th}$ adjacent cell exists, and perform step 317.

If $j \in B_i^{(e)}$, it indicates that a severe local too early handover or ping-pong handover occurs between the high-speed moving user in the $i^{th}$ cell and the $j^{th}$ adjacent cell; it is detected that a local early handover or ping-pong handover problem of the high-speed moving user in the $i^{th}$ cell to the $j^{th}$ adjacent cell exists, and therefore, the information indicating that a local early handover or ping-pong handover problem of the high-speed moving user in the $i^{th}$ cell to the $j^{th}$ adjacent cell exists is recorded.

When the information indicating that a local early handover or ping-pong handover of the high-speed moving user in the $i^{th}$ cell to the $j^{th}$ adjacent cell exists is recorded, step 317 is performed.

The method in FIG. 3B includes step 317: Determine whether j equals J. To determine whether j equals J is to determine whether detection of a local handover problem is performed on all the adjacent cells of the $i^{th}$ cell.

If j=J, it indicates that detection of a local handover problem has been performed on all the adjacent cells of the $i^{th}$ cell, and the procedure of detecting a handover problem ends.

If j≠J, make j=j+1, and step 310 to step 317 are performed again.

Referring back to FIG. 2, the method in FIG. 2 includes step 204: Receive a global handover performance parameter, a local handover performance parameter, a handover parameter, and indication information for a handover problem, within the preset time, of a high-speed moving user in an adjacent cell that are sent by all the adjacent cells of the $i^{th}$ cell.

Exemplarily, each adjacent cell may use step 201 to step 203 to acquire a global handover performance parameter, a local handover performance parameter, and recorded indication information for a handover problem, within the preset time, of a high-speed moving user in the adjacent cell.

For example, the $j^{th}$ adjacent cell may use step 201 to step 203 to acquire a global handover performance parameter $R_j$, a local handover performance parameter $r_j$, a handover parameter, and recorded indication information for a handover problem, within the preset time, of a high-speed moving user in the cell.

Further, each adjacent cell may send, to all adjacent cells of the respective cell, the global handover performance parameter, the local handover performance parameter, the handover parameter, and the recorded indication information for the handover problem, within the preset time, of the high-speed moving user in the respective cell that are acquired by using step 201 to step 203.

The method in FIG. 2 includes step 205: Determine, according to the handover problem of the high-speed moving user in the $i^{th}$ cell, indications of the handover problems of the high-speed moving users in all the adjacent cells, and $R_j$, $r_i$, $R_j$, and $r_j$ that are within the preset time, whether the $i^{th}$ cell is a cell to be optimized.

Figure 4:
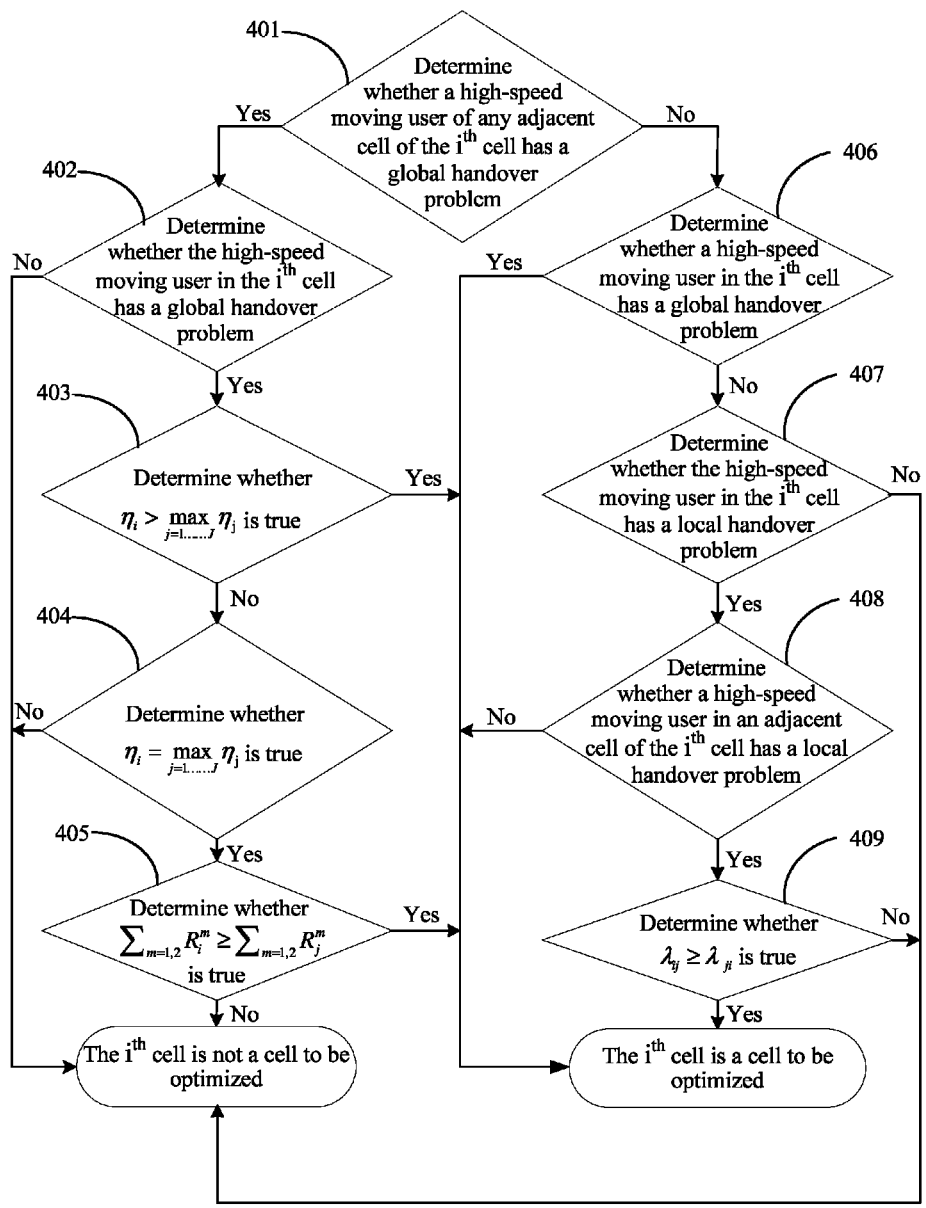
FIG. 4 is a schematic flowchart of selecting a to-be-optimized cell according to an embodiment of the present disclosure.

Referring to FIG. 4, a method of determining whether the $i^{th}$ cell is a cell to be optimized may include step 401: Determine whether a high-speed moving user of any adjacent cell of the $i^{th}$ cell has a global handover problem.

Exemplarily, it is determined according to $R_j$, $r_j$, and the indication information for the handover problem, within the preset time, of the high-speed moving users in the adjacent cells that are sent by all the adjacent cells of the $i^{th}$ cell and that are received in step 204, whether any adjacent cell has a global handover problem.

Optionally, the global handover problem may include a global too late handover problem and a global too early handover or ping-pong handover problem.

If a high-speed moving user in any adjacent cell of the $i^{th}$ cell has a global handover problem, step 402 is performed.

If none of the high-speed moving users in all the adjacent cells of the $i^{th}$ cell has a global handover problem, step 406 is performed.

The method in FIG. 4 includes step 402: Determine whether the high-speed moving user in the $i^{th}$ cell has a global handover problem.

It is determined, according to the handover problem, of the high-speed moving user in the $i^{th}$ cell, detected in step 203, whether the high-speed moving user in the $i^{th}$ cell has a global handover problem.

If the high-speed moving user in the $i^{th}$ cell does not have a global handover problem, it may be determined that the $i^{th}$ cell is not a cell to be optimized.

If the high-speed moving user in the $i^{th}$ cell has a global handover problem, step 403 is performed to determine whether the global handover problem of the high-speed moving user in the $i^{th}$ cell is the severest among those of the $i^{th}$ cell and all the adjacent cells of the $i^{th}$ cell.

The method in FIG. 4 includes step 403: Determine whether $$\eta_i > \max_{j=1...J} \eta_j$$

is true.

$\eta_i = \Sigma_{m=1,2,3} \beta_m R_i^m$, $\eta_j = \Sigma_{m=1,2,3} \beta_m R_j^m$, and $\beta_m$ is a preset weighted value for each handover performance parameter; a specific value of the weighted value may be determined according to an actual need and does not affect a result of the present disclosure.

To determine whether $$\eta_i > \max_{j=1...J} \eta_j$$

is true is to determine whether the global handover problem of the high-speed moving user in the $i^{th}$ cell is severer than the global handover problems of the high-speed moving users in all the adjacent cells of the $i^{th}$ cell.

If $$\eta_i > \max_{j=1...J} \eta_j$$

is true, it indicates that the global handover problem of the high-speed moving user in the $i^{th}$ cell is the severest global handover problem among those of the $i^{th}$ cell and all the adjacent cells of the $i^{th}$ cell; therefore, it may be determined that the $i^{th}$ cell is a cell to be optimized.

If $$\eta_i > \max_{j=1...J} \eta_j$$

is not true, it indicates that the global handover problem of the high-speed moving user in the $i^{th}$ cell is not severer than all of the global handover problems of the high-speed moving users in all the adjacent cells of the $i^{th}$ cell, and step 404 is performed to determine whether there is an adjacent cell in which a high-speed moving user has a global handover problem as severe as the global handover problem of the high-speed moving user in the $i^{th}$ cell.

The method in FIG. 4 includes step 404: Determine whether $$\eta_i = \max_{j=1...J} \eta_j$$

is true.

To determine whether $$\eta_i = \max_{j=1...J} \eta_j$$

is true is to determine, when the global handover problem of the high-speed moving user in the $i^{th}$ cell is not severer than all of the global handover problems of the high-speed moving users in all the adjacent cells of the $i^{th}$ cell, whether there is an adjacent cell in which a high-speed moving user has a global handover problem is as severe as the global handover problem of the high-speed moving user in the $i^{th}$ cell.

If $$\eta_i = \max_{j=1...J} \eta_j$$

is true, it indicates that there is an adjacent cell in which a high-speed moving user has a global handover problem as severe as the global handover problem of the high-speed moving user in the $i^{th}$ cell; step 405 needs to be performed to further determine whether a radio link failure caused by a global too late handover and a global too early handover of the high-speed moving user in the $i^{th}$ cell is severer than radio link failures caused by global too late handovers and global too early handovers of high-speed moving users in all adjacent cells having global handover problems as severe as that of the $i^{th}$ cell.

If $$\eta_i = \max_{j=1...J} \eta_j$$

is not true, it indicates that the global handover problem of the high-speed moving user in the $i^{th}$ cell is not the severest among those of the high-speed moving users in the $i^{th}$ cell and all the adjacent cells of the $i^{th}$ cell, and that there is no adjacent cell in which a high-speed moving user has a global handover problem as severe as the global handover problem of the high-speed moving user in the $i^{th}$ cell; therefore, it may be determined that the $i^{th}$ cell is not a cell to be optimized.

The method in FIG. 4 includes step 405: Determine whether $\Sigma_{m=1,2} R_i^m \geq \Sigma_{m=1,2} R_j^m$, $$j = \arg\max_{j \in J} \eta_j$$

is true.

To determine whether $\Sigma_{m=1,2} R_i^m \geq \Sigma_{m=1,2} R_j^m$, $$j = \arg\max_{j \in J} \eta_j$$

is true is to determine whether a radio link failure caused by a global too late handover and a global too early handover of the high-speed moving user in the $i^{th}$ cell is severer than radio link failures caused by global too late handovers and global too early handovers of high-speed moving users in all adjacent cells having global handover problems as severe as that of the $i^{th}$ cell.

If $\Sigma_{m=1,2} R_i^m \geq \Sigma_{m=1,2} R_j^m$, $$j = \arg\max_{j \in J} \eta_j$$

is true, it indicates that a radio link failure caused by a global too late handover and a global too early handover of the high-speed moving user in the $i^{th}$ cell is severer than radio link failures caused by global too late handovers and global too early handovers of high-speed moving users in all adjacent cells having global handover problems as severe as that of the $i^{th}$ cell, and it is determined that the $i^{th}$ cell is a cell to be optimized.

If $\Sigma_{m=1,2} R_i^m \geq \Sigma_{m=1,2} R_j^m$, $$j = \arg\max_{j \in J} \eta_j$$

is not true, it indicates that a radio link failure caused by a global too late handover and a global too early handover of the high-speed moving user in the $i^{th}$ cell is not severer than radio link failures caused by global too late handovers and global too early handovers of high-speed moving users in all adjacent cells having global handover problems that of the $i^{th}$ cell, and it is determined that the $i^{th}$ cell is not a cell to be optimized.

The method in FIG. 4 includes step 406: Determine whether the high-speed moving user in the $i^{th}$ cell has a global handover problem.

Whether the high-speed moving user in the $i^{th}$ cell has a global handover problem is determined according to the handover problem, of the high-speed moving user in the $i^{th}$ cell, detected in step 203.

If it is determined that the high-speed moving user in the $i^{th}$ cell has a global handover problem, it may be determined that the $i^{th}$ cell is a cell to be optimized.

If it is determined that the high-speed moving user in the $i^{th}$ cell has no global handover problem, step 407 is performed to determine whether the high-speed moving user in the $i^{th}$ cell has a local handover problem.

The method in FIG. 4 includes step 407: Determine whether the high-speed moving user in the $i^{th}$ cell has a local handover problem.

If it is determined that the high-speed moving user in the $i^{th}$ cell has no local handover problem, it is determined that the $i^{th}$ cell is not a cell to be optimized.

If it is determined that the high-speed moving user in the $i^{th}$ cell has a local handover problem, step 408 needs to be performed to determine whether a high-speed moving user in an adjacent cell of the $i^{th}$ cell has a local handover problem.

The method in FIG. 4 includes step 408: Determine whether a high-speed moving user in an adjacent cell of the $i^{th}$ cell has a local handover problem.

If it is determined that none of the high-speed moving users in all the adjacent cells of the $i^{th}$ cell has a local handover problem, it may be determined that the $i^{th}$ cell is a cell to be optimized.

If it is determined that a high-speed moving user in an adjacent cell of the $i^{th}$ cell has a local handover problem, step 409 further needs to be performed to determine whether the local handover problem of the high-speed moving user in the $i^{th}$ cell is severer than local handover problems of the high-speed moving users in all the adjacent cells of the $i^{th}$ cell.

The method in FIG. 4 includes step 409: Determine whether $\lambda_{ij} \geq \lambda_{ji}$ is true,
   where, $\lambda_{ij}=\Sigma_{m=1,2,3}\beta_m r_{ij}^m$, $\lambda_{ji}=\Sigma_{m=1,2,3}\beta_m r_{ji}^m$, and j=1, . . . , J.

By means of determining whether $\lambda_{ij} \geq \lambda_{ji}$ is true, it may be determined whether a problem of the local handover of the high-speed moving user in the $i^{th}$ cell to the $j^{th}$ adjacent cell is severer than a problem of the local handover from the $j^{th}$ adjacent cell to the $i^{th}$ cell.

If it is determined that the problem of the local handover of the high-speed moving user in the $i^{th}$ cell to the $j^{th}$ adjacent cell is severer than a problem of the local handover of a high-speed moving user in the $j^{th}$ adjacent cell to the $i^{th}$ cell, it may be determined that the $i^{th}$ cell is a cell to be optimized.

If it is determined that the local handover problem of the high-speed moving user in the $i^{th}$ cell is not severer than local handover problems of the high-speed moving users in all the adjacent cells, it may be determined that the $i^{th}$ cell is not a cell to be optimized.

Referring back to FIG. 2, the method in FIG. 2 includes step 206: If it is determined that the $i^{th}$ cell is a cell to be optimized, optimize, according to $R_i$, $r_i$, $R_j$, and $r_j$, the handover parameter of the $i^{th}$ cell, and the handover parameters of the adjacent cells of the $i^{th}$ cell by using a data statistical regression method, a handover parameter corresponding to the handover problem of the high-speed moving user in the $i^{th}$ cell, to acquire an optimized handover parameter of the high-speed moving user in the $i^{th}$ cell within a new preset time.

The handover parameter corresponding to the handover problem of the $i^{th}$ cell may be optimized according to $R_i$, $r_i$, $R_j$, and $r_j$, the handover parameter of the $i^{th}$ cell, and the handover parameters of the adjacent cells of the $i^{th}$ cell by using the data statistical regression method, to acquire the optimized handover parameter of the $i^{th}$ cell within the new preset time. The data statistical regression method is a model, in which an independent variable and a dependent variable are mapped to each other, formed according to a large quantity of collected system independent variables and system dependent variables and a correspondence between a system independent variable and a dependent variable, where the correspondence is found by using a statistical fitting regression method. Data statistical regression mainly includes linear regression fitting, binomial regression fitting, Gaussian process regression analysis, and the like. This embodiment of the present disclosure is described by using an example of a Gaussian process regression method.

For the Gaussian process regression method, a vector x having m-dimensional variables is given. It is assumed that a corresponding KPI function is described as g(x), and that y(x) is observed values of n sampling points; therefore, y(x) is a random process of g(x) and $y=A\phi(x)+b$, where $A=(a_{ij})$ is an m×m positive definite matrix, b is a mean value of the random process, and $\phi(x)=(\phi_1(x), \ldots, \phi_m(x))^T$ represents static Gaussian processes, having a zero mean value and a unit variance, independent of each other. It is assumed that $\phi_p(x)$ has a related function $k(x,x';\theta_p)$, and the parameters $A,b,\{\theta_p: p=1, \ldots m\}$ are generally referred to as a hyperparameter. For Gaussian regression process analysis, a hyperparameter of a Gaussian process regression model first needs to be determined; therefore, a covariance function of the Gaussian process regression model may be set as:

$$k(x, x'; \theta_p) = \exp\left(-\frac{1}{2}(x-x')^T M_p (x-x')\right);$$

and
the hyperparameter is obtained through calculation by using a maximum marginal likelihood method:

$$\{A, \theta_1, \ldots, \theta_m\} \in$$
$$\arg\max\left\{-\frac{1}{2}\log(|\textstyle\sum_{mn}|)\frac{1}{2}I^T\textstyle\sum_{mn}^{-1}I - \frac{1}{2}(y_{mn}-I\hat{b})^T\textstyle\sum_{mn}^{-1}(y_{mn}-I\hat{b})\right\},$$
where $$\sum\nolimits_{mn} = \sum(y_{mn}, y_{mn}) = \begin{pmatrix} \sum_0 & K(y(x_1), y(x_2)) & \ldots & K(y(x_1), y(x_n)) \\ K(y(x_1), y(x_2)) & \sum_0 & \ldots & K(y(x_2), y(x_n)) \\ \vdots & \vdots & \ddots & \vdots \\ K(y(x_1), y(x_n)) & K(y(x_2), y(x_n)) & \ldots & \sum_0 \end{pmatrix}, K(.)$$

represents a covariance matrix, and $\Sigma_0=K(y(x), y(x))$; for a given test variable point $x_*$ and an output value $y_*$ thereof, an m×mn covariance matrix of $y_*$ and $y_{mn}$ may be written as $\Sigma_{*,mn}=\Sigma(y_*, y_{mn})=(\text{cov}(y_*, y_1), \ldots, \text{cov}(y_*, y_n))$; if a hyperparameter is known, joint distribution of $y_*$ and $y_{mn}$ is $$\left[\begin{pmatrix} y_* \\ y_{mn} \end{pmatrix} \Big| b\right] \sim N\left(\begin{bmatrix} I_m \\ I \end{bmatrix} b, \begin{bmatrix} \sum_0 & \sum_{*,mn} \\ \sum_{*,mn}^T & \sum_{mn} \end{bmatrix}\right),$$

where $I=1_n \otimes I_m$.
With given samples $X_n$ and $Y_n$,
$y_*|y_{mn} \sim N(m(x_*|y_{mn}), S(x_*|y_{mn}))$, where N(a,b) represents a Gaussian distribution function with a mean value being a and a variance being b; a conditional mean value and a variance of the Gaussian distribution function may be described as:

$m(x_*|\bullet)=\hat{b}+\Sigma_{*,mn}\Sigma_{mn}(y_{mn}-I\hat{b})$ $S(x_*|\bullet)=\Sigma_0-\Sigma_{*,mn}\Sigma_{mn}^{-1}\Sigma_{*,mn}^T+(I_m-\Sigma_{*,mn}\Sigma_{mn}^{-1}I)\times$
$(I^T\Sigma_{mn}^{-1}I)^{-1}\times(I_m-\Sigma_{*,mn}\Sigma_{mn}^{-1}I)^T;$ where $\hat{b}=(I^T\Sigma_{mn}^{-1}I)^{-1}I^T\Sigma_{mn}^{-1}y_{mn}$.

In the solution of the present disclosure, a model of a relationship between a handover parameter and handover performance of each cell is established by using the foregoing Gaussian regression process analysis. Therefore, it may be defined that $x_i=(H_i,T_i)^T$; and $z_{ij}=(O_{ij},0)^T$.

It is defined that $x'_{ij}=x_i-z_{ij}=(M_{ij},T_i)^T$, representing a handover parameter affecting an indicator $L\_RLF_{ij}$ of a link failure caused by a too late handover from the $i^{th}$ cell to the $j^{th}$ adjacent cell;

it is defined that $u'_{ij}=u_i-v_{ij}$, representing a handover parameter affecting an indicator $E\_RLF_{ij}$ of a link failure caused by a too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, where $u_{ij}=(H_i,T_i,H_j,T_j)^T$ and $v_{ij}=(O_{ij},0,O_{ji},0)^T$, where $(\;)^T$ is a transpose operator, and $M_{ij}=H_i-O_{ij}$;

it is defined that $f_{ij}(x_{ij})$ is a function of $L\_RLF_{ij}$ of the $i^{th}$ cell and the $j^{th}$ adjacent cell;

correspondingly, a measured value of $f_{ij}$ is $r_{ij}^1$;

it is defined that $F_i(x_i,z_{ij})$ is a global function of $L\_RLF_i$, and may be derived according to $F_i(x_i,z_{ij})=\Sum_{j=1}^{J_i}w_{ij}^1 f(x_i-z_{ij})$, where $w_{ij}^1$ is a preset weighted value, may be set according to an actual need, and is not limited in this embodiment of the present disclosure;

correspondingly, a measured value of $F_i$ is $R_i^1$;

similarly, it is defined that $g_{ij}(u'_{ij})$ is corresponding local function of superposition of $E\_RLF_{ij}$ and $PPH_{ij}$ where $u'_{ij}=u_i-v_{ij}$;

correspondingly, a measured value of $g_{ij}$ is $(r_{ij}^2, r_{ij}^3, r_{ji}^2, r_{ji}^3)^T$;

it is defined that $G_i(u_{ij},v_{ij})$ is a global function of superposition of $E\_RLF_{ij}$ and $PPH_{ij}$, and may be derived according to $G_i(u_{ij},v_{ij})=\Sum_{j=1}^{J_i} W_{ij} g_{ij}(u_{ij}-v_{ij})$, where $W_{ij}$ is a preset weighted value, may be set according to an actual need, and is not limited in this embodiment of the present disclosure;

correspondingly, a measured value of $G_i$ is $(R_i^2, R_i^3, R_{\to i}^2, R_{\to i}^3)$, where $R_{\to i}^2$ is a sum of $r_{ji}^2$ from all the adjacent cells of the $i^{th}$ cell to the $i^{th}$ cell, that is, $$\sum_{j=1...J} r_{ji}^2,$$

and $R_{\to i}^3$ is a sum of $r_{ji}^3$ from all the adjacent cells of the $i^{th}$ cell to the $i^{th}$ cell, that is $$\sum_{j=1...J} r_{ji}^3,$$

and n groups of sampled values $\{X_n, Q_n, U_n, Y_n\}$ may be acquired according to sampled values at n sampling moments within the preset time, for example, according to data at a current sampling moment and (n−1) sampling moments before the current sampling moment within the preset time, where $X_n=\{x'_{ij}(c): j=1,\ldots,J_i, c=1,\ldots,n\}$, and is a sampled value of a variable corresponding to $L\_RLF_{ij}$; $U_n=\{u'_{ij}(c): j=1,\ldots,J_i, c=1,\ldots,n\}$, and is a sampled value of a variable corresponding to $E\_RLF_{ij}$ and $PPH_{ij}$; $Q_n=\{q_{ij}(c): j=1,\ldots,J_i, c=1,\ldots,n\}$ is a sampled value of $F_i$, and $Y_n=\{y_{ij}(c): j=1,\ldots,J_i, c=1,\ldots,n\}$ is a sampled value of $G_i$; where c represents an identity of a sampling moment during sampling of system data; according to sampled data, hyperparameters, $\{b^f, a^f, \theta_1^f, \ldots, \theta_m^f\}$ and $\{b^g, a^g, \theta_1^g, \ldots, \theta_m^g\}$ of Gaussian process regression are first estimated, and handover performance $y_*$ corresponding to any handover parameter sampling point $x_*$ is then calculated by using a Gaussian process regression function $y_*|y_{mn} \sim N(m(x_*|y_{mn}), S(x_*|y_{mn}))$.

For the global handover problem, a handover parameter that needs to be adjusted is $x_i=(H_i,T_i)^T$, and for the local handover problem, a handover parameter that needs to be adjusted is $z_{ij}=(O_{ij},0)^T$; for a global too late handover problem, a global too early handover or ping-pong handover problem, a local too late handover problem, and a local too early handover or ping-pong handover problem, a cell to be optimized may perform independent calculation of an optimal handover parameter, so as to obtain optimal handover parameters corresponding to various problems separately. Separate description is provided below.

Figure 5A:
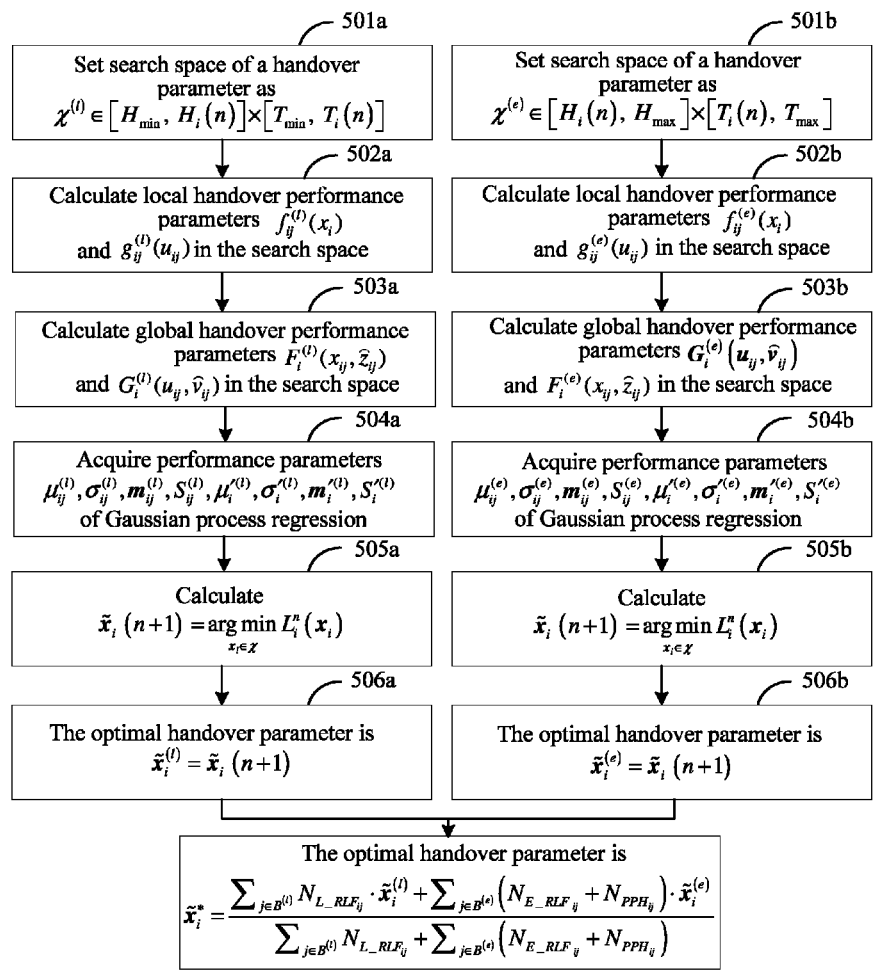
FIG. 5A and FIG. 5B are schematic flowcharts of calculating an optimal handover parameter according to an embodiment of the present disclosure.
Figure 5B:
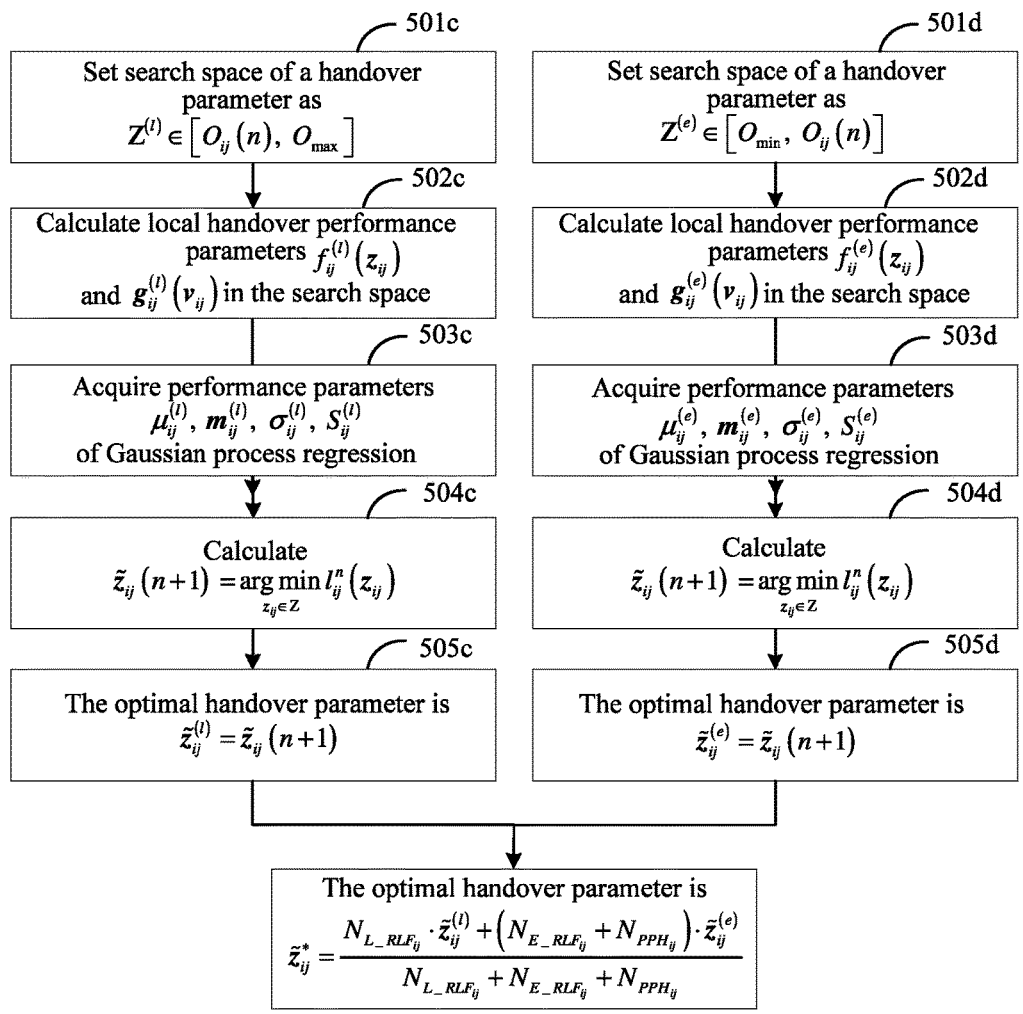

Referring to FIG. 5A and FIG. 5B, when the handover problem that the high-speed moving user in the $i^{th}$ cell has is a global too late handover problem, a method of optimizing, according to $R_i$, $r_i$, $R_j$, and $r_j$, the handover parameter of the $i^{th}$ cell, and the handover parameters of the adjacent cells of the $i^{th}$ cell by using a data statistical regression method, a handover parameter corresponding to the handover problem of the high-speed moving user in the $i^{th}$ cell, to acquire an optimized handover parameter of the high-speed moving user in the $i^{th}$ cell within a new preset time may include:

The method shown in FIG. 5A includes step 501a: Set search space $\chi$ of a handover parameter as $\chi^{(l)} \in [H_{min},H_i] \times [T_{min},T_i]$, where $H_{min}$ represents a lower limit, of a value range of a hysteresis H, regulated in the standards, and $T_{min}$ represents a lower limit, of a value range of a time to trigger T, regulated in the standards.

The method shown in FIG. 5A includes step 502a: Calculate local handover performance parameters $f_{ij}^{(l)}(x_i)$ and $g_{ij}^{(l)}(u_{ij})$ in the search space $\chi^{(l)}$.

The method shown in FIG. 5A includes step 503a: Calculate global handover performance parameters $F_i^{(l)}(x_{ij},\hat{z}_{ij})$ and $G_i^{(l)}(u_{ij},\hat{v}_{ij})$ in the search space $\chi^{(l)}$, where $j=1,\ldots,J$.

The method shown in FIG. 5A includes step 504a: Acquire performance parameters $\mu_{ij}^{(l)}$, $\sigma_{ij}^{(l)}$, $m_{ij}^{(l)}$, $S_{ij}^{(l)}$, $\mu'_i^{(l)}$, $\sigma'_i^{(l)}$, $m'_i^{(l)}$, $S'_i^{(l)}$ of Gaussian process regression.

These parameters are parameters of Gaussian distribution functions corresponding to sampled values of handover performance of a global too late handover of the high-speed moving user in the $i^{th}$ cell to the $j^{th}$ adjacent cell. Correspondingly, Gaussian distribution functions corresponding to sampled values of local handover performance are: $q_{ij} \Box N(\mu_{ij},\sigma_{ij})$ and $y_{ij} \Box N(m_{ij},S_{ij})$; Gaussian distribution functions corresponding to sampled values of global handover performance are $Q_i \Box N(\mu'_i,\sigma'_i)$ and $Y_i \Box N(m'_i,S'_i)$, where $\mu'_i=\Sum_{j=1}^{J_i} w_{ij}^1 \mu_{ij}$, $\sigma'_i=\Sum_{j=1}^{J_i}(w_{ij}^1)^2 \sigma_{ij}$, $m'_i=\Sum_{j=1}^{J_i} W_{ij} m_{ij}$, and $S'_i=\Sum_{j=1}^{J_i} W_{ij} S_{ij} W_{ij}^T$.

The method shown in FIG. 5A includes step 505a: Calculate $$\hat{x}_i(n+1) = \arg\min_{x_i \in \chi} L_i^n(x_i),$$

where $L_i^n(x_i) = w^T(\mu_i(x_i|X_n,Q_n,U_n,Y_n) - C\sigma_i(x_i|X_n,Q_n,U_n,Y_n))$, and $w^T$ is a weight of each handover performance parameter, For the global handover problem, a model of a global handover optimization problem is first defined as:

$$L_i(x_i) = w_0 F_i(x'_{ij}) + \sum_{m=1}^{4} G_{i,m}(u'_{ij}) =$$

$$w_0 F_i(x_i, \hat{z}_{ij}) + \sum_{m=1}^{4} w_m G_{i,m}(x_i, \hat{x}_j, \hat{z}_{ij}, \hat{z}_{ji}),$$

j=1, . . . , $J_i$, where $\hat{x}_j$, $\hat{z}_{ij}$, and $\hat{z}_{ji}$ represent handover parameters that stay unchanged within the preset time; an optimization parameter is the handover parameter $x_i$ of the $i^{th}$ cell, and stays unchanged in the optimization process of all problems for a handover parameter of an adjacent cell; $w_m$ represents a weight, and corresponds to performance weights of $R_i^1$, $R_i^2$, $R_i^3$, $R_{\to i}^2$, $R_{\to i}^3$ separately, and $\Sigma_{m=0}^{4} w_m = 1$; and it is defined that an auxiliary function is $\phi_i(x_i) = \mu_i(x_i) - C\sigma_i(x_i)$, where $\mu_i = (\mu'_i; m'_i{}^T)$, and $\sigma_i = (\sigma'_i, s'_i{}^T)^T$, and C is a compromise factor specified in advance.

Corresponding to $\phi_i(x_i) = \mu_i(x_i) - C\sigma_i(x_i)$, a global handover performance parameter $L_i(x_i)$ corresponding to any input handover parameter $x_i$ is calculated in a Gaussian regression model.

When the high-speed moving user in a cell to be optimized, that is, the $i^{th}$ cell, has an all handover problems, after consecutive n sampled values of performance, a handover parameter corresponding to optimal handover performance is found, through a search on an $(n+1)^{th}$ sampling point, as a solution:

$$\tilde{x}_i(n+1) = \arg\min_{x_i \in \chi^{(l)}} L_i^n(x_i),$$

where $$L_i^n(x_i) = w^T(\mu_i(x_i|X_n, Q_n, U_n, Y_n) - C\sigma_i(x_i|X_n, Q_n, U_n, Y_n)).$$

With a configuration parameter $\chi \in [H_i, T_i]$ of a current moment n, if the high-speed moving user in the $i^{th}$ cell has a too late handover problem, a hysteresis and a time to trigger of the high-speed moving user in the $i^{th}$ cell need to be reduced, that is, parameter space $x^{(l)} \in [H_{min}, H_i] \times [T_{min}, T_i]$ needs to be searched by using a Gaussian process regression model for an optimal parameter.

The method shown in FIG. 5A includes step 506a: Optimize a handover parameter corresponding to a global too late handover problem of the high-speed moving user in the $i^{th}$ cell as $\tilde{x}_i^{(l)} = \tilde{x}_i(n+1)$.

Referring to FIG. 5A and FIG. 5B, when the handover problem that the high-speed moving user in the $i^{th}$ cell has is a global too early handover or ping-pong handover problem, a method of optimizing, according to $R_i$, $r_i$, $R_j$, and $r_j$, the handover parameter of the $i^{th}$ cell, and the handover parameters of the adjacent cells of the $i^{th}$ cell by using a data statistical regression method, a handover parameter corresponding to the handover problem of the high-speed moving user in the $i^{th}$ cell, to acquire an optimized handover parameter of the high-speed moving user in the $i^{th}$ cell within a new preset time may include:

The method shown in FIG. 5A includes step 501b: Set search space $\chi$ of a handover parameter as $\chi^{(e)} \in [H_i, H_{max}] \times [T_i, T_{max}]$, where $H_{max}$ represents an upper limit, of a value range of a hysteresis H, regulated in the standards, and $T_{max}$ represents an upper limit, of a value range of a time to trigger T, regulated in the standards.

The method shown in FIG. 5A includes step 502b: Calculate local handover performance parameters $f_{ij}^{(e)}(x_i)$ and $g_{ij}^{(e)}(u_{ij})$ in the search space $\chi^{(e)}$.

The method shown in FIG. 5A includes step 503b: Calculate global handover performance parameters $F_i^{(e)}(x_{ij}, \hat{z}_{ij})$ and $G_i^{(e)}(u_{ij}, \hat{v}_{ij})$ in the search space $\chi^{(e)}$, where j=1, . . . , J.

The method shown in FIG. 5A includes step 504b: Acquire performance parameters $\mu_{ij}^{(e)}$, $\sigma_{ij}^{(e)}$, $m_{ij}^{(e)}$, $S_{ij}^{(e)}$, $\mu'_i{}^{(e)}$, $\sigma'_i{}^{(e)}$, $m'_i{}^{(e)}$, $S'_i{}^{(e)}$ of Gaussian process regression.

These parameters are parameters of Gaussian distribution functions corresponding to sampled values of handover performance of a global too early handover or a ping-pong handover of the high-speed moving user in the $i^{th}$ cell to the $j^{th}$ adjacent cell. Correspondingly, Gaussian distribution functions corresponding to sampled values of local handover performance are: $q_{ij} \square N(\mu_{ij}, \sigma_{ij})$ and $y_{ij} \square N(m_{ij}, S_{ij})$; Gaussian distribution functions corresponding to sampled values of global handover performance are $Q_i \square N(\mu'_i, \sigma'_i)$ and $Y_i \square N(m'_i, S'_i)$ where $\mu'_i = \Sigma_{j=1}^{J_i} w_{ij}^{-1} \mu_{ij}$, $\sigma'_i = \Sigma_{j=1}^{J_1}(w_{ij}^{-1})^2 \sigma_{ij}$, $m'_i = \Sigma_{j=1}^{J_i} W_{ij} m_{ij}$, and $S'_i = \Sigma_{j=1}^{J_i} W_{ij} S_{ij} W_{ij}^T$.

The method shown in FIG. 5A includes step 505b: Calculate $$\tilde{x}_i(n+1) = \arg\min_{x_i \in \chi} L_i^n(x_i),$$

where $$L_i^n(x_i) = w^T(\mu_i(x_i|X_n, Q_n, U_n, Y_n) - C\sigma_i(x_i|X_n, Q_n, U_n, Y_n)),$$

and $w^T$ is a weight of each handover performance parameter.

With a configuration parameter $\chi \in [H_i, T_i]$ of a current moment n, the high-speed moving user in the $i^{th}$ cell has a too early handover or ping-pong handover problem, and a hysteresis and a time to trigger of the high-speed moving user in the $i^{th}$ cell need to be improved, that is, parameter space $\chi^{(e)} \in [H_i, H_{max}] \times [T_i, T_{max}]$ needs to be searched by using a Gaussian process regression model for an optimal parameter.

The method shown in FIG. 5A includes step 506b: Optimize a handover parameter corresponding to a global too early handover or too late handover problem of the high-speed moving user in the $i^{th}$ cell as $\tilde{x}_i^{(e)} = \tilde{x}_i(n+1)$.

Referring to FIG. 5A and FIG. 5B, when the handover problem that the high-speed moving user in the $i^{th}$ cell has is a local too late handover problem, a method of optimizing, according to $R_i$, $r_i$, $R_j$, and $r_j$, the handover parameter of the $i^{th}$ cell, and the handover parameters of the adjacent cells of the $i^{th}$ cell by using a data statistical regression method, a handover parameter corresponding to the handover problem of the high-speed moving user in the $i^{th}$ cell, to acquire an optimized handover parameter of the high-speed moving user in the $i^{th}$ cell within a new preset time may include:

The method shown in FIG. 5B includes step 501c: Set search space Z of a handover parameter as $Z^{(l)} \in [O_{ij}, O_{max}]$, where $O_{max}$ represents an upper limit, of a value range of a cell individual offset O, regulated in the standards.

The method shown in FIG. 5B includes step 502c: Calculate local handover performance parameters $f_{ij}^{(l)}(z_{ij})$ and $g_{ij}^{(l)}(v_{ij})$ in the search space $z^{(l)}$.

The method shown in FIG. 5B includes step 503c: Acquire performance parameters $\mu_{ij}^{(l)}$, $m_{ij}^{(l)}$, $\sigma_{ij}^{(l)}$, $S_{ij}^{(l)}$ of Gaussian process regression, where these parameters are parameters of Gaussian distribution functions corresponding to sampled values of handover performance of a global too late handover of the high-speed moving user in the $i^{th}$ cell to the $j^{th}$ adjacent cell.

The method shown in FIG. 5B includes step 504c: Calculate $$\tilde{z}_{ij}(n+1) = \underset{z_{ij} \in Z}{\operatorname{argmin}} l_{ij}^n(z_{ij}),$$

where $$l_{ij}^n(z_{ij}) = w^T(\mu_{ij}(z_{ij}|X_n, Q_n, U_n, Y_n) - C\sigma_{ij}(z_{ij}|X_n, Q_n, U_n, Y_n)),$$

and $w^T$ is a weight of each handover performance parameter.

With a configuration parameter $Z \in [O_{ij}, 0]$ of a current moment n, if a local too late handover problem of the high-speed moving user in the $i^{th}$ cell to the $j^{th}$ adjacent cell exists, an offset amount of the high-speed moving user in the $i^{th}$ cell to the $j^{th}$ adjacent cell needs to be increased, that is, parameter space $Z^{(l)} \in [O_{ij}, O_{max}]$ needs to be searched by using a Gaussian process regression model for an optimal parameter.

The method shown in FIG. 5B includes step 505c: Optimize a handover parameter corresponding to a global too late handover problem of the high-speed moving user in the $i^{th}$ cell as $\tilde{z}_{ij}^{(l)} = \tilde{z}_{ij}(n+1)$.

Referring to FIG. 5A and FIG. 5B, when the handover problem that the high-speed moving user in the $i^{th}$ cell has is a local too early handover or ping-pong handover problem, a method of optimizing, according to $R_i$, $r_i$, $R_j$, and $r_j$, the handover parameter of the $i^{th}$ cell, and the handover parameters of the adjacent cells of the $i^{th}$ cell by using a data statistical regression method, a handover parameter corresponding to the handover problem of the high-speed moving user in the $i^{th}$ cell, to acquire an optimized handover parameter of the high-speed moving user in the $i^{th}$ cell within a new preset time may include:

The method shown in FIG. 5B includes step 501d: Set search space Z of a handover parameter as $Z^{(e)} \in [O_{min}, O_{ij}]$, where $O_{min}$ represents a lower limit, of a value range of a cell individual offset O, regulated in the standards.

The method shown in FIG. 5B includes step 502d: Calculate local handover performance parameters $f_{ij}^{(e)}(z_{ij})$ and $g_{ij}^{(e)}(v_{ij})$ in the search space $Z^{(e)}$.

The method shown in FIG. 5B includes step 503d: Acquire performance parameters $\mu_{ij}^{(l)}$, $m_{ij}^{(l)}$, $\sigma_{ij}^{(l)}$, $S_{ij}^{(l)}$ of Gaussian process regression.

These parameters are parameters of Gaussian distribution functions corresponding to sampled values of handover performance of a global too late handover of the high-speed moving user in the $i^{th}$ cell to the $j^{th}$ adjacent cell.

The method shown in FIG. 5B includes step 504d: Calculate $$\tilde{z}_{ij}(n+1) = \underset{z_{ij} \in Z}{\operatorname{argmin}} l_{ij}^n(z_{ij}),$$

where $$l_{ij}^n(z_{ij}) = w^T(\mu_{ij}(z_{ij}|X_n, Q_n, U_n, Y_n) - C\sigma_{ij}(z_{ij}|X_n, Q_n, U_n, Y_n)),$$

and $w^T$ is a weight of each handover performance parameter.

With a configuration parameter $Z \in [O_{ij}, 0]$ of a current moment n, if a local too early handover or ping-pong handover problem of the high-speed moving user in the $i^{th}$ cell to the $j^{th}$ adjacent cell exists, an offset amount of the high-speed moving user in the $i^{th}$ cell to the $j^{th}$ adjacent cell needs to be reduced, that is, parameter space $Z^{(e)} \in [O_{min}, O_{ij}]$ needs to be searched by using a pre-established model for an optimal parameter.

The method shown in FIG. 5B includes step 505d: Optimize a handover parameter corresponding to a global too late handover problem of the high-speed moving user in the $i^{th}$ cell as $\tilde{z}_{ij}^{(e)} = \tilde{z}_{ij}(n+1)$.

As can be seen from the foregoing methods, for a global too late handover, global too early handover or ping-pong handover, local too late handover, and local too early handover or ping-pong handover problem, a cell to be optimized performs independent calculation of an optimal handover parameter, so as to separately obtain optimal handover parameters $\tilde{x}_i^{(l)}$, $\tilde{x}_i^{(e)}$, $\tilde{z}_{ij}^{(l)}$, and $\tilde{z}_{ij}^{(e)}$ corresponding to various problems.

When the high-speed moving user in the cell to be optimized, that is, the $i^{th}$ cell, has multiple problems, an optimized handover parameter of the high-speed moving user in the $i^{th}$ cell within a new preset time needs to be obtained by means of weighted calculation according to the optimal handover parameters independently obtained for various problems. Referring to FIG. 5A and FIG. 5B, the weighted calculation may include:

When the high-speed moving user in the $i^{th}$ cell has both a global too late handover problem and a global too early handover or ping-pong handover problem, an optimal handover parameter $\tilde{x}_i^*$, within a new preset time, corresponding to the handover problems that the high-speed moving user in the $i^{th}$ cell has is a weighted sum of $\tilde{x}_i^{(l)}$ and $\tilde{x}_i^{(e)}$, that is, $$\tilde{x}_i^* = \frac{\sum_{j \in B^{(l)}} N_{L\_RLF_{ij}} \cdot \tilde{x}_i^{(l)} + \sum_{j \in B^{(e)}} (N_{E\_RLF_{ij}} + N_{PPH_{ij}}) \cdot \tilde{x}_i^{(e)}}{\sum_{j \in B^{(l)}} N_{L\_RLF_{ij}} + \sum_{j \in B^{(e)}} (N_{E\_RLF_{ij}} + N_{PPH_{ij}})}.$$

Alternatively, referring to FIG. 5A and FIG. 5B, when the high-speed moving user in the $i^{th}$ cell has both a local too late handover problem and a local too early handover or ping-pong handover problem, an optimal handover parameter $\tilde{z}_{ij}^*$, within a new preset time, corresponding to the handover problems that the high-speed moving user in the $i^{th}$ cell has is a weighted sum of $\tilde{z}_{ij}^{(l)}$ and $\tilde{z}_{ij}^{(e)}$, that is, $$\tilde{z}_{ij}^* = \frac{N_{L\_RLF_{ij}} \cdot \tilde{z}_{ij}^{(l)} + (N_{E\_RLF_{ij}} + N_{PPH_{ij}}) \cdot \tilde{z}_{ij}^{(e)}}{N_{L\_RLF_{ij}} + N_{E\_RLF_{ij}} + N_{PPH_{ij}}}.$$

According to the method for optimizing a handover parameter provided in this embodiment of the present disclosure, each cell acquires a global handover performance parameter R, a local handover performance parameter r, and a handover parameter of a high-speed moving user in a respective cell within a preset time separately; detects, a handover problem, existing within the preset time, of the high-speed moving user in the respective cell according to R and r of the high-speed moving user in the respective cell; receives a global handover performance parameter, a local handover performance parameter, a handover parameter, and indication information for a handover problem, within the preset time, of a high-speed moving user in each adjacent cell that are sent by all adjacent cells of the respective cell; determines whether the respective cell is a cell to be optimized; and if an $i^{th}$ cell is a cell to be optimized, optimizes, according to $R_i$, $r_i$, $R_j$, and $r_j$, the handover parameter of the $i^{th}$ cell, and the handover parameters of the adjacent cells of the $i^{th}$ cell by using a data statistical regression method, a handover parameter corresponding to the handover problem of the high-speed moving user in the cell. Distributed selection of a cell to be optimized is implemented, so that optimization of a handover parameter of the cell to be optimized is beneficial to improvement of performance of an entire network. Optimization of a handover parameter is implemented based on a type of user, thereby improving optimization precision of a handover parameter. A global handover problem and a local handover problem in a network are effectively identified, and a suitable optimization parameter is determined for joint optimization. Gaussian process regression is used for modeling, so that optimization of a handover parameter has low complexity and is fast. Defects, during optimization of a handover parameter of a problematic cell according to a statistical observation method, of failing to consider optimization of an entire network, failing to perform optimization for different users, failing to perform optimization for multiple handover problems, failing to perform optimization for multiple handover parameters, failing to perform fast and accurate optimization on a handover parameter, and failing to improve performance of the entire network are resolved.

Embodiment 3

Figure 6:
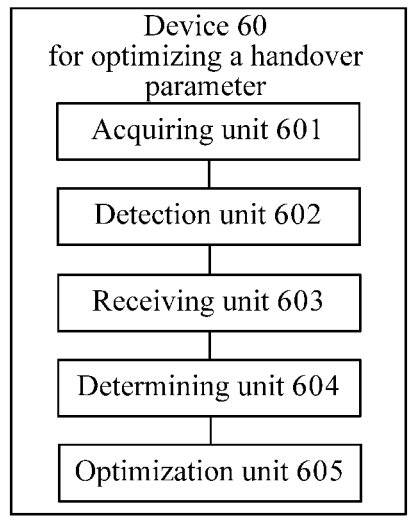
FIG. 6 is a structural diagram of a device for optimizing a handover parameter according to an embodiment of the present disclosure.

This embodiment of the present disclosure provides a device 60 for optimizing a handover parameter. Referring to FIG. 6, the device 60 may include:

an acquiring unit 601, configured to acquire a global handover performance parameter $R_i$, a local handover performance parameter $r_i$, and a handover parameter of an $i^{th}$ cell that are within a preset time.

The global handover performance parameter $R_i$ of the $i^{th}$ cell includes the following. A ratio $R_i^1$ of a sum of quantities of times that a too late handover of user equipment in the $i^{th}$ cell to all the adjacent cells occurs within the preset time to a total quantity of times that the user equipment in the $i^{th}$ cell is handed over to all the adjacent cells. A ratio $R_i^2$ of a sum of quantities of times that a too early handover of the user equipment in the $i^{th}$ cell to all the adjacent cells occurs within the preset time to a total quantity of times that the user equipment in the $i^{th}$ cell sends a handover request to all the adjacent cells. A ratio $R_i^3$ of a sum of quantities of times that a ping-pong handover of the user equipment in the $i^{th}$ cell to all the adjacent cells occurs within the preset time to a total quantity of times that the user equipment in the $i^{th}$ cell sends a handover request to all the adjacent cells.

The local handover performance parameter $r_i$ of the $i^{th}$ cell includes the following. A ratio $r_{ij}^1$ of a quantity of times that a too late handover of the user equipment in the $i^{th}$ cell to a $j^{th}$ adjacent cell occurs within the preset time to a total quantity of times that the user equipment in the $i^{th}$ cell is handed over to the $j^{th}$ adjacent cell. A ratio $r_{ij}^2$ of a quantity of times that a too early handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell. A ratio $r_{ij}^3$ of a quantity of times that a ping-pong handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell, where the $j^{th}$ adjacent cell is any adjacent cell of all the adjacent cells of the $i^{th}$ cell, j=1, . . . , J, and J is a quantity of all the adjacent cells of the $i^{th}$ cell; and the handover parameter of the $i^{th}$ cell may include: a hysteresis $H_i$, a time to trigger and individual offsets between the $i^{th}$ cell and all the adjacent cells, where an individual offset between the $i^{th}$ cell and the $j^{th}$ adjacent cell is represented by $O_{ij}$.

The device 60 further includes a detection unit 602, configured to detect a handover problem, existing within the preset time, of the $i^{th}$ cell according to $R_i$ and $r_i$ acquired by the acquiring unit 601, where the handover problem may include: a global handover problem and a local handover problem, where the global handover problem includes a global too late handover problem and a global too early handover or ping-pong handover problem, and the local handover problem includes a local too late handover problem and a local too early handover or ping-pong handover problem.

The device 60 further includes a receiving unit 603, configured to receive, a global handover performance parameter, a local handover performance parameter, a handover parameter, and indication information for a handover problem, within the preset time, of each adjacent cell that are sent by all the adjacent cells of the $i^{th}$ cell, where a global handover performance parameter of the $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell.

The device 60 further includes a determining unit 604, configured to determine, according to the handover problem, of the $i^{th}$ cell within the preset time, detected by the detection unit 602, the handover problems of all the adjacent cells, and $R_i$, $r_i$, $R_j$, and $r_j$ that are received by the receiving unit 603, whether the $i^{th}$ cell is a cell to be optimized.

The device 60 further includes an optimization unit 605, configured to: if the determining unit 604 determines, according to the handover problem of the $i^{th}$ cell, the handover problems of all the adjacent cells, and $R_i$, $r_i$, $R_j$, and $r_j$ which are within the preset time, that the $i^{th}$ cell is a cell to be optimized, optimize, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time.

Further, the detection unit 602 may be configured to:
determine that a global too late handover problem and a global too early handover or ping-pong handover problem exist in the $i^{th}$ cell, if it is determined that both a too late handover and a too early handover or a ping-pong handover exist between the $i^{th}$ cell and A adjacent cells, where A is greater than or equal to ½ of a total quantity of all the adjacent cells of the $i^{th}$ cell;

determine that a global too late handover problem exists in the $i^{th}$ cell, if it is determined that $R_i^1$ of the $i^{th}$ cell is greater than a first preset threshold, and it is determined that a too late handover exists between the $i^{th}$ cell and s adjacent cells, and that no too early handover or ping-pong handover exists between the $i^{th}$ cell and all the adjacent cells, where s is greater than or equal to ½ of a total quantity of all the adjacent cells of the $i^{th}$ cell;

determine that a global too early handover or ping-pong handover problem exists in the $i^{th}$ cell, if it is determined that a sum of $R_i^2$ and $R_i^3$ of the $i^{th}$ cell is greater than a second preset threshold, it is determined that a too early handover or a ping-pong handover exists between the $i^{th}$ cell and t adjacent cells, and it is determined that no too late handover exists between the $i^{th}$ cell and all the adjacent cells, where t is greater than or equal to ½ of a total quantity of all the adjacent cells of the $i^{th}$ cell;

determine that a local too late handover problem exists in the $i^{th}$ cell, if it is determined that no global handover problem exists in the $i^{th}$ cell, and that a too late handover exists between the $i^{th}$ cell and a $k^{th}$ adjacent cell, where the $k^{th}$ adjacent cell is any adjacent cell whose $R_{ik}^1$ is greater than the first preset threshold; and determine that a local too early handover or ping-pong handover problem exists in the $i^{th}$ cell, if it is determined that no global handover problem exists in the $i^{th}$ cell, and that a too early handover or a ping-pong handover exists between the $i^{th}$ cell and an $m^{th}$ adjacent cell, where the $m^{th}$ adjacent cell is any adjacent cell whose $r_{im}^2$ or $r_{im}^3$ is greater than the second preset threshold.

Further, the determining unit 604 may be configured to:

determine that the $i^{th}$ cell is a cell to be optimized, if it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is greater than a weighted sum of $R_j^1$, $R_j^2$, and $R_j^3$ of each adjacent cell in which a global handover problem exists; or determine that the $i^{th}$ cell is a cell to be optimized, if it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is equal to a weighted sum of $R_j^1$, $R_j^2$, and $R_j^3$ of any adjacent cell in which a global handover problem exists, and it is determined that a sum of $R_i^1$ and $R_i^2$ of the $i^{th}$ cell is greater than a sum of $R_j^1$ and $R_j^2$ of each adjacent cell in which a global handover problem exists; or determine that the $i^{th}$ cell is a cell to be optimized, if it is determined that a global handover problem exists in none of the adjacent cells, and that a global handover problem exists in the $i^{th}$ cell; or determine that the $i^{th}$ cell is a cell to be optimized, if it is determined that a global handover problem exists in none of the adjacent cells, that no global handover problem exists in the $i^{th}$ cell, and that a local handover problem exists in the $i^{th}$ cell, and it is determined that a local handover problem exists in none of the adjacent cells; or determine that the $i^{th}$ cell is a cell to be optimized, if it is determined that a global handover problem exists in none of the adjacent cells, that no global handover problem exists in the $i^{th}$ cell, and that a local handover problem exists in the $i^{th}$ cell, and it is determined that a local handover problem exists in any one of the adjacent cells, and that a weighted sum of $r_{ib}^1$, $r_{ib}^2$, and $r_{ib}^3$ of the $i^{th}$ cell with respect to a $b^{th}$ adjacent cell is greater than or equal to a weighted sum of $r_{bi}^1$, $r_{bi}^2$, and $r_{bi}^3$ of the $b^{th}$ adjacent cell with respect to the $i^{th}$ cell, where the $b^{th}$ adjacent cell is any one of adjacent cells in which a local handover problem exists.

Further, the optimization unit 605 may be configured to: set, according to a global handover problem that exists in the $i^{th}$ cell, search space $\chi$ of the global handover problem.

Optionally, when the handover problem of the $i^{th}$ cell is a global too late handover problem, the search space $\chi$ is $[H_{min}, H_i] \times [T_{min}, T_i]$, where $H_{min}$ represents a lower limit, of a value range of a hysteresis H, regulated in the standards, $T_{min}$ represents a lower limit, of a value range of a time to trigger T, regulated in the standards, $H_i$ represents a hysteresis, within the preset time, of the $i^{th}$ cell, and $T_i$ represents a time to trigger, within the preset time, of the $i^{th}$ cell.

Optionally, when the handover problem of the $i^{th}$ cell is a global too early handover or ping-pong handover problem, the search space $\chi$ is $[H_i, H_{max}] \times [T_i, T_{max}]$, where $H_{max}$ represents an upper limit, of a value range of a hysteresis H, regulated in the standards, and $T_{max}$ represents an upper limit, of a value range of a time to trigger T, regulated in the standards.

The optimization unit 605 may be further configured to acquire $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n = \{x'_{ij}(c): j=1, \ldots, J, c=1, \ldots, n\}$, $u'_{ij} = u_{ij} - v_{ij}$, $u_{ij} = (H_i, T_i, H_j, T_j)^T$, and $z_{ij} = (O_{ij}, 0)^T$; $U_n = \{u'_{ij}(c): j=1, \ldots, J, c=1, \ldots, n\}$, $u'_{ij} = u_{ij} - v_{ij}$, $u_{ij} = (H_i, T_i, H_j, T_j)^T$, and $v_{ij} = (O_{ij}, 0, O_{ji}, 0)^T$; $Q_n$ is a sampled value of a function $F_i(x_i, z_{ij})$ of an indicator $L\_RLF_i$ of a link failure caused by a global too late handover from the $i^{th}$ cell to the $j^{th}$ adjacent cell, $F_i(x_i, z_{ij}) = \sum_{j=1}^{J} w_{ij}^1 f(x_i - z_{ij})$, and $w_{ij}^1$ is a preset weighted value; and $Y_n$ is a sampled value of a function $G_i(u_{ij}, v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, $G_i(u_{ij}, v_{ij}) = \sum_{j=1}^{J} W_{ij} g_{ij}(u_{ij} - v_{ij})$, and $W_{ij}$ is a preset weighted value, where $H_j$ is a hysteresis of the $j^{th}$ adjacent cell, $T_j$ is a time to trigger of the $j^{th}$ adjacent cell, and $O_{ji}$ is an individual offset between the $j^{th}$ adjacent cell and the $i^{th}$ cell.

The optimization unit 605 may be further configured to calculate $$\tilde{x}_i(n+1) = \operatorname*{argmin}_{x_i \in \chi} L_i^n(x_i)$$

according to the Gaussian process regression model within the search space $\chi$ of the global handover problem, where $x_i$ is a variable of a handover parameter, $\tilde{x}_i(n+1)$ is an optimized handover parameter, to be calculated, of the $i^{th}$ cell within a new preset time, $L_i^n(\bullet)$ is a customized function and $L_i^n(x_i) = w_f \Phi_i^n = w^T(\mu_i(x_i | X_n, Q_n, U_n, Y_n) - C\sigma_i(x_i | X_n, Q_n, U_n, Y_n))$, $w^T$ is a weight of each handover performance parameter, is $\mu_i(\bullet)$ is a mean value of a Gaussian function, $\sigma_i(\bullet)$ is a variance of the Gaussian function, and C is a compromise factor specified in advance; and use $\tilde{x}_i(n+1)$ as an optimized handover parameter, within the new preset time, calculated according to the preset Gaussian process regression model, for the handover parameter corresponding to the global handover problem of the $i^{th}$ cell.

Further, the optimization unit 605 may further be configured to:

set, according to a local handover problem that exists in the $i^{th}$ cell, search space Z of the local handover problem.

In response to the handover problem of the $i^{th}$ cell being a local too late handover problem, the search space Z is $[O_{ij}, O_{max}]$, where $O_{max}$ represents an upper limit, of a value range of a cell individual offset O, regulated in the standards.

In response to the handover problem of the $i^{th}$ cell being a local too early handover or ping-pong handover problem, the search space Z is $[O_{min}, O_{ij}]$, where $O_{min}$ represents a lower limit, of a value range of a cell individual offset O, regulated in the standards, and $O_{ij}$ represents an individual offset between the $i^{th}$ cell and the $j^{th}$ adjacent cell.

The optimization unit 605 may be further configured to acquire $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n = \{x'_{ij}(c): j=1, \ldots, J, c=1, \ldots, n\}$, $x'_{ij} = x_i - z_{ij}$, $x_i = (H_i, T_i)^T$, and $z_{ij} = (O_{ij}, 0)^T$; $U_n = \{u'_{ij}(c): j=1, \ldots, J, c=1, \ldots, n\}$, $u'_{ij} = u_{ij} - v_{ij}$, $u_{ij} = (H_i, T_i, H_j, T_j)^T$, and $v_{ij} = (O_{ij}, 0, O_{ji}, 0)^T$; $Q_n$ is a sampled value of a function $F_i(x_i, z_{ij})$ of an indicator $L\_RLF_i$ of a link failure caused by a global too late handover from the $i^{th}$ cell to the $j^{th}$ adjacent cell, $F_i(x_i, z_{ij}) = \Sigma_{j=1}^{J} w_{ij}^1 f(x_i - z_{ij})$, and $w_{ij}^1$ is a preset weighted value; and $Y_n$ is a sampled value of a function $G_i(u_{ij}, v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, $G_i(u_{ij}, v_{ij}) = \Sigma_{j=1}^{J} W_{ij} g_{ij}(u_{ij} - v_{ij})$, and $W_{ij}$ is a preset weighted value, where $H_j$ is a hysteresis of the $j^{th}$ adjacent cell, $T_j$ is a time to trigger of the $j^{th}$ adjacent cell, and $O_{ji}$ is an individual offset between the $j^{th}$ adjacent cell and the $i^{th}$ cell.

The optimization unit 605 may be further configured to calculate $$\tilde{z}_{ij}(n+1) = \underset{z_{ij} \in Z}{\arg\min} l_{ij}^n(z_{ij})$$

according to a Gaussian process regression model within the search space Z of the local handover problem, where $z_{ij}$ is a variable of a handover parameter, $\tilde{z}_{ij}(n+1)$ is an optimized handover parameter, to be calculated, of the $i^{th}$ cell within a new preset time, $l_{ij}^n(\cdot)$ is a customized function and $l_{ij}^n(z_{ij}) = w^T(\mu_{ij}(z_{ij}|X_n, Q_n, U_n, Y_n) - C\sigma_{ij}(z_{ij}|X_n, Q_n, U_n, Y_n))$, $w^T$ is a weighted value of each handover performance parameter, $\mu_{ij}(\cdot)$ is a mean value of a Gaussian function, $\sigma_{ij}(\cdot)$ is a variance of the Gaussian function, and C is a compromise factor specified in advance.

The optimization unit 605 may be further configured to use $\tilde{z}_{ij}(n+1)$ as an optimized handover parameter, within the new preset time, calculated according to the preset Gaussian process regression model, for the handover parameter corresponding to the local handover problem of the $i^{th}$ cell.

When handover problems that exist in the $i^{th}$ cell include both a global too late handover problem and a global too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the global too late handover problem and an optimized handover parameter, within the new preset time, calculated for the global too early handover or ping-pong handover problem. Additionally or alternatively, when handover problems that exist in the $i^{th}$ cell include both a local too late handover problem and a local too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the local too late handover problem and an optimized handover parameter within the new preset time calculated for the local too early handover or ping-pong handover problem.

Figure 7:
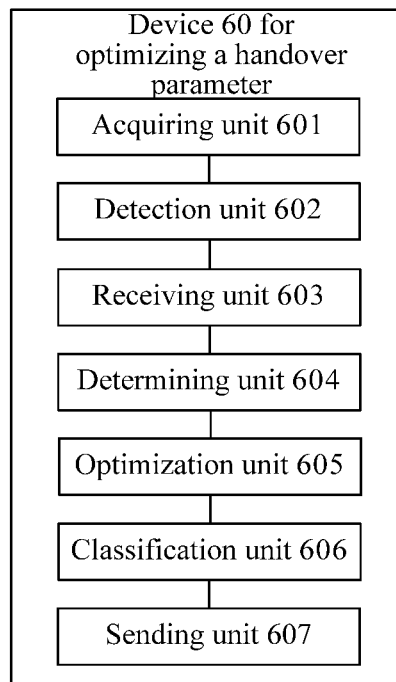
FIG. 7 is a structural diagram of another device for optimizing a handover parameter according to an embodiment of the present disclosure.
Figure 8:
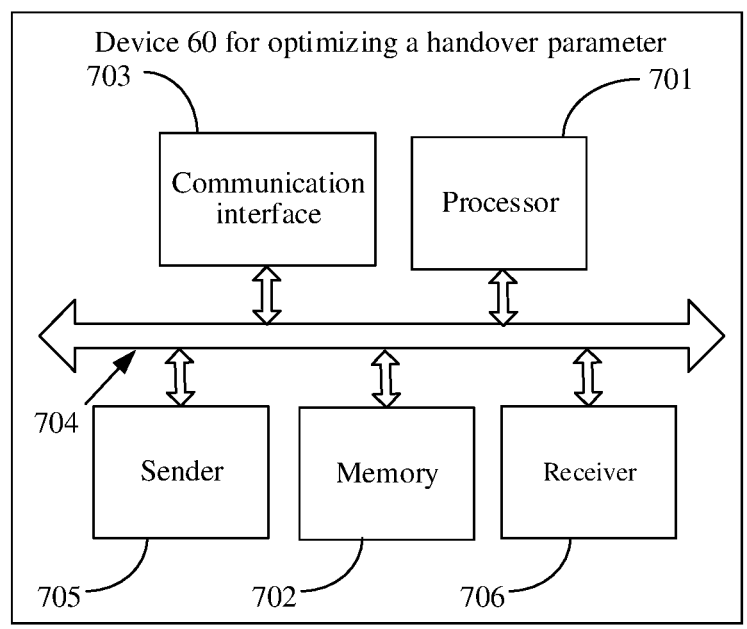
FIG. 8 is a structural diagram of still another device for optimizing a handover parameter according to an embodiment of the present disclosure.

Further, referring to FIG. 7, the device 60 may further include:

a classification unit 606, configured to classify users in the $i^{th}$ cell into at least two types of users according to movement speeds of the users in the $i^{th}$ cell;

correspondingly, the acquiring unit 601 may be configured to:

acquire a global handover performance parameter $R_i$, a local handover performance parameter $r_i$, and a handover parameter of a first-type user in the $i^{th}$ cell within the preset time, where the first-type user is any one type of users of the at least two types of users into which the users in the $i^{th}$ cell are classified according to the movement speeds of the users in the $i^{th}$ cell.

The detection unit 602 may be configured to detect a handover problem, existing within the preset time, of the first-type user in the $i^{th}$ cell according to $R_i$ and $r_i$, of the first-type user in the $i^{th}$ cell, acquired by the acquiring unit 601.

The receiving unit 603 may be configured to receive a global handover performance parameter, a local handover performance parameter, a handover parameter, and indication information for a handover problem, within the preset time, of the first-type user in each adjacent cell that are sent by all the adjacent cells of the $i^{th}$ cell, where a global handover performance parameter of the first-type user in the $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, $j=1, \ldots, J$, and J is a quantity of all the adjacent cells of the $i^{th}$ cell.

The determining unit 604 may be configured to determine, according to the handover problem, of the first-type user in the $i^{th}$ cell within the preset time, detected by the detection unit 602, the handover problems of the first-type users in all the adjacent cells and $R_i$, $r_i$, $R_j$, and $r_j$ that are received by the receiving unit 603, whether the $i^{th}$ cell is a cell to be optimized.

The optimization unit 605 may be configured to optimize, according to $R_i$, $r_i$, $R_j$, and $r_j$, the handover parameter of the $i^{th}$ cell, and the handover parameters of the adjacent cells of the $i^{th}$ cell by using the data statistical regression method, a handover parameter corresponding to the handover problem of the first-type user in the $i^{th}$ cell, to acquire an optimized handover parameter of the first-type user in the $i^{th}$ cell within the new preset time, in response to the determining unit 604 determining, according to the handover problem of the first-type user in the $i^{th}$ cell within the preset time, the handover problems of the first-type users in all the adjacent cells and $R_i$, $r_i$, $R_j$, and $r_j$ that the $i^{th}$ cell is a cell to be optimized.

Further, referring to FIG. 7, the device 60 may further include:

a sending unit 607, configured to send, to each adjacent cell of the $i^{th}$ cell, $R_i$, $r_i$, and the handover parameter of the $i^{th}$ cell that are within the preset time and acquired by the acquiring unit 601 and indication information, for the handover problem, detected by the detection unit 602.

It should be noted that, the division of units is merely logical functional division, and there may be other division forms in real application. For example, multiple units or components may be combined or be integrated to another system. Units described as separate components may be or may not be physically separated. Components shown as units may be or may not be physical units, that is, may be integrated or distributed to a plurality of network units. Some or all of the units may be selected according to actual needs to achieve the objectives of the solutions of the embodiments.

According to the device for optimizing a handover parameter provided in this embodiment of the present disclosure, each cell acquires a global handover performance parameter R, a local handover performance parameter r, and a handover parameter of a respective cell that are within a preset time; detects a handover problem, existing within the preset time, of the respective cell according to R and r of the respective cell; receives $R_j$, $r_j$, a handover parameter, and indication information for a handover problem, within the preset time, of each adjacent cell that are sent by all adjacent cells of the respective cell; determine whether the respective cell is a cell to be optimized; and if the $i^{th}$ cell is a cell to be optimized, optimizes, according to $R_i$, $r_i$, $R_j$, and $r_j$, the handover parameter of the $i^{th}$ cell, and the handover parameters of the adjacent cells of the $i^{th}$ cell by using a data statistical regression method, a handover parameter corresponding to a handover problem of the $i^{th}$ cell. Distributed selection of a cell to be optimized is implemented, so that optimization of a handover parameter of the cell to be optimized is beneficial to improvement of performance of an entire network, thereby resolving defects, during optimization of a handover parameter of a problematic cell according to a statistical observation method, of failing to consider optimization of an entire network and failing to improve performance of the entire network.

Embodiment 4

This embodiment of the present disclosure provides another device 60 for optimizing a handover parameter. Referring to FIG. 7, the device 60 may include at least one processor 701; a memory 702, a communications interface 703, a communications bus 704, a sender 705, and a receiver 706.

The communications bus 704 may be an Industry Standard Architecture (ISA for short) bus, a Peripheral Component Interconnect (PCI for short) bus or an Extended Industry Standard Architecture (EISA for short) bus, and the like. The bus 704 may be categorized into an address bus, a data bus, a control bus, and the like. For ease of representation, only one thick line is used in FIG. 7 for representation, but it does not represent that there is only one bus or one type of buses.

The memory 702 may include a read-only memory and a random access memory, and provides an instruction and data to the processor 701. A part of the memory 702 may further include a non-volatile random access memory (NVRAM).

The processor 701 may be a central processing unit (CPU for short), or an application specific integrated circuit (ASIC for short), or may be configured as one or more integrated circuits for implementing this embodiment of the present disclosure.

The processor 701 may be configured to acquire a global handover performance parameter a local handover performance parameter $r_i$, and a handover parameter of an $i^{th}$ cell that are within a preset time.

Optionally, the handover parameter of the $i^{th}$ cell includes: a hysteresis $H_i$, a time to trigger $T_i$, and individual offsets between the $i^{th}$ cell and all adjacent cells, where an individual offset between the $i^{th}$ cell and a $j^{th}$ adjacent cell is represented by $O_{ij}$.

Optionally, the global handover performance parameter $R_i$ of the $i^{th}$ cell includes: a ratio $R_i^1$ of a sum of quantities of times that a too late handover of user equipment in the $i^{th}$ cell to all the adjacent cells occurs within the preset time to a total quantity of times that the user equipment in the $i^{th}$ cell is handed over to all the adjacent cells; a ratio $R_i^2$ of a sum of quantities of times that a too early handover of the user equipment in the $i^{th}$ cell to all the adjacent cells occurs within the preset time to a total quantity of times that the user equipment in the $i^{th}$ cell sends a handover request to all the adjacent cells; and a ratio $R_i^3$ of a sum of quantities of times that a ping-pong handover of the user equipment in the $i^{th}$ cell to all the adjacent cells occurs within the preset time to a total quantity of times that the user equipment in the $i^{th}$ cell sends a handover request to all the adjacent cells.

Optionally, the local handover performance parameter $r_i$ of the $i^{th}$ cell includes: a ratio $r_{ij}^1$ of a quantity of times that a too late handover of the user equipment in the $i^{th}$ cell to the $j^{th}$ adjacent cell occurs within the preset time to a total quantity of times that the user equipment in the $i^{th}$ cell is handed over to the $j^{th}$ adjacent cell; a ratio $r_{ij}^2$ of a quantity of times that a too early handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell; and a ratio $r_{ij}^3$ of a quantity of times that a ping-pong handover of the user equipment in the $i^{th}$ cell to the $j^{th}$ adjacent cell occurs within the preset time to a total quantity of times that the user equipment in the $i^{th}$ cell sends a handover request to the $j^{th}$ adjacent cell.

The $j^{th}$ adjacent cell is any adjacent cell of all the adjacent cells of the $i^{th}$ cell, j=1, . . . , J, and J is a quantity of all the adjacent cells of the $i^{th}$ cell.

Further, the processor 701 may be further configured to detect a handover problem, existing within the preset time, of the $i^{th}$ cell according to $R_i$ and $r_i$.

Optionally, the handover problem may include: a global handover problem and a local handover problem, where the global handover problem may include a global too late handover problem and a global too early handover or ping-pong handover problem, and the local handover problem may include a local too late handover problem and a local too early handover or ping-pong handover problem.

Optionally, if it is determined that both a too late handover and a too early handover or a ping-pong handover exist between the $i^{th}$ cell and A adjacent cells, it is determined that a global too late handover problem and a global too early handover or ping-pong handover problem exist in the $i^{th}$ cell, where a is greater than or equal to ½ of a total quantity of all the adjacent cells of the $i^{th}$ cell.

Optionally, if it is determined that $R_i^1$ of the $i^{th}$ cell is greater than a first preset threshold, and it is determined that a too late handover exists between the $i^{th}$ cell and s adjacent cells, and that no too early handover or ping-pong handover exists between the $i^{th}$ cell and all the adjacent cells, it is determined that a global too late handover problem exists in the $i^{th}$ cell, where s is greater than or equal to ½ of a total quantity of all the adjacent cells of the $i^{th}$ cell.

Optionally, if it is determined that a sum of $R_i^2$ and $R_i^3$ of the $i^{th}$ cell is greater than a second preset threshold, it is determined that a too early handover or a ping-pong handover exists between the $i^{th}$ cell and t adjacent cells, and it is determined that no too late handover exists between the $i^{th}$ cell and all the adjacent cells, it is determined that a global too early handover or ping-pong handover problem exists in the $i^{th}$ cell, where t is greater than or equal to ½ of a total quantity of all the adjacent cells of the $i^{th}$ cell.

Optionally, if it is determined that no global handover problem exists in the $i^{th}$ cell, and that a too late handover exists between the $i^{th}$ cell and a $k^{th}$ adjacent cell, it is determined that a local too late handover problem exists in the $i^{th}$ cell, where the $k^{th}$ adjacent cell is any adjacent cell whose $r_{ik}^1$ is greater than the first preset threshold.

Optionally, if it is determined that no global handover problem exists in the $i^{th}$ cell, and that a too early handover or a ping-pong handover exists between the $i^{th}$ cell and an $m^{th}$ adjacent cell, it is determined that a local too early handover or ping-pong handover problem exists in the $i^{th}$ cell, where the $m^{th}$ adjacent cell is any adjacent cell whose $r_{im}^2$ or $r_{im}^3$ is greater than the second preset threshold.

The receiver 706 may be configured to receive a global handover performance parameter, a local handover performance parameter, a handover parameter, and indication information for a handover problem, within the preset time, of each adjacent cell that are sent by all the adjacent cells of the $i^{th}$ cell, where a global handover performance parameter of the $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, j=1, . . . , J, and J is a quantity of all the adjacent cells of the $i^{th}$ cell.

Further, the processor 701 may be further configured to optimize, if it is determined according to the handover problem of the $i^{th}$ cell, the handover problems of all the adjacent cells, and $R_i$, $r_i$, $R_j$, and $r_j$ which are within the preset time that the $i^{th}$ cell is a cell to be optimized, according to $R_i$, $r_i$, $R_j$, and $r_j$, the handover parameter of the $i^{th}$ cell, and the handover parameters of the adjacent cells of the $i^{th}$ cell by using a data statistical regression method, the handover parameter corresponding to the handover problem of the $i^{th}$ cell, to acquire an optimized handover parameter of the $i^{th}$ cell within a new preset time.

Preferably, the determining according to the handover problem of the $i^{th}$ cell, the handover problems of all the adjacent cells, and $R_i$, $r_i$, $R_j$, and $r_j$ which are within the preset time that the $i^{th}$ cell is a cell to be optimized may include the following.

If it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is greater than a weighted sum of $R_j^1$, $R_j^2$, and $R_j^3$ of each adjacent cell in which a global handover problem exists, determining that the $i^{th}$ cell is a cell to be optimized.

If it is determined that a global handover problem exists in the any adjacent cell, that a global handover problem exists in the $i^{th}$ cell, and that a weighted sum of $R_i^1$, $R_i^2$, and $R_i^3$ of the $i^{th}$ cell is equal to a weighted sum of $R_j^1$, $R_j^2$, and $R_j^3$ of any adjacent cell in which a global handover problem exists, and it is determined that a sum of $R_i^1$ and $R_i^2$ of the $i^{th}$ cell is greater than a sum of $R_j^1$ and $R_j^2$ of each adjacent cell in which a global handover problem exists, determining that the $i^{th}$ cell is a cell to be optimized.

If it is determined that a global handover problem exists in none of the adjacent cells, and that a global handover problem exists in the $i^{th}$ cell, determining that the $i^{th}$ cell is a cell to be optimized.

If it is determined that a global handover problem exists in none of the adjacent cells, that no global handover problem exists in the $i^{th}$ cell, and that a local handover problem exists in the $i^{th}$ cell, and it is determined that a local handover problem exists in none of the adjacent cells, determining that the $i^{th}$ cell is a cell to be optimized.

If it is determined that a global handover problem exists in none of the adjacent cells, that no global handover problem exists in the $i^{th}$ cell, and that a local handover problem exists in the $i^{th}$ cell, and it is determined that a local handover problem exists in any one of the adjacent cells, and that a weighted sum of $r_{ib}^1$, $r_{ib}^2$, and $r_{ib}^3$ of the $i^{th}$ cell with respect to a $b^{th}$ adjacent cell is greater than or equal to a weighted sum of $r_{bi}^1$, $r_{bi}^2$, and $r_{bi}^3$ of the $b^{th}$ adjacent cell with respect to the $i^{th}$ cell, determining that the $i^{th}$ cell is a cell to be optimized, where the $b^{th}$ adjacent cell is any one of adjacent cells in which a local handover problem exists.

Further, the processor 701 may be configured to:

set, according to a global handover problem that exists in the $i^{th}$ cell, search space $\chi$ of the global handover problem.

When the handover problem of the $i^{th}$ cell is a global too late handover problem, search space $\chi$ is $[H_{min}, H_i] \times [T_{min}, T_i]$, where $H_{min}$ represents a lower limit, of a value range of a hysteresis H, regulated in the standards, $T_{max}$ represents a lower limit, of a value range of a time to trigger T, regulated in the standards, $H_i$ represents a hysteresis, within the preset time, of the $i^{th}$ cell, and $T_i$ represents a time to trigger, within the preset time, of the $i^{th}$ cell.

When the handover problem of the $i^{th}$ cell is a global too early handover or ping-pong handover problem, the search space $\chi$ is $[H_i, H_{max}] \times [T_i, T_{max}]$, where $H_{max}$ represents an upper limit, of a value range of a hysteresis H, regulated in the standards, and $T_{max}$ represents an upper limit, of a value range of a time to trigger T, regulated in the standards.

The processor 701 may further be configured to acquire $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n = \{x'_{ij}(c): j=1, \ldots, J, c=1, \ldots, n\}$, $x'_{ij} = x_i - z_{ij}$, $x_i = (H_i, T_i)^T$, and $z_{ij} = (O_{ij}, 0)^T$; $U_n = \{u'_{ij}(c): j=1, \ldots, J, c=1, \ldots, n\}$, $u'_{ij} = u_{ij} - v_{ij}$, $u_{ij} = (H_i, T_i, H_j, T_j)^T$, and $v_{ij} = (O_{ij}, 0, O_{ji}, 0)^T$; $Q_n$ is a sampled value of a function $F_i(x_i, z_{ij})$ of an indicator $L\_RLF_i$ of a link failure caused by a global too late handover from the $i^{th}$ cell to the $j^{th}$ adjacent cell, $F_i(x_i, z_{ij}) = \Sigma_{j=1}^J w_{ij}^1 f(x_i - z_{ij})$, and $w_{ij}^1$ is a preset weighted value, where Hj is a hysteresis of the $j^{th}$ adjacent cell, $T_j$ is a time to trigger of the $j^{th}$ adjacent cell, and $O_{ji}$ is an individual offset between the $j^{th}$ adjacent cell and the $i^{th}$ cell.

The processor 701 may further be configured to calculate $$\tilde{x}_i(n+1) = \underset{x_i \in \chi}{\operatorname{argmin}} L_i^n(x_i)$$

according to a Gaussian process regression model within the search space $\chi$ of the global handover problem, where $x_i$ is a variable of a handover parameter, $\tilde{x}_i(n+1)$ is an optimized handover parameter, to be calculated, of the $i^{th}$ cell within a new preset time, $L_i^n(\bullet)$ is a customized function and $L_i^n(x_i) = w^T(\mu_i(x_i|X_n,Q_n,U_n,Y_n) - C\sigma_i(x_i|X_n,Q_n,U_n,Y_n))$, $w^T$ is a weighted value of each handover performance parameter, $\mu_i(\bullet)$ is a mean value of a Gaussian function, $\sigma_i(\bullet)$ is a variance of the Gaussian function, and C is a compromise factor specified in advance.

The processor 701 may further be configured to use $\tilde{x}_i(n+1)$ as an optimized handover parameter, within the new preset time, calculated according to the preset Gaussian process regression model, for the handover parameter corresponding to the global handover problem of the $i^{th}$ cell.

Further, the processor 701 may be configured to:

set, according to a local handover problem that exists in the $i^{th}$ cell, search space Z of the local handover problem.

When the handover problem of the $i^{th}$ cell is a local too late handover problem, the search space Z is $[O_{ij}, O_{max}]$, where $O_{max}$ represents an upper limit, of a value range of a cell individual offset O, regulated in the standards, and $O_{ij}$ represents an individual offset between the $i^{th}$ cell and the $j^{th}$ adjacent cell.

When the handover problem of the $i^{th}$ cell is a local too early handover or ping-pong handover problem, the search space Z is $[O_{min}, O_{ij}]$, where $O_{min}$ represents a lower limit, of a value range of a cell individual offset O, regulated in the standards.

The processor 701 may further be configured to acquire $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, where $X_n = \{x'_{ij}(c): j=1, \ldots, J, c=1, \ldots, n\}$, $x'_{ij} = x_i - z_{ij}$, $x_i = (H_i, T_i)^T$, and $z_{ij} = (O_{ij}, 0)^T$; $U_n = \{u'_{ij}(c): j=1, \ldots, J, c=1, \ldots, n\}$, $u'_{ij} = u_i - v_{ij}$, $u_{ij} = (H_i, T_i, H_j, T_j)^T$, and $v_{ij} = (O_{ij}, 0, O_{ji}, 0)^T$; $Q_n$ is a sampled value of a function $F_i(x_i, z_{ij})$ of an indicator L_RLF$_i$ of a link failure caused by a global too late handover from the $i^{th}$ cell to the $j^{th}$ adjacent cell, $F_i(x_i, z_{ij}) = \sum_{j=1}^{J} w_{ij}^1 f(x_i - z_{ij})$, and $w_{ij}^1$ is a preset weighted value; and $Y_n$ is a sampled value of a function $G_i(u_{ij}, v_{ij})$ of superposition of an indicator E_RLF$_{ij}$ of a link failure caused by a global too early handover from the $i^{th}$ cell to the $j^{th}$ adjacent cell and an indicator PPH$_{ij}$ of a link failure caused by a ping-pong handover from the $i^{th}$ cell to the $j^{th}$ adjacent cell, $G_i(u_{ij}, v_{ij}) = \sum_{j=1}^{J_i} W_{ij} g_{ij}(u_{ij} - v_{ij})$, and $W_{ij}$ is a preset weighted value, where $H_j$ is a hysteresis of the $j^{th}$ adjacent cell, $T_j$ is a time to trigger of the $j^{th}$ adjacent cell, and $O_{ji}$ is an individual offset between the $j^{th}$ adjacent cell and the $i^{th}$ cell.

The processor 701 may be further configured to calculate $$\tilde{z}_{ij}(n+1) = \underset{z_{ij} \in Z}{\operatorname{argmin}} l_{ij}^n(z_{ij})$$

according to a Gaussian process regression model within the search space Z of the local handover problem, where $z_{ij}$ is a variable of a handover parameter, $\tilde{z}_{ij}(n+1)$ is an optimized handover parameter, to be calculated, of the $i^{th}$ cell within a new preset time, is $l_{ij}^n(\bullet)$ is a customized function and $l_{ij}^n(z_{ij}) = w^T(\mu_{ij}(z_{ij}|X_n,Q_n,U_n,Y_n) - C\sigma_{ij}(z_{ij}|X_n,Q_n,U_n,Y_n))$, $w^T$ is a weighted value of each handover performance parameter, $\mu_{ij}(\bullet)$ is a mean value of a Gaussian function, $\sigma_{ij}(\bullet)$ is a variance of the Gaussian function, and C is a compromise factor specified in advance.

The processor 701 may be further configured to use $\tilde{z}_{ij}(n+1)$ as an optimized handover parameter, within the new preset time, calculated according to the preset Gaussian process regression model, for the handover parameter corresponding to the local handover problem of the $i^{th}$ cell.

When handover problems that exist in the $i^{th}$ cell include both a global too late handover problem and a global too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the global too late handover problem and an optimized handover parameter, within the new preset time, calculated for the global too early handover or ping-pong handover problem.

When handover problems that exist in the $i^{th}$ cell include both a local too late handover problem and a local too early handover or ping-pong handover problem, the optimized handover parameter, within the new preset time, for the handover parameter corresponding to the handover problem of the $i^{th}$ cell is a weighted sum of an optimized handover parameter, within the new preset time, calculated for the local too late handover problem and an optimized handover parameter within the new preset time calculated for the local too early handover or ping-pong handover problem.

Further, the processor 701 may be further configured to classify users in the $i^{th}$ cell into at least two types of users according to movement speeds of the users in the $i^{th}$ cell. Correspondingly, the processor 701 may be configured as described in the following paragraphs.

The processor 701 may further be configured to acquire a global handover performance parameter $R_i$, a local handover performance parameter $r_i$, and a handover parameter, within the preset time, of a first-type user in the $i^{th}$ cell.

The processor 701 may further be configured to detect a handover problem, existing within the preset time, of the first-type user in the $i^{th}$ cell according to $R_i$ and $r_i$.

The receiver 706 may be configured to receive a global handover performance parameter, a local handover performance parameter, a handover parameter, and indication indicating a handover problem, within the preset time, of the first-type user in each adjacent cell that are sent by all the adjacent cells of the $i^{th}$ cell, where a global handover performance parameter of the first-type user in the $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, $j=1, \ldots, J$, and J is a quantity of all the adjacent cells of the $i^{th}$ cell.

The processor 701 may be further configured to determine, according to the handover problem of the first-type user in the $i^{th}$ cell within the preset time, the handover problems of the first-type users in all the adjacent cells and $R_i$, $r_i$, $R_j$, and $r_j$, whether the $i^{th}$ cell is a cell to be optimized.

The processor 701 may be further configured to: if it is determined that the $i^{th}$ cell is a cell to be optimized, optimize, according to $R_i$, $r_i$, $R_j$, and $r_j$, the handover parameter of the $i^{th}$ cell, and the handover parameters of the adjacent cells of the $i^{th}$ cell by using the data statistical regression method, a handover parameter corresponding to the handover problem of the first-type user in the $i^{th}$ cell, to acquire an optimized handover parameter of the first-type user in the $i^{th}$ cell within the new preset time.

The sender 705 may be configured to: send, to each adjacent cell of the $i^{th}$ cell, n, the handover parameter, and the indication information for the handover problem that are of the $i^{th}$ cell within the preset time. According to the device 60 for optimizing a handover parameter provided in this embodiment of the present disclosure, each cell acquires a global handover performance parameter R, a local handover performance parameter r, and a handover parameter of a respective cell that are within a preset time. Each cell detects a handover problem, existing within the preset time, of the respective cell according to R and r. Each cell receives a global handover performance parameter, a local handover performance parameter, a handover parameter, and indication information for a handover problem, within the preset time, of each adjacent cell that are sent by all adjacent cells of the respective cell. Each cell determines whether the respective cell is a cell to be optimized. If an $i^{th}$ cell is a cell to be optimized, the cell optimizes, according to $R_i$, $r_i$, $R_j$, and $r_j$, the handover parameter of the $i^{th}$ cell, and the handover parameters of the adjacent cells of the $i^{th}$ cell by using a data statistical regression method, a handover parameter corresponding to a handover problem of the $i^{th}$ cell. Distributed selection of a cell to be optimized is implemented, so that optimization of a handover parameter of the cell to be optimized is beneficial to improvement of performance of an entire network, thereby resolving defects, during optimization of a handover parameter of a problematic cell according to a statistical observation method, of failing to consider optimization of an entire network and failing to improve performance of the entire network.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method, comprising:
   acquiring a global handover performance parameter $R_i$, a local handover performance parameter $r_i$, and a handover parameter of an $i^{th}$ cell that are within a preset time;
   detecting a handover problem, existing within the preset time, of the $i^{th}$ cell according to $R_i$ and $r_i$;
   receiving a global handover performance parameter, a local handover performance parameter, a handover parameter, and indication information for a handover problem, within the preset time, of each adjacent cell that are sent by all adjacent cells of the $i^{th}$ cell, wherein a global handover performance parameter of a $j^{th}$ adjacent cell within the preset time is represented by $R_j$, a local handover performance parameter is represented by $r_j$, and the $j^{th}$ adjacent cell is any adjacent cell of all the adjacent cells of the $i^{th}$ cell, and wherein j=1, . . . , J, and J is a quantity of all the adjacent cells of the $i^{th}$ cell; and
   optimizing the handover parameter corresponding to the handover problem of the $i^{th}$ cell to acquire an optimized handover parameter of the $i^{th}$ cell within a new preset time, wherein the optimizing is performed in response to a determination, according to the handover problem of the $i^{th}$ cell, the handover problems of all the adjacent cells, and $R_i$, $r_i$, $R_j$, and $r_j$ which are within the preset time, that the $i^{th}$ cell is a cell to be optimized, and wherein the optimizing is performed according to $R_i$, $r_i$, $R_j$, and $r_j$, the handover parameter of the $i^{th}$ cell, and the handover parameters of the adjacent cells of the $i^{th}$ cell by using a data statistical regression method.

2. The method according to claim 1, wherein the optimizing comprises:
   setting, according to a global handover problem that exists in the $i^{th}$ cell, a search space $\chi$ of the global handover problem;
   acquiring $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, wherein $X_n=\{x'_{ij}(c): j=1, \ldots, J, c=1, \ldots, n\}$, $x'_{ij}=x_i-z_{ij}$, $x_i=(H_i,T_i)^T$, and $z_{ij}=(O_{ij},0)^T$, wherein $U_n=\{u'_{ij}(c): j=1, \ldots, J, c=1, \ldots, n\}$, $u'_{ij}=u_{ij}-v_{ij}$, $u_{ij}=(H_i,T_i,H_j,T_j)^T$, and $v_{ij}=(O_{ij},0,O_{ji},0)^T$, wherein $Q_n$ is a sampled value of a function $F_i(x_i,z_{ij})$ of an indicator $L\_RLF_i$ of a link failure caused by a global too late handover from the $i^{th}$ cell to the $j^{th}$ adjacent cell, wherein $F_i(x_i,z_{ij})=\Sigma_{j=1}^{J} w_{ij}^{1} f(x_i-z_{ij})$ and $w_{ij}^1$ is a preset weighted value, wherein $Y_n$ is a sampled value of a function $G_i(u_{ij},v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, wherein $G_i(u_{ij},v_{ij})=\Sigma_{j=1}^{J} W_{ij} g_{ij}(u_{ij}-v_{ij})$, and $W_{ij}$ is a preset weighted value, wherein $H_j$ is a hysteresis of the $j^{th}$ adjacent cell, $T_j$ is a time to trigger of the $j^{th}$ adjacent cell, and wherein $O_{ji}$ is an individual offset between the $j^{th}$ adjacent cell and the $i^{th}$ cell; calculating $$\tilde{x}_i(n+1) = \underset{x_i \in \chi}{\operatorname{argmin}} L_i^n(x_i)$$

according to a preset Gaussian process regression model within the search space $\chi$ of the global handover problem, wherein $x_i$ is a variable of a handover parameter, $\tilde{x}_i(n+1)$ is an optimized handover parameter, to be calculated, of the $i^{th}$ cell within a new preset time, $L_i^n(\bullet)$ is a customized function and $L_i^n(x_i)=w^T(\mu_i(x_i|X_n,Q_n,U_n,Y_n)-C\sigma_i(x_i|X_n,Q_n,U_n,Y_n))$, $w^T$ is a weighted value of each handover performance parameter, $\mu_i(\bullet)$ is a mean value of a Gaussian function, $\sigma_i(\bullet)$ is a variance of the Gaussian function, and C is a compromise factor specified in advance; and using $\tilde{x}_i(n+1)$ as an optimized handover parameter, within the new preset time, calculated according to the preset Gaussian process regression model, for the handover parameter corresponding to the global handover problem of the $i^{th}$ cell.

3. The method according to claim 2, wherein, in response to the handover problem of the $i^{th}$ cell being a global too late handover problem, the search space $\chi$ is $[H_{min},H_i]\times[T_{min},T_i]$, wherein $H_{min}$ represents a lower limit, of a value range of a hysteresis H, regulated in the standards, $T_{min}$ represents a lower limit, of a value range of a time to trigger T, regulated in the standards, $H_i$ represents a hysteresis, within the preset time, of the $i^{th}$ cell, and $T_i$ represents a time to trigger, within the preset time, of the $i^{th}$ cell, or wherein, in response to the handover problem of the $i^{th}$ cell being a global too early handover or ping-pong handover problem, the search space $\chi$ is $[H_i,H_{max}]\times[T_i,T_{max}]$, wherein $H_{max}$ represents an upper limit, of a value range of a hysteresis H, regulated in the standards, and $T_{max}$ represents an upper limit, of a value range of a time to trigger T, regulated in the standards.

4. The method according to claim 1, wherein the optimizing comprises:

setting, according to a local handover problem that exists in the $i^{th}$ cell, a search space Z of the local handover problem;

acquiring $\{X_n,Q_n,U_n,Y_n\}$ through calculation according to handover parameters at a current sampling moment and consecutive (n−1) sampling moments before the current sampling moment within the preset time, the global handover performance parameter $R_i$, and the local handover performance parameter $r_i$, wherein $X_n=\{x'_{ij}(c): j=1, \ldots, J, c=1, \ldots, n\}$, $x'_{ij}=x_i-z_{ij}$, $x_i=(H_i,T_i)^T$, and $z_{ij}=(O_{ij},0)^T$, wherein $U_n=\{u'_{ij}(c): j=1, \ldots, J, c=1, \ldots, n\}$, $u'_{ij}=u_{ij}-v_{ij}$, $u_{ij}=(H_i,T_i,H_j,T_j)^T$, and $v_{ij}=(O_{ij},0,O_{ji},0)^T$, wherein $Q_n$ is a sampled value of a function $F_i(x_i,z_{ij})$ of an indicator $L\_RLF_i$ of a link failure caused by a global too late handover from the $i^{th}$ cell to the $j^{th}$ adjacent cell, wherein $F_i(x_i,z_{ij})=\Sigma_{j=1}^{J} w_{ij}^{1} f(x_i-z_{ij})$ and $w_{ij}^1$ is a preset weighted value, wherein $Y_n$ is a sampled value of a function $G_i(u_{ij},v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, wherein $G_i(u_{ij},v_{ij})=\Sigma_{j=1}^{J} W_{ij} g_{ij}(u_{ij}-v_{ij})$, and $W_{ij}$ is a preset weighted value, wherein $H_j$ is a hysteresis of the $j^{th}$ adjacent cell, $T_j$ is a time to trigger of the $j^{th}$ adjacent cell, and wherein $O_{ji}$ is an individual offset between the $j^{th}$ adjacent cell and the $i^{th}$ cell; calculating $$\tilde{z}_{ij}(n+1) = \underset{z_{ij} \in Z}{\operatorname{argmin}} l_{ij}^n(z_{ij})$$

according to a Gaussian process regression model within the search space Z of the local handover problem, wherein $z_{ij}$ is a variable of a handover parameter, $\tilde{z}_{ij}(n+1)$ is an optimized handover parameter, to be calculated, of the $i^{th}$ cell within a new preset time, $l_{ij}^n(\bullet)$ is a customized function and $l_{ij}^n(z_{ij})=w^T(\mu_{ij}(z_{ij}|X_n,Q_n,U_n,Y_n)-C\sigma_{ij}(z_{ij}|X_n,Q_n,U_n,Y_n))$, $w^T$ is a weighted value of each handover performance parameter, $\mu_{ij}(\bullet)$ is a mean value of a Gaussian function, $\sigma_{ij}(\bullet)$ is a variance of the Gaussian function, and C is a compromise factor specified in advance; and using $\tilde{z}_{ij}(n+1)$ as an optimized handover parameter, within the new preset time, calculated according to the preset Gaussian process regression model, for the handover parameter corresponding to the local handover problem of the $i^{th}$ cell.

5. The method for optimizing a handover parameter according to claim 4, wherein, in response to the handover problem of the $i^{th}$ cell being a local too late handover problem, the search space Z is $[O_{ij},O_{max}]$, wherein $O_{max}$ represents an upper limit, of a value range of a cell individual offset O, regulated in the standards, and $O_{ij}$ represents an individual offset between the $i^{th}$ cell and the $j^{th}$ adjacent cell, or wherein, in response to the handover problem of the $i^{th}$ cell being a local too early handover or ping-pong handover problem, the search space Z is $[O_{min},O_{ij}]$, wherein $O_{min}$ represents a lower limit, of a value range of a cell individual offset O, regulated in the standards.

6. The method according to claim 1, wherein, in response to handover problems that exist in the $i^{th}$ cell comprising a global too late handover problem and a global too early handover or a ping-pong handover problem, the optimized handover parameter, within the new preset time, for the handover parameter corresponding to the handover problem of the $i^{th}$ cell, is a weighted sum of an optimized handover parameter, within the new preset time, calculated for the global too late handover problem and an optimized handover parameter, within the new preset time, calculated for the global too early handover or ping-pong handover problem, or wherein, in response to handover problems that exist in the $i^{th}$ cell comprising a local too late handover problem and a local too early handover or a ping-pong handover problem, the optimized handover parameter, within the new preset time, for the handover parameter corresponding to the handover problem of the $i^{th}$ cell is a weighted sum of an optimized handover parameter, within the new preset time, calculated for the local too late handover problem and an optimized handover parameter within the new preset time calculated for the local too early handover or ping-pong handover problem.

7. The method according to claim 1, further comprising:
classifying users in the $i^{th}$ cell into at least two types of users according to movement speeds of the users in the $i^{th}$ cell,
wherein the acquiring comprises acquiring a global handover performance parameter $R_i$, a local handover performance parameter $r_i$, and a handover parameter of a first-type user in the $i^{th}$ cell within the preset time, wherein the first-type user is any one type of users of the at least two types of users into which the users in the $i^{th}$ cell are classified according to the movement speeds of the users in the $i^{th}$ cell,
wherein the detecting comprises detecting a handover problem, existing within the preset time, of the first-type user in the $i^{th}$ cell according to $R_i$ and $r_i$ of the first-type user,
wherein the receiving comprises receiving a global handover performance parameter, a local handover performance parameter, a handover parameter, and indication information for a handover problem, within the preset time, of the first-type user in each adjacent cell that are sent by all the adjacent cells of the $i^{th}$ cell, wherein a global handover performance parameter of a first-type user in the $j^{th}$ adjacent cell within the preset time is represented by $R_j$, a local handover performance parameter is represented by $r_j$, the $j^{th}$ adjacent cell is any adjacent cell of all the adjacent cells of the $i^{th}$ cell, $j=1, \ldots, J$, and J is a quantity of all the adjacent cells of the $i^{th}$ cell, and
wherein the optimizing comprises optimizing a handover parameter corresponding to the handover problem of the first-type user in the $i^{th}$ cell to acquire an optimized handover parameter of the first-type user in the $i^{th}$ cell within a new preset time, wherein the optimizing is performed in response to a determination, according to the handover problem of the first-type user in the $i^{th}$ cell, the handover problems of the first-type users of all the adjacent cells, and $R_i$, $r_i$, $R_j$, and $r_j$ which are within the preset time, that the $i^{th}$ cell is a cell to be optimized, and wherein the optimizing is performed according to $R_i$, $r_i$, $R_j$, and $r_j$, the handover parameter of the $i^{th}$ cell, and the handover parameters of the adjacent cells of the $i^{th}$ cell by using the data statistical regression method.

8. The method according to claim 1, wherein the determining, according to the handover problem of the $i^{th}$ cell, the handover problems of all the adjacent cells, and $R_i$, $r_i$, $R_j$, and $r_j$ which are within the preset time, that the $i^{th}$ cell is a cell to be optimized comprises:
determining that the $i^{th}$ cell is a cell to be optimized, in response to a determination that a global handover problem exists in the any adjacent cell, that a global handover problem exists in the $i^{th}$ cell, and that a weighted sum of $R_i^1$, $R_i^2$, and $R_i^3$ of the $i^{th}$ cell is greater than a weighted sum of $R_j^1$, $R_j^2$, and $R_j^3$ of each adjacent cell in which a global handover problem exists, or
determining that the $i^{th}$ cell is a cell to be optimized, in response to a determination that a global handover problem exists in the any adjacent cell, that a global handover problem exists in the $i^{th}$ cell, and that a weighted sum of $R_i^1$, $R_i^2$, and $R_i^3$ of the $i^{th}$ cell is equal to a weighted sum of $R_j^1$, $R_j^2$, and $R_j^3$ of any adjacent cell in which a global handover problem exists, and it is determined that a sum of $R_i^1$ and $R_i^2$ of the $i^{th}$ cell is greater than a sum of $R_j^1$ and $R_j^2$ of each adjacent cell in which a global handover problem exists, or
determining that the $i^{th}$ cell is a cell to be optimized, in response to a determination that a global handover problem exists in none of the adjacent cells, and that a global handover problem exists in the $i^{th}$ cell, or
determining that the $i^{th}$ cell is a cell to be optimized, in response to a determination that a global handover problem exists in none of the adjacent cells, that no global handover problem exists in the $i^{th}$ cell, and that a local handover problem exists in the $i^{th}$ cell, and it is determined that a local handover problem exists in none of the adjacent cells, or
determining that the $i^{th}$ cell is a cell to be optimized, in response to a determination that a global handover problem exists in none of the adjacent cells, that no global handover problem exists in the $i^{th}$ cell, and that a local handover problem exists in the $i^{th}$ cell, and it is determined that a local handover problem exists in any one of the adjacent cells, and that a weighted sum of $r_{ib}^1$, $r_{ib}^2$, and $r_{ib}^3$ of the $i^{th}$ cell with respect to a $b^{th}$ adjacent cell is greater than or equal to a weighted sum of $r_{bi}^1$, $r_{bi}^2$, and $r_{bi}^3$ of the $b^{th}$ adjacent cell with respect to the $i^{th}$ cell, wherein the $b^{th}$ adjacent cell is any one of adjacent cells in which a local handover problem exists.

9. The method according to claim 1, wherein the handover problem comprises a global handover problem and a local handover problem, wherein the global handover problem comprises a global too late handover problem and a global too early handover or a ping-pong handover problem, and wherein the local handover problem comprises a local too late handover problem and a local too early handover or a ping-pong handover problem.

10. The method according to claim 1, wherein the detecting comprises:
determining that a global too late handover problem and a global too early handover or a ping-pong handover problem exist in the $i^{th}$ cell, in response to a determination that a too late handover and a too early handover or a ping-pong handover exist between the $i^{th}$ cell and A adjacent cells, wherein A is greater than or equal to ½ of a total quantity of all the adjacent cells of the $i^{th}$ cell;
determining that a global too late handover problem exists in the $i^{th}$ cell, in response to a determination that $R_i^1$ of the $i^{th}$ cell is greater than a first preset threshold, and it is determined that a too late handover exists between the $i^{th}$ cell and s adjacent cells, and that no too early handover or ping-pong handover exists between the $i^{th}$ cell and all the adjacent cells, wherein s is greater than or equal to ½ of a total quantity of all the adjacent cells of the $i^{th}$ cell;
determining that a global too early handover or a ping-pong handover problem exists in the $i^{th}$ cell, in response to a determination that a sum of $R_i^2$ and $R_i^3$ of the $i^{th}$ cell is greater than a second preset threshold, and it is determined that a too early handover or a ping-pong handover exists between the $i^{th}$ cell and t adjacent cells, and it is determined that no too late handover exists between the $i^{th}$ cell and all the adjacent cells, wherein t is greater than or equal to ½ of a total quantity of all the adjacent cells of the $i^{th}$ cell;

determining that a local too late handover problem exists in the $i^{th}$ cell, in response to a determination that no global handover problem exists in the $i^{th}$ cell, and that a too late handover exists between the $i^{th}$ cell and a $k^{th}$ adjacent cell, wherein the $k^{th}$ adjacent cell is any adjacent cell whose $r_{ik}^1$ is greater than the first preset threshold; and determining that a local too early handover or a ping-pong handover problem exists in the $i^{th}$ cell, in response to a determination that no global handover problem exists in the $i^{th}$ cell, and that a too early handover or a ping-pong handover exists between the $i^{th}$ cell and an $m^{th}$ adjacent cell, wherein the $m^{th}$ adjacent cell is any adjacent cell whose $r_{im}^2$ or $r_{im}^3$ is greater than the second preset threshold.

11. A device, comprising:

a processor; and a computer-readable storage medium storing a program to be executed by the processor, the program including instructions for:

acquiring a global handover performance parameter $R_i$, a local handover performance parameter $r_i$, and a handover parameter of an $i^{th}$ cell that are within a preset time;

detecting a handover problem, existing within the preset time, of the $i^{th}$ cell according to $R_i$ and $r_i$;

receiving a global handover performance parameter, a local handover performance parameter, a handover parameter, and indication information for a handover problem, within the preset time, of each adjacent cell that are sent by all adjacent cells of the $i^{th}$ cell, wherein a global handover performance parameter of a $j^{th}$ adjacent cell within the preset time is represented by $R_j$, a local handover performance parameter is represented by $r_j$, and the $j^{th}$ adjacent cell is any adjacent cell of all the adjacent cells of the $i^{th}$ cell, and wherein $j=1, \ldots, J$, and J is a quantity of all the adjacent cells of the $i^{th}$ cell; and optimizing the handover parameter corresponding to the handover problem of the $i^{th}$ cell to acquire an optimized handover parameter of the $i^{th}$ cell within a new preset time, wherein the optimizing is performed in response to a determination, according to the handover problem of the $i^{th}$ cell, the handover problems of all the adjacent cells, and $R_i$, $r_i$, $R_j$, and $r_j$ which are within the preset time, that the $i^{th}$ cell is a cell to be optimized, and wherein the optimizing is performed according to $R_i$, $r_i$, $R_j$, and $r_j$, the handover parameter of the $i^{th}$ cell, and the handover parameters of the adjacent cells of the $i^{th}$ cell by using a data statistical regression method.

12. The device according to claim 11, wherein the program further includes instructions for:

setting, according to a global handover problem that exists in the $i^{th}$ cell, a search space $\chi$ of the global handover problem;

acquiring $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, wherein $X_n = \{x'_{ij}(c): j=1, \ldots, J, c=1, \ldots, n\}$, $x'_{ij} = x_i - z_{ij}$, $x_i = (H_i, T_i)^T$, and $z_{ij} = (O_{ij}, 0)^T$, wherein $U_n = \{u'_{ij}(c): j=1, \ldots, J, c=1, \ldots, n\}$, $u'_{ij} = u_{ij} - v_{ij}$, $u_{ij} = (H_i, T_i, H_j, T_j)^T$, and $v_{ij} = (O_{ij}, 0, O_{ji}, 0)^T$, wherein $Q_n$ is a sampled value of a function $F_i(x_i, z_{ij})$ of an indicator $L\_RLF_i$ of a link failure caused by a global too late handover from the $i^{th}$ cell to the $j^{th}$ adjacent cell, $F_i(x_i, z_{ij}) = \sum_{j=1}^J w_{ij}^1 f(x_i - z_{ij})$ and $w_{ij}^1$ is a preset weighted value, wherein $Y_n$ is a sampled value of a function $G_i(u_{ij}, v_{ij})$ of superposition of an indicator $E\_RLF_{ij}$ of a link failure caused by a global too early handover from the $i^{th}$ cell to the $j^{th}$ adjacent cell and an indicator $PPH_{ij}$ of a link failure caused by a ping-pong handover from the $i^{th}$ cell to the $j^{th}$ adjacent cell, wherein $G_i(u_{ij}, v_{ij}) = \sum_{j=1}^{J_i} W_{ij} g_{ij}(u_{ij} - v_{ij})$ and $W_{ij}$ is a preset weighted value, wherein $H_j$ is a hysteresis of the $j^{th}$ adjacent cell, $T_j$ is a time to trigger of the $j^{th}$ adjacent cell, and wherein $O_{ji}$ is an individual offset between the $j^{th}$ adjacent cell and the $i^{th}$ cell;

calculating $$\tilde{x}_i(n+1) = \underset{x_i \in \chi}{\operatorname{argmin}} L_i^n(x_i)$$

according to the Gaussian process regression model within the search space $\chi$ of the global handover problem, wherein $x_i$ is a variable of a handover parameter, $\tilde{x}_i(n+1)$ is an optimized handover parameter, to be calculated, of the $i^{th}$ cell within a new preset time, $L_i^n(\bullet)$ is a customized function and $L_i^n(x_i) = w^T(\mu_i(x_i | X_n, Q_n, U_n, Y_n) - C\sigma_i(x_i | X_n, Q_n, U_n, Y_n))$, $w^T$ is a weighted value of each handover performance parameter, is $\mu_i(\bullet)$ is a mean value of a Gaussian function, $\sigma_i(\bullet)$ is a variance of the Gaussian function, and C is a compromise factor specified in advance; and using $\tilde{x}_i(n+1)$ as an optimized handover parameter, within the new preset time, calculated according to the preset Gaussian process regression model, for the handover parameter corresponding to the global handover problem of the $i^{th}$ cell.

13. The device according to claim 12, wherein the search space $\chi$ is $[H_{min}, H_i] \times [T_{min}, T_i]$, in response to the handover problem of the $i^{th}$ cell being a global too late handover problem, wherein $H_{min}$ represents a lower limit, of a value range of a hysteresis H, regulated in the standards, $T_{min}$ represents a lower limit, of a value range of a time to trigger T, regulated in the standards, $H_i$ represents a hysteresis, within the preset time, of the $i^{th}$ cell, and $T_i$ represents a time to trigger, within the preset time, of the $i^{th}$ cell, or wherein the search space $\chi$ is $[H_i, H_{max}] \times [T_i, T_{max}]$, in response to the handover problem of the $i^{th}$ cell being a global too early handover or ping-pong handover problem, wherein $H_{max}$ represents an upper limit, of a value range of a hysteresis H, regulated in the standards, and $T_{max}$ represents an upper limit, of a value range of a time to trigger T, regulated in the standards.

14. The device according to claim 11, wherein the program further includes instructions for:

setting, according to a local handover problem that exists in the $i^{th}$ cell, a search space Z of the local handover problem;

acquiring $\{X_n, Q_n, U_n, Y_n\}$ through calculation according to handover parameters at a current sampling moment and consecutive (n−1) sampling moments before the current sampling moment within the preset time, the global handover performance parameter $R_i$, and the local handover performance parameter $r_i$, wherein $X_n = \{x'_{ij}(c): j=1, \ldots, J, c=1, \ldots, n\}$, $x'_{ij} = x_i - z_{ij}$, $x_i=(H_i,T_i)^T$, and $z_{ji}=(O_{ij},0)^T$, wherein $U_n=\{u'_{ij}(c): j=1,\ldots,J, c=1,\ldots,n\}$, $u'_{ij}=u_{ij}-v_{ij}$, $u_{ij}=(H_i,T_i,H_j,T_j)^T$, and $v_{ij}=(O_{ij},0,O_{ji},0)^T$, wherein $Q_n$ is a sampled value of a function $F_i(x_i,z_{ji})$ of an indicator L_RLF$_i$ of a link failure caused by a global too late handover from the i$^{th}$ cell to the j$^{th}$ adjacent cell, wherein $F_i(x_i,z_{ji})=\Sigma_{j=1}^{J}w_{ij}^{\ 1}f(x_i-z_{ij})$ and $w_{ij}^{\ 1}$ is a preset weighted value, wherein $Y_n$ is a sampled value of a function $G_i(u_{ij},v_{ij})$ of superposition of an indicator E_RLF$_{ij}$ of a link failure caused by a global too early handover from the i$^{th}$ cell to the j$^{th}$ adjacent cell and an indicator PPH$_{ij}$ of a link failure caused by a ping-pong handover from the i$^{th}$ cell to the j$^{th}$ adjacent cell, wherein $G_i(u_{ij},v_{ij})=\Sigma_{j=1}^{J_i}W_{ij}g_{ij}(u_{ij}-v_{ij})$ and $W_{ij}$ is a preset weighted value, wherein $H_j$ is a hysteresis of the j$^{th}$ adjacent cell, $T_j$ is a time to trigger of the j$^{th}$ adjacent cell, and wherein $O_{ji}$ is an individual offset between the j$^{th}$ adjacent cell and the i$^{th}$ cell;

calculating $$\tilde{z}_{ij}(n+1) = \operatorname*{argmin}_{z_{ij}\in Z} l_{ij}^n(z_{ij})$$

according to a Gaussian process regression model within the search space Z of the local handover problem, wherein $z_{ij}$ is a variable of a handover parameter, $\tilde{z}_{ij}(n+1)$ is an optimized handover parameter, to be calculated, of the i$^{th}$ cell within a new preset time, $l_{ij}^n(\bullet)$ is a customized function and $l_{ij}^n(z_{ij})=w^T(\mu_{ij}(z_{ij}|X_n,Q_n,U_n,Y_n)-C\sigma_{ij}(z_{ij}|X_n,Q_n,U_n,Y_n))$, $w^T$ is a weighted value of each handover performance parameter, $\mu_{ij}(\bullet)$ is a mean value of a Gaussian function, $\sigma_{ij}(\bullet)$ is a variance of the Gaussian function, and C is a compromise factor specified in advance; and using $\tilde{z}_{ij}(n+1)$ as an optimized handover parameter, within the new preset time, calculated according to the preset Gaussian process regression model, for the handover parameter corresponding to the local handover problem of the i$^{th}$ cell.

15. The device according to claim 14, wherein the search space Z is $[O_{ij},O_{max}]$, in response to the handover problem of the i$^{th}$ cell being a local too late handover problem, wherein $O_{max}$ represents an upper limit, of a value range of a cell individual offset O, regulated in the standards, and $O_{ij}$ represents an individual offset between the i$^{th}$ cell and the j$^{th}$ adjacent cell, or wherein the search space Z is $[O_{min},O_{ij}]$, in response to the handover problem of the i$^{th}$ cell being a local too early handover or ping-pong handover problem, wherein $O_{min}$ represents a lower limit, of a value range of a cell individual offset O, regulated in the standards.

16. The device according to claim 11, wherein, in response to handover problems that exist in the i$^{th}$ cell comprising a global too late handover problem and a global too early handover or ping-pong handover problem, the optimized handover parameter, within the new preset time, for the handover parameter corresponding to the handover problem of the i$^{th}$ cell is a weighted sum of an optimized handover parameter, within the new preset time, calculated for the global too late handover problem and an optimized handover parameter, within the new preset time, calculated for the global too early handover or ping-pong handover problem, or wherein, in response to handover problems that exist in the i$^{th}$ cell comprising a local too late handover problem and a local too early handover or ping-pong handover problem, the optimized handover parameter, within the new preset time, for the handover parameter corresponding to the handover problem of the i$^{th}$ cell is a weighted sum of an optimized handover parameter, within the new preset time, calculated for the local too late handover problem and an optimized handover parameter within the new preset time calculated for the local too early handover or ping-pong handover problem.

17. The device according to claim 11, wherein the program further includes instructions for:

classifying users in the i$^{th}$ cell into at least two types of users according to movement speeds of the users in the i$^{th}$ cell, wherein the acquiring comprises acquiring a global handover performance parameter $R_i$, a local handover performance parameter $r_i$, and a handover parameter, within the preset time, of a first-type user in the i$^{th}$ cell, wherein the first-type user is any one type of users of the at least two types of users into which the users in the i$^{th}$ cell are classified according to the movement speeds of the users in the i$^{th}$ cell, wherein the detecting comprises detecting a handover problem, existing within the preset time, of the first-type user in the i$^{th}$ cell according to $R_i$ and $r_i$, of the first-type user in the i$^{th}$ cell, acquired by the acquiring unit, wherein the receiving comprises receiving a global handover performance parameter, a local handover performance parameter, a handover parameter, and indication information for a handover problem, within the preset time, of the first-type user in each adjacent cell that are sent by all the adjacent cells of the i$^{th}$ cell, wherein a global handover performance parameter of a first-type user in the j$^{th}$ adjacent cell within the preset time is represented by $R_j$, a local handover performance parameter is represented by $r_j$, the j$^{th}$ adjacent cell is any adjacent cell of all the adjacent cells of the i$^{th}$ cell, $j=1,\ldots,J$, and J is a quantity of all the adjacent cells of the i$^{th}$ cell;

determining, according to the handover problem, of the first-type user in the i$^{th}$ cell within the preset time, detected by the detection unit, the handover problems of the first-type users in all the adjacent cells and $R_i$, $r_i$, $R_j$, and $r_j$ that are received by the receiving unit, whether the i$^{th}$ cell is a cell to be optimized; and optimizing a handover parameter corresponding to the handover problem of the first-type user in the i$^{th}$ cell to acquire an optimized handover parameter of the first-type user in the i$^{th}$ cell within the new preset time, in response to the determining unit determining, according to the handover problem of the first-type user in the i$^{th}$ cell within the preset time, the handover problems of the first-type users in all the adjacent cells, and $R_i$, $r_i$, $R_j$, and $r_j$, that the i$^{th}$ cell is a cell to be optimized, wherein the optimizing is performed, according to $R_i$, $r_i$, $R_j$, and $r_j$, the handover parameter of the i$^{th}$ cell, and the handover parameters of the adjacent cells of the i$^{th}$ cell, by using the data statistical regression method.

18. The device according to claim 11, wherein the program further includes instructions for:

determining that the i$^{th}$ cell is a cell to be optimized, in response to a determination that a global handover problem exists in the any adjacent cell, that a global handover problem exists in the i$^{th}$ cell, and that a weighted sum of $R_i^1$, $R_i^2$, and $R_i^3$ of the i$^{th}$ cell is greater than a weighted sum of $R_j^1$, $R_j^2$, and $R_j^3$ of each adjacent cell in which a global handover problem exists, or determining that the $i^{th}$ cell is a cell to be optimized, in response to a determination that a global handover problem exists in the any adjacent cell, that a global handover problem exists in the $i^{th}$ cell, and that a weighted sum of $R_i^1$, $R_i^2$, and $R_i^3$ of the $i^{th}$ cell is equal to a weighted sum of $R_j^1$, $R_j^2$, and $R_j^3$ of any adjacent cell in which a global handover problem exists, and it is determined that a sum of $R_i^1$ and $R_i^2$ of the $i^{th}$ cell is greater than a sum of $R_j^1$ and $R_j^2$ of each adjacent cell in which a global handover problem exists, or determining that the $i^{th}$ cell is a cell to be optimized, in response to a determination that a global handover problem exists in none of the adjacent cells, and that a global handover problem exists in the $i^{th}$ cell, or determining that the $i^{th}$ cell is a cell to be optimized, in response to a determination that a global handover problem exists in none of the adjacent cells, that no global handover problem exists in the $i^{th}$ cell, that a local handover problem exists in the $i^{th}$ cell, and it is determined that a local handover problem exists in none of the adjacent cells, or determining that the $i^{th}$ cell is a cell to be optimized, in response to a determination that a global handover problem exists in none of the adjacent cells, that no global handover problem exists in the $i^{th}$ cell, that a local handover problem exists in the $i^{th}$ cell, and it is determined that a local handover problem exists in any one of the adjacent cells, and that a weighted sum of $r_{ib}^1$, $r_{ib}^2$, and $R_{ib}^3$ of the $i^{th}$ cell with respect to a $b^{th}$ adjacent cell is greater than or equal to a weighted sum of $r_{bi}^1$, $r_{bi}^2$, and $r_{bi}^3$ of the $b^{th}$ adjacent cell with respect to the $i^{th}$ cell, wherein the $b^{th}$ adjacent cell is any one of adjacent cells in which a local handover problem exists.

19. The device according to claim 11, wherein the handover problem comprises a global handover problem and a local handover problem, wherein the global handover problem comprises a global too late handover problem and a global too early handover or a ping-pong handover problem, and wherein the local handover problem comprises a local too late handover problem and a local too early handover or ping-pong handover problem.

20. The device according to claim 11, wherein the program further includes instructions for:

determining that a global too late handover problem and a global too early handover or a ping-pong handover problem exist in the $i^{th}$ cell, in response to a determination that both a too late handover and a too early handover or a ping-pong handover exist between the $i^{th}$ cell and A adjacent cells, wherein a is greater than or equal to ½ of a total quantity of all the adjacent cells of the $i^{th}$ cell;

determining that a global too late handover problem exists in the $i^{th}$ cell, in response to a determination that $R_i^1$ of the $i^{th}$ cell is greater than a first preset threshold, and it is determined that a too late handover exists between the $i^{th}$ cell and s adjacent cells, and that no too early handover or ping-pong handover exists between the $i^{th}$ cell and all the adjacent cells, wherein s is greater than or equal to ½ of a total quantity of all the adjacent cells of the $i^{th}$ cell;

determining that a global too early handover or ping-pong handover problem exists in the $i^{th}$ cell, in response to a determination that a sum of $R_i^2$ and $R_i^3$ of the $i^{th}$ cell is greater than a second preset threshold, it is determined that a too early handover or a ping-pong handover exists between the $i^{th}$ cell and t adjacent cells, and it is determined that no too late handover exists between the $i^{th}$ cell and all the adjacent cells, wherein t is greater than or equal to ½ of a total quantity of all the adjacent cells of the $i^{th}$ cell;

determining that a local too late handover problem exists in the $i^{th}$ cell, in response to a determination that no global handover problem exists in the $i^{th}$ cell, and that a too late handover exists between the $i^{th}$ cell and a $k^{th}$ adjacent cell, wherein the $k^{th}$ adjacent cell is any adjacent cell whose $r_{ik}^1$ is greater than the first preset threshold; and determining that a local too early handover or ping-pong handover problem exists in the $i^{th}$ cell, in response to a determination that no global handover problem exists in the $i^{th}$ cell, and that a too early handover or a ping-pong handover exists between the $i^{th}$ cell and an $m^{th}$ adjacent cell, wherein the $m^{th}$ adjacent cell is any adjacent cell whose $r_{im}^2$ or $r_{im}^3$ is greater than the second preset threshold.

* * * * *